US012753092B2

(12) United States Patent
Zhadanov et al.

(10) Patent No.: US 12,753,092 B2
(45) **Date of Patent: *Oct. 6, 2026**

(54) SHOWER SYSTEM WITH A FILTER

(71) Applicant: Eli Zhadanov, Brooklyn, NY (US)

(72) Inventors: Eli Zhadanov, Brooklyn, NY (US); Chen Kejie, Cixi City (CN)

(73) Assignee: Eli Zhadanov, Brooklyn, NY (US)

( * ) Notice: Subject to any disclaimer, the term of this patent is extended or adjusted under 35 U.S.C. 154(b) by 325 days.

This patent is subject to a terminal disclaimer.

(21) Appl. No.: 18/485,104

(22) Filed: Oct. 11, 2023

(65) Prior Publication Data

US 2024/0116776 A1 Apr. 11, 2024

Related U.S. Application Data

(60) Provisional application No. 63/379,034, filed on Oct. 11, 2022.

(30) Foreign Application Priority Data

May 8, 2023 (CN) ......................... 202321089848.7

(51) Int. Cl.
*B05B 15/40* (2018.01)
*B01D 35/147* (2006.01)
(Continued)

(52) U.S. Cl.
CPC .......... *C02F 1/003* (2013.01); *B01D 35/1475* (2013.01); *B05B 15/40* (2018.02);
(Continued)

(58) Field of Classification Search
CPC C02F 1/003; C02F 2307/06; C02F 2201/006; B01D 35/1475;
(Continued)

(56) References Cited

U.S. PATENT DOCUMENTS 4,933,080 A * 6/1990 Rundzaitis ........... B01D 35/043
4/615
6,096,197 A * 8/2000 Hughes ................... C02F 1/003
4/615
(Continued)

*Primary Examiner* — Joseph W Drodge
(74) *Attorney, Agent, or Firm* — Fay Kaplun & Marcin, LLP

(57) ABSTRACT

A system includes a filter assembly with a filter and an inlet pipe. The filter includes a connector, a housing couplable to the connector, and a filter cartridge within the housing. The connector includes a spout with inlet/outlet channels. The pipe feeds water to a dispersing arrangement via an inlet pipe channel extending therethrough from upstream to downstream ends. An upstream portion of the inlet pipe channel is coupled to the inlet channel and a downstream portion of the inlet pipe channel is coupled to the outlet channel. The assembly is movable between Active configuration (the inlet/outlet channels are open so that water from the upstream portion passes through the inlet channel into the cartridge and through the outlet channel into the downstream portion) and Bypass configuration (the inlet/outlet channels are closed so that water passes through a bypass channel to exit the assembly without passing through the cartridge).

19 Claims, 34 Drawing Sheets

(51) Int. Cl.
*C02F 1/00* (2023.01)
*E03C 1/04* (2006.01)

(52) U.S. Cl.
CPC ...... *E03C 1/0408* (2013.01); *B01D 2201/165* (2013.01); *C02F 2307/06* (2013.01); *E03C 2201/40* (2013.01)

(58) Field of Classification Search
CPC ........... B01D 2201/165; B01D 35/147; B05B 15/40; B05B 1/18; B05B 1/22; E03C 1/0408; E03C 2201/40; E03C 1/025
See application file for complete search history.

(56) References Cited

U.S. PATENT DOCUMENTS

| | | | | |
|---|---|---|---|---|
| 2005/0072727 | A1* | 4/2005 | Takagi | B05B 15/40 210/434 |
| 2011/0147286 | A1* | 6/2011 | Mang | E03C 1/066 210/236 |
| 2012/0031821 | A1* | 2/2012 | Swain | B01D 35/30 210/232 |
| 2016/0236945 | A1* | 8/2016 | Floyd | C02F 1/003 |
| 2016/0303580 | A1* | 10/2016 | Cai | B05B 12/008 |
| 2024/0115979 | A1* | 4/2024 | Zhadanov | B05B 1/18 |

* cited by examiner

SHOWER SYSTEM WITH A FILTER

PRIORITY CLAIM

The present disclosure claims priority to U.S. Provisional Patent Application Ser. No. 63/379,034 filed Oct. 11, 2022; the disclosure of which is incorporated herewith by reference.

FIELD

The present disclosure relates to a shower system which has a filter for filtering water for a user.

SUMMARY

The present disclosure relates to a shower filter system, comprising: a filter assembly including: a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe configured to feed water to a water dispersing arrangement via an inlet pipe channel extending therethrough from an upstream end to a downstream end, an upstream portion of the inlet pipe channel being coupled to the spout inlet channel and a downstream portion of the inlet pipe channel being coupled to the spout outlet channel. The filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge.

In addition, the present disclosure relates to a shower filter system, comprising: a first water dispersing arrangement having a first inlet; a second water dispersing arrangement having a second inlet; and a filter assembly comprising: a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe coupled to the filter and including an inlet pipe channel extending therethrough from an upstream end to a downstream end, an upstream portion of the inlet pipe channel being coupled to the spout inlet channel and a downstream portion of the inlet pipe channel being coupled to the spout outlet channel and at least one of the first inlet and the second inlet. The filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge.

In addition, the present disclosure relates to a shower filter system, comprising: a filter assembly including: an inlet pipe portion couplable to a water source and including an inlet pipe channel extending partially therethrough; a water dispersing arrangement portion extending integrally from the inlet pipe portion and including a water dispersing arrangement channel extending partially therethrough; and a filter including a connector coupled to the inlet pipe portion, a filter housing couplable to the connector, and a filter cartridge situated within the filter housing to filter water passed therethrough, the connector including a connector inlet channel extending partially therethrough and a connector outlet channel extending partially therethrough. Wherein, the filter assembly is movable between (a) an active configuration, in which the connector inlet channel couples to the filter so that water passes through the inlet pipe channel, through the connector inlet channel into the filter cartridge, and through the connector outlet channel into the water dispersing arrangement channel, and (b) a bypass configuration, in which the connector inlet channel couples to a filter bypass channel so that water passes through the inlet pipe channel, through the connector inlet channel into the filter bypass channel, and through the connector outlet channel into the water dispersing arrangement channel without passing through the filter cartridge.

There are a number of advantages of the present disclosure. For example, the shower filter system may include a housing containing a filter cartridge inside that may be quickly and easily be disconnected and dismounted from the shower head assembly for convenient replacement of the used filter cartridge. This may eliminate the need to disconnect the shower head and replace the filter cartridge at the stationary, difficult-to-reach shower filter location (e.g., often mounted 6 feet above), then reinstall the shower head.

Another exemplary advantage of the present disclosure is that the shower filter system may have a number of configurations (i.e., settings, modes). For example, the shower filter system may have an active configuration (e.g., an ON mode), a shut off configuration, a first bypass configuration (e.g., a first OFF mode) and a second bypass configuration (e.g., a second OFF mode). After a certain use, the filter cartridge may get filled with debris that obstructs water flow and which causes the shower head to lose the water pressure. Then, the user may switch the shower filter system from the active configuration into the first or second bypass configuration so the water flow flows directly into the shower head bypassing the filter cartridge and thereby improving the water pressure and the flow output. This may result in a more satisfying shower experience for the user.

Yet another advantage of present disclosure is that when the shower filter system is in the bypass configuration, there may be a corresponding indication for the user. For example, the housing may include an “OFF” marking indicating to the user that he/she is showering with unfiltered water. This may serve as a reminder for the user to replace the filter cartridge.

DETAILED DESCRIPTION

FIGS. 1-8C show a shower filter system 100 according to multiple exemplary embodiments of the present disclosure. The shower filter system 100 may operate in a plurality of configurations: an active configuration (e.g., the filtered water flows through the shower filter system 100); a first bypass configuration (e.g., the unfiltered water flows through the shower filter system 100, but the enters the filter); a second bypass configuration (e.g., the unfiltered water flows through the shower filter system 100, but does not enter the filter); and a shut off configuration (e.g., the water does not flow the shower filter system 100).

Figure 2:
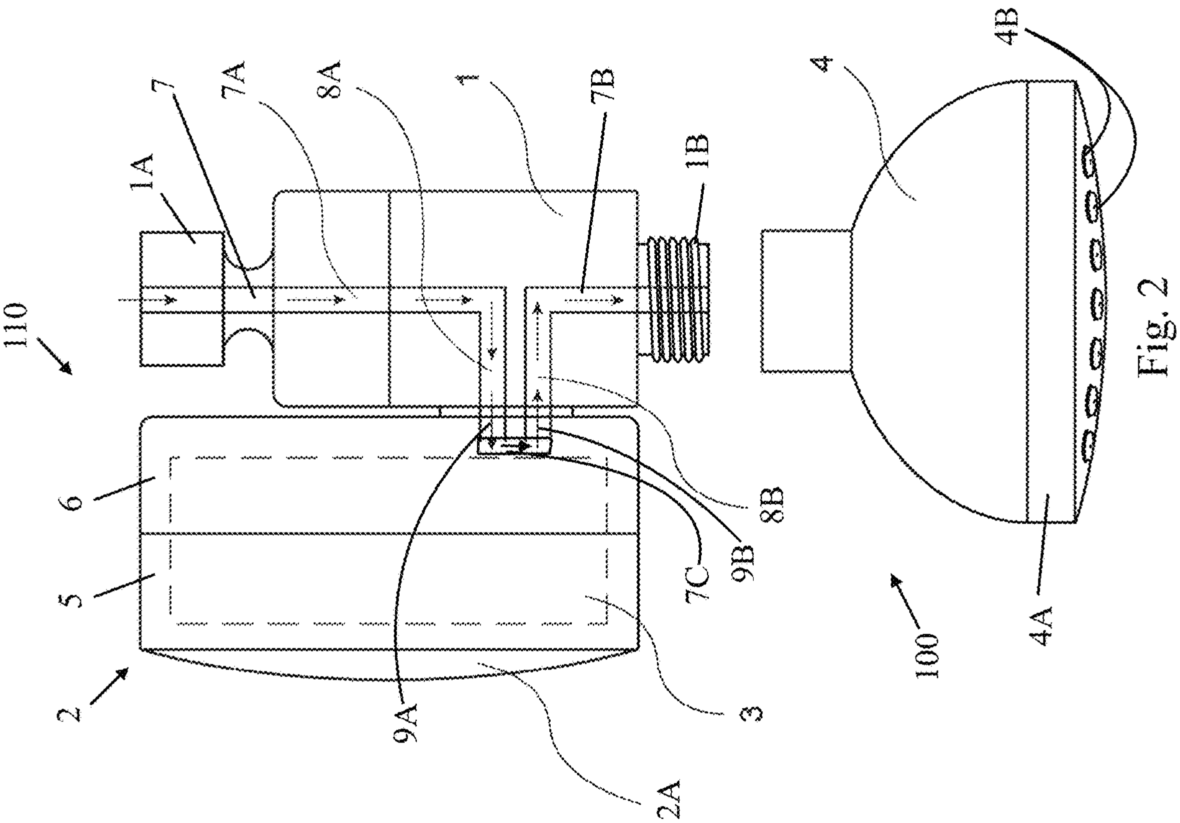
FIG. 2 shows a partially transparent top view of the shower filter system of FIG. 1 in a bypass configuration.
Figure 1:
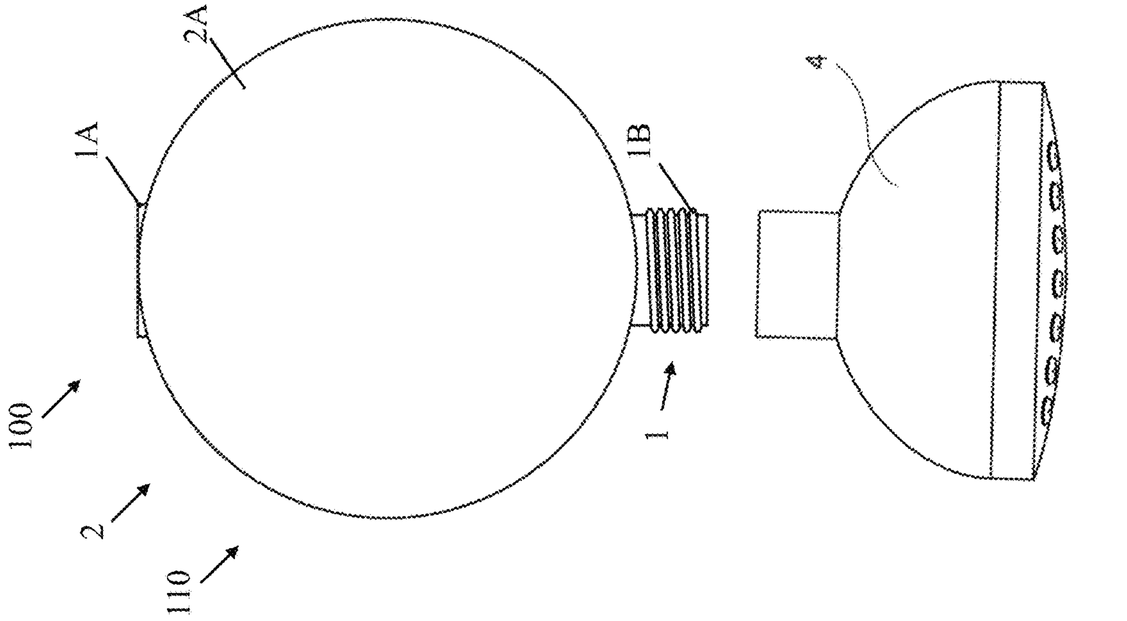
FIG. 1 shows a side view of a first exemplary embodiment of a shower filter system according to the present disclosure in a detached configuration.
Figure 4:
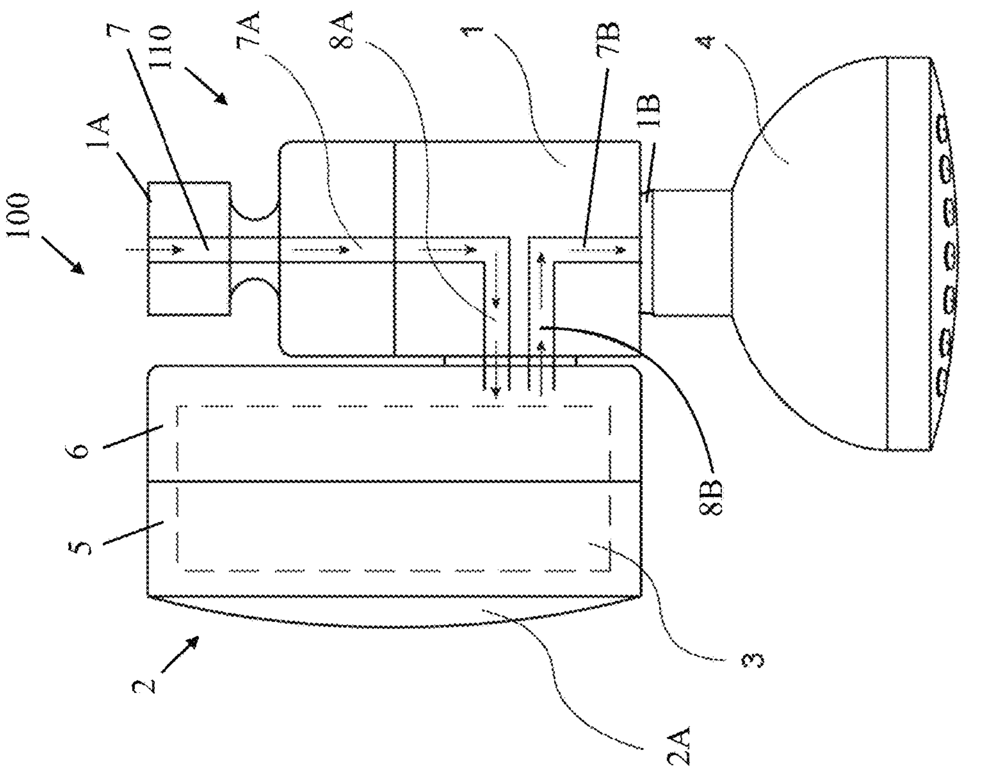
FIG. 4 shows a partially transparent top view of the shower filter system of FIG. 1 in an attached configuration.
Figure 3:
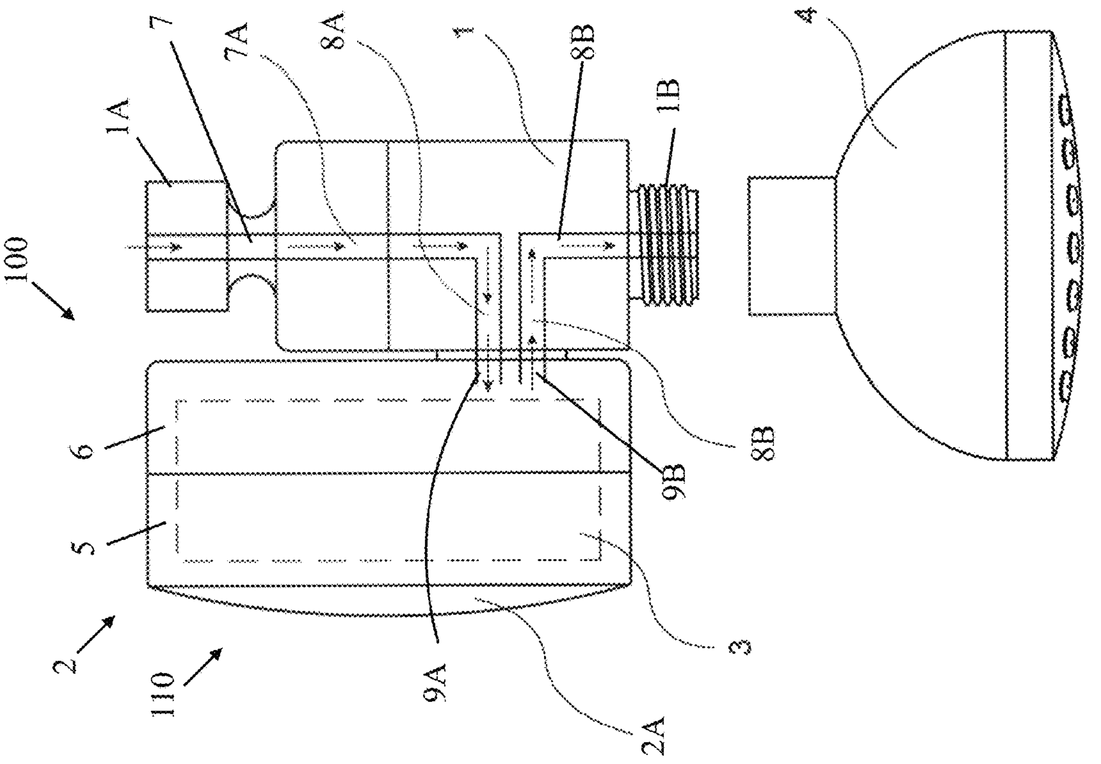
FIG. 3 shows a partially transparent top view of the shower filter system of FIG. 1 in an active configuration.

FIG. 1 shows a side view of the shower filter system 100, while FIGS. 2-4 show a top of view of the shower filter system 100. The shower filter system 100 may include a filter assembly 110 and a water dispersing arrangement. The water dispersing arrangement may be at least one fixed mounted shower head (e.g., see FIGS. 1-4, 10A, 10B). Those skilled in the art would understand that the water dispersing arrangement may include at least one removable hand shower (e.g., see FIG. 11A). Furthermore, the water dispersing arrangement may include a combination of the fixed mounted shower head and/or the removable hand shower (e.g., FIGS. 12A-12C). According to the exemplary embodiment of the present disclosure, the shower filter system 100 may include a shower head 4 which is fixed mounted.

The filter assembly 110 may include an inlet pipe 1 and a filter 2. The inlet pipe 1 of the filter assembly 110 extends from a first end 1A connectable to a water source (e.g., a shower arm) to a second end 1B connectable to the shower head 4 via any method known to one skilled in the art (e.g., a threading connection), as can be seen in FIG. 4. The shower head 4 may include a front face plate 4A having a plurality of nozzles 4B through which shower water is dispersed at a user.

Figure 6C:
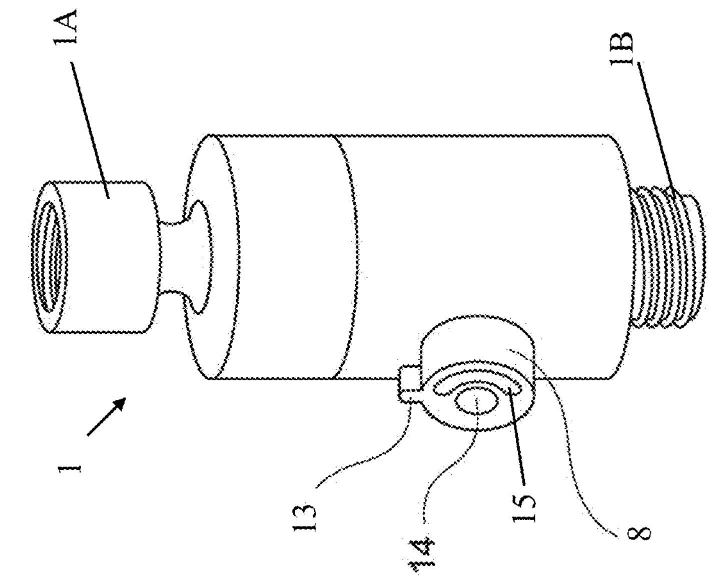
FIG. 6C shows a perspective view of a first exemplary embodiment of a connector of the shower filter system of FIG. 1.
Figure 6D:
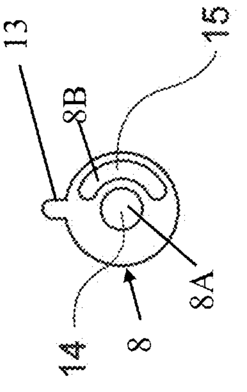
FIG. 6D shows a front view of an exemplary embodiment of a spout of the connector shown in FIG. 6C.
Figure 6A:
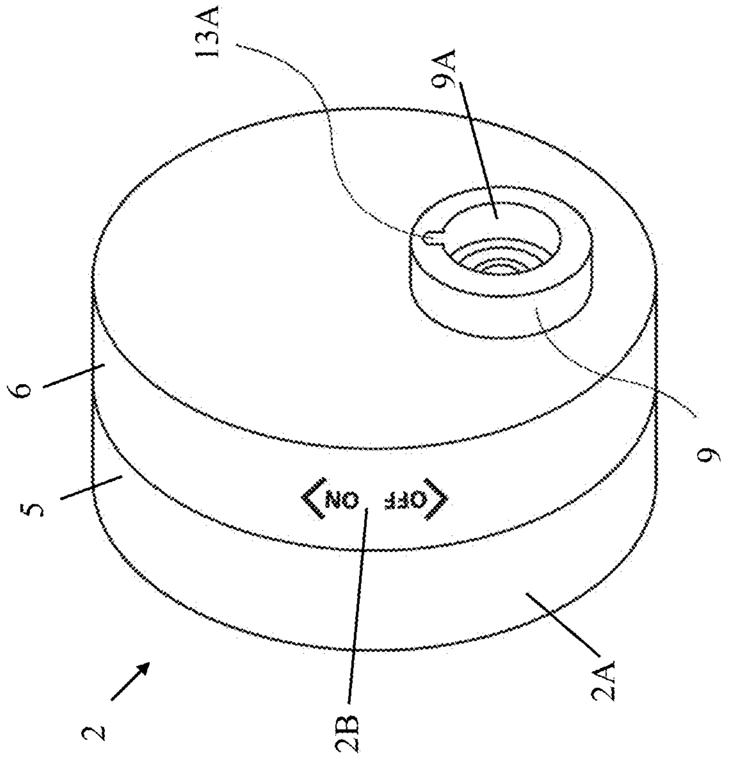
FIG. 6A shows a perspective view of a first exemplary embodiment of a filter of the shower filter system of FIG. 1.
Figure 6B:
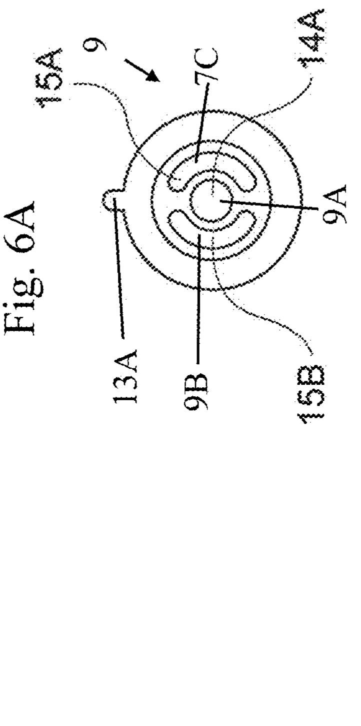
FIG. 6B shows a front view of an exemplary embodiment of a receptacle of the filter shown in FIG. 6A.
Figure 7C:
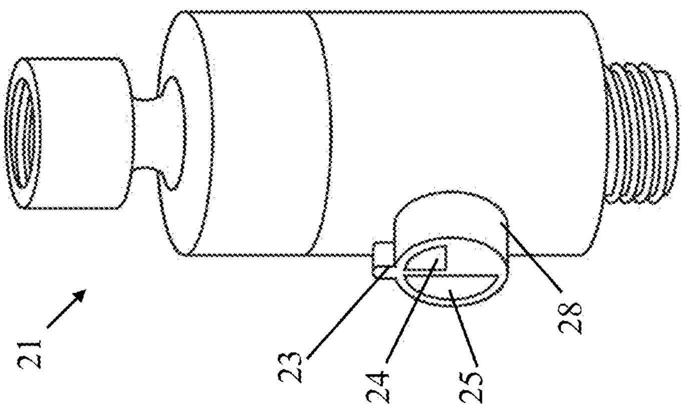
FIG. 7C shows a perspective view of a second exemplary embodiment of a connector of the shower filter system of FIG. 1.
Figure 7D:
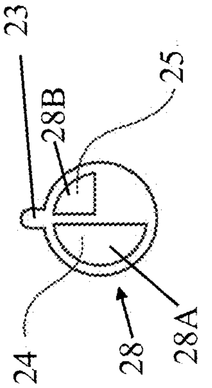
FIG. 7D shows a front view of an exemplary embodiment of a spout of the connector shown in FIG. 7C.
Figure 7A:
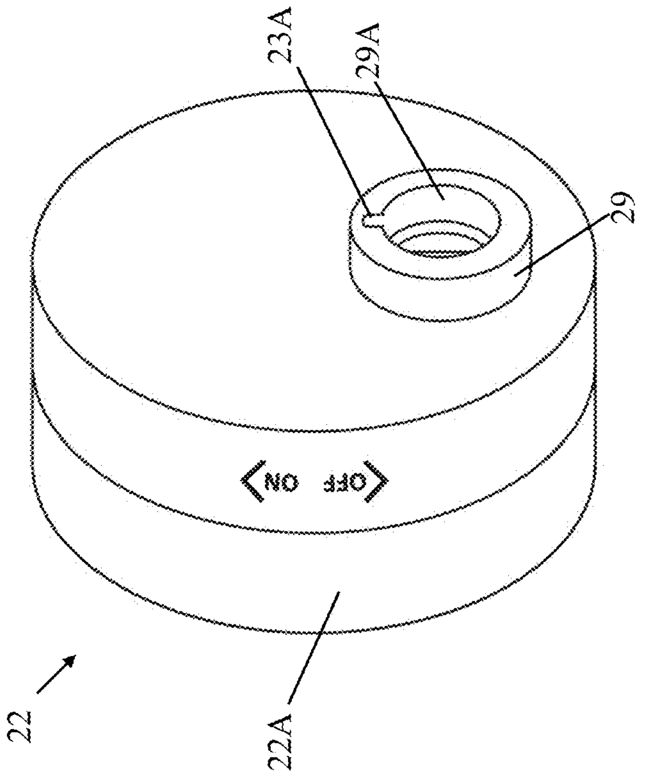
FIG. 7A shows a perspective view of a second exemplary embodiment of a filter of the shower filter system of FIG. 1.
Figure 7B:
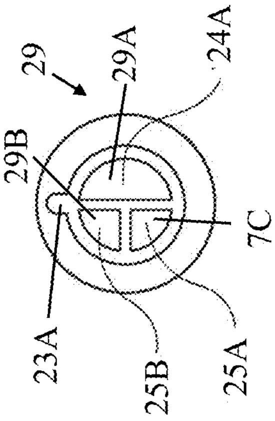
FIG. 7B shows a front view of an exemplary embodiment of a receptacle of the filter shown in FIG. 7A.

The filter 2 of the filter assembly 110, as shown in FIGS. 2 and 6A, may include a detachable housing 2A configured to house a filter cartridge 3 inside. The housing 2A may include a first section and a second section 6. The first section 5 is configured to connect to the second section 6 via any conventional method known to one skilled in the art (e.g., threading, snapping, locking and fitting), such that first section 5 may be separated from the second section 6 by the user to replace the filter cartridge 3 housed inside of the housing 2A. In an alternative exemplary embodiment, the housing 2A may be constructed as a single piece (not shown).

The filter assembly 110 may be configured to be in an active configuration and a first bypass configuration. In the active configuration, the shower water flows through an inlet pipe channel 7 of the inlet pipe 1, then the filter cartridge 3 of the filter 2, and then disperses out of the shower head 4. In the first bypass configuration, the shower water flows through the pipe channel 7, bypasses the filter cartridge 3 via a bypass channel 7C of the pipe channel 7, and disperses out of the shower head 4. In other words, in the active configuration, the shower water filters by passing through the filter cartridge 3, and, thus, the shower water is filtered when it is dispersed onto the user. On the other hand, in the first bypass configuration, the shower water does not pass through the filter cartridge 3 and, thus, the shower water remains unfiltered when it is dispersed onto the user. Those skilled in the art will understand that there are a number of other options for the shower water to bypass the filter cartridge 3 and/or the filter 2.

Figure 5:
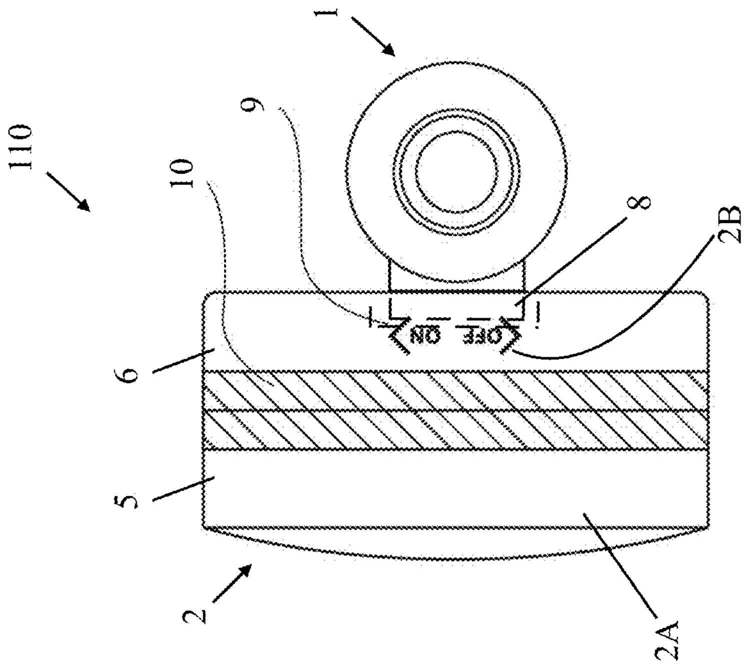
FIG. 5 shows a front view of an exemplary embodiment of a filter assembly of the shower filter system of FIG. 1.

FIG. 5 shows the filter assembly 110 in which the inlet pipe 1 is coupled to the filter 2. There are a number of alternative exemplary embodiments for coupling the inlet pipe 1 to the filter 2. Some of the alternative exemplary embodiments are shown in the drawings and will be described below.

In one of the exemplary embodiments, the inlet pipe 1 may include a connector having a spout 8 extending outward from a side of the inlet pipe 1. The spout 8 may be sized and shaped to be inserted into a cavity 9C of a receptacle 9 of the filter 2. The spout 8 and the receptacle 9 are couplable via a coupling mechanism. For example, the coupling mechanism may permit twisting, turning or snapping actions so that the filter 2 may rotate relative to the inlet pipe 1. However, those skilled in the art will understand that other types of the coupling mechanisms are possible.

To replace the filter cartridge 3, the user places the shower filter system 100 in the shut off configuration by turning off the water so that the water stops flowing to the inlet pipe 1. Then, the user may uncouple the filter 2 from the inlet pipe 1. Next, the user may separate the first section 5 of the housing 2A from the second section 6 of the housing 2A (e.g., by twisting the first section 5 relative to the second section 6) to remove and replace the filter cartridge 3 housed therein. In an alternative exemplary embodiment (not shown), the second section 6 remains connected to the inlet pipe 1, but the first section 5 is decoupled from the second section 6. Thus, allowing the filter cartridge 3 to be replaced.

In another alternative exemplary embodiment (not shown), the housing 2A is composed of a single piece, then the housing 2A may include an opening for removal of the filter cartridge 3. In a further alternative exemplary embodiment (not shown), the filter cartridge 3 may be integrated with the filter 2, thus, the filter 2 would need to be replaced.

Once the filter cartridge 3 is replaced with a new filter cartridge, the first section 5 and the second section 6 may be coupled to one another and the filter 2 may be coupled to the inlet pipe 1. As shown in FIG. 5, in an exemplary embodiment, the housing 2A may have a grip 10 extending about a circumference of the housing 2A. The grip 10 may be composed of or covered by an anti-slip material. In addition, the grip 10 may be composed of an antimicrobial material. A remaining portion of the housing 2A may be composed of or covered by an anti-slip material and/or an antimicrobial material.

FIGS. 6A-D show an exemplary embodiment according to the present disclosure of the inlet pipe 1 and the filter 2 of the filter assembly 110. As can be understood by one with ordinary skills in the art, the inlet pipe 1 may be coupled to the filter 2 when the spout 8 of the inlet pipe 1 is inserted into the cavity 9C of the receptacle 9 of the filter 2. The spout 8 includes a protrusion 13 sized and shaped to be inserted into a receiving portion 13A of the cavity 9C to align the filter 2 with the inlet pipe 1. The spout 8 includes a first opening 14 and a second opening 15 (see FIG. 6D). Similarly, the receptacle 9 includes a third opening 14A, a fourth opening 15A and a fifth opening 15B (see FIG. 6B).

To move the filter assembly 110 from the first bypass configuration into the active configuration, the filter 2 may be rotated in a first direction (e.g., clockwise) from an initial position to a stop position. The filter assembly 110 may have at least a tactile feedback and/or an audible feedback to notify the user that the filter 2 was properly rotated until the stop position.

Once the filter cartridge 3 gets at least partially filled with sedatives and residue, it may cause the water pressure to drop in the shower head 4. Subsequently, the user may desire to replace the filter cartridge 3. To achieve the above, the user switches from the active configuration into the shut off configuration so that the water stops flowing. Then, the user replaces the filter cartridge 3.

To switch the filter assembly 110 into the active configuration, the filter 2 may be rotated in a second direction (e.g., counterclockwise) from the stop position back to the initial position or an intermediary position. Each of the first bypass and active configurations of the filter assembly 110 may include a corresponding indicative. For example, the indicative may be a printed on or glued on label, an engraving, a light, a sound beep, or any other means known in the art to show configurations and/or directions. In an exemplary embodiment, the filter 2 contains a label 2B on the housing 2A, the label 2B including an "OFF" position, in which the filter assembly 110 is in the first bypass configuration, and an "ON" position, in which the filter assembly 110 is in the active configuration. In further exemplary embodiments, the label 2B may include words such as "ACTIVE", "BYPASS", "FILTER," among other words that indicate a configuration of the filter assembly 110.

An exemplary embodiment is shown in FIG. 2. When the filter assembly 110 is in the first bypass configuration, the shower water flows into the filter 2 through an upstream portion 7A of the pipe channel 7, through a spout outlet channel 8A of the spout 8, through a receptacle inlet channel 9A of the receptacle 9, bypasses the filter cartridge 3 (i.e., the shower water remains unfiltered) via a bypass channel 7C, and flows out of the filter 2 through a receptacle outlet channel 9B of the receptacle 9, a spout inlet channel 8B of the spout 8, through a downstream portion 7B of the pipe channel 7. On the other hand, as shown in FIG. 3, when the filter assembly 110 is in the active configuration, the shower water flows into the filter 2 through the upstream portion 7A, through the spout outlet channel 8A, through the receptacle inlet channel 9A, passes through the filter cartridge 3 (i.e., the shower water becomes filtered), and flows out of the filter 2 through the receptacle outlet channel 9B, through the spout inlet channel 8B and through the downstream portion 7B.

In an exemplary embodiment, when the filter assembly 110 is in the first bypass configuration (e.g., see FIG. 2), the first opening 14 of the spout 8 aligns with the fourth opening 15A of the receptacle 9 and the second opening 15 of the spout 8 aligns with the fifth opening 15B of the receptacle 9. In the bypass configuration, the shower water enters the pipe channel 7 through the first end 1A of the inlet pipe 1 and the shower water is guided through the upstream portion 7A and through the first opening 14 of the spout 8 into the fourth opening 15A of the receptacle 9. Once the shower water enters through the fourth opening 15A of the receptacle 9, the shower water is guided into the bypass channel 7C, bypassing the filter cartridge 3, and out of the fifth opening 15B of the receptacle 9. The unfiltered shower water then flows through the fifth opening 15B of the receptacle 9, through the second opening 15 of the spout 8, through the downstream portion 7B and out through the shower head 4, dispersing onto the user.

In an exemplary embodiment, when the filter assembly 110 is in the active configuration (e.g., see FIG. 3), the shower water enters the pipe channel 7 through the first end 1A of the inlet pipe 1 and the shower water is guided through the upstream portion 7A, through the spout outlet channel 8A and through the first opening 14 of the spout 8 into the third opening 14A of the receptacle 9. Once the shower water enters through the third opening 14A of the receptacle 9, the shower water is guided through the receptacle inlet channel 9A into the filter cartridge 3, where the shower water is filtered for sedatives to soften the shower water. The filtered shower water then flows through the receptacle outlet channel 9B, through the fifth opening 15B of the receptacle 9, though the second opening 15 of the spout 8, through the spout inlet channel 8B, through the downstream portion 7B and out through the shower head 4, dispersing onto the user.

FIGS. 7A-D show another exemplary embodiment according to the present disclosure of another filter assembly including an inlet pipe 21 and a filter 22. The inlet pipe 21 and the filter 22 are substantially similar to the inlet pipe 1 and the filter 2, respectively, of the filter assembly 110. The inlet pipe 21 may couple to the filter 22 in a similar manner as the inlet pipe 1 couples to the filter 2.

In this exemplary embodiment, the inlet pipe 21 includes a spout 28 that is inserted into a cavity 29C of a receptacle 29 of the filter 22. The spout 28 includes a protrusion 23 sized and shaped to be inserted into a receiving portion 23A of the cavity 29C to align the filter 22 with the inlet pipe 21. The spout 28 also includes a first opening 24, a second opening 25, a spout outlet channel 28A, and a spout inlet channel 28B. The first opening 24 may be larger than the second opening 25 (see FIG. 7D). Similarly, the receptacle 29 includes a third opening 24A, a fourth opening 25A, a fifth opening 25B, a receptacle inlet channel 29A, and a receptacle outlet channel 29B (see FIG. 7B).

As one with ordinary skill in the art will ascertain, the first opening 24 of the spout 28 corresponds substantially to third opening 25A of the receptacle 29, and the second opening 25 of the spout 28 corresponds substantially to the fourth and fifth openings 25A, 25B of the receptacle 29. Accordingly, the shower water flows through the openings 24, 24A, 25, 25A and 25B in a substantially similar manner as the shower water flows through the openings 14, 14A, 15, 15A, 15B of the filter assembly 110. Although the openings 24, 24A, 25, 25A and 25B have a semi-circle shaped or a quarter-circle shaped cross-section, the openings 24, 24A, 25, 25A and 25B may be any other shape that permits the shower water to pass through them. Furthermore, to replace a filter cartridge inside of the filter 22, the user may open a housing 22A of the filter 22, remove the clogged filter cartridge, insert a new filter cartridge, close the housing 22A, and direct the shower water through a new filter cartridge.

Figure 8B:
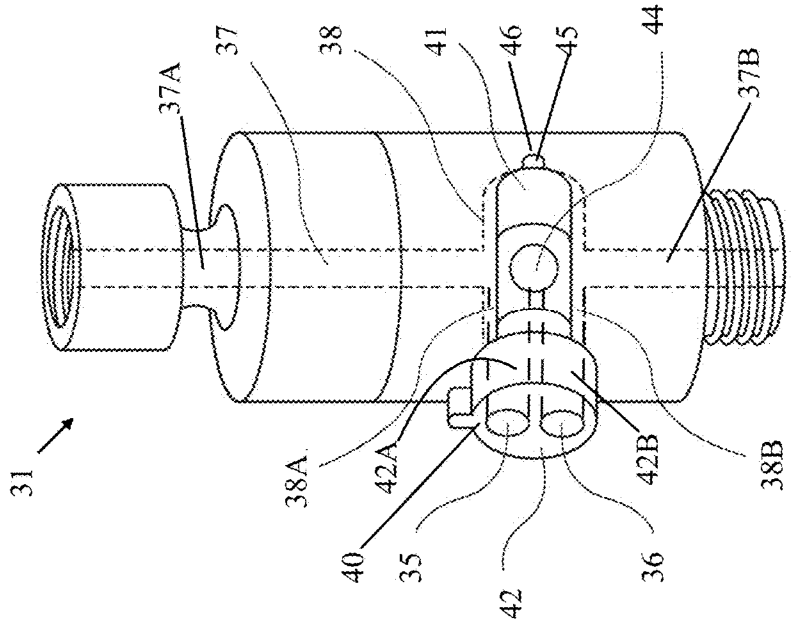
FIG. 8B shows a perspective view of a third exemplary embodiment of a connector of the shower filter system of FIG. 1.
Figure 8C:
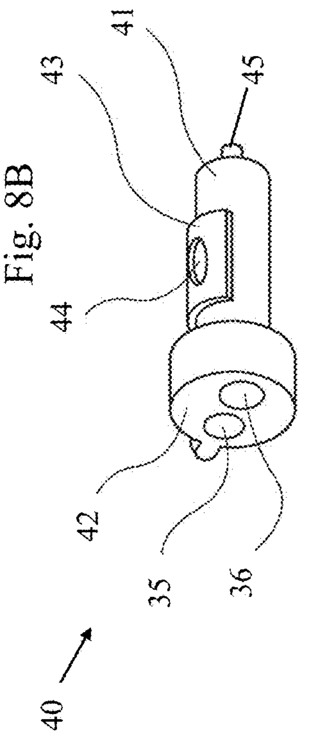
FIG. 8C shows a perspective view of an exemplary embodiment of a valve of the connector shown in FIG. 8B.
Figure 8A:
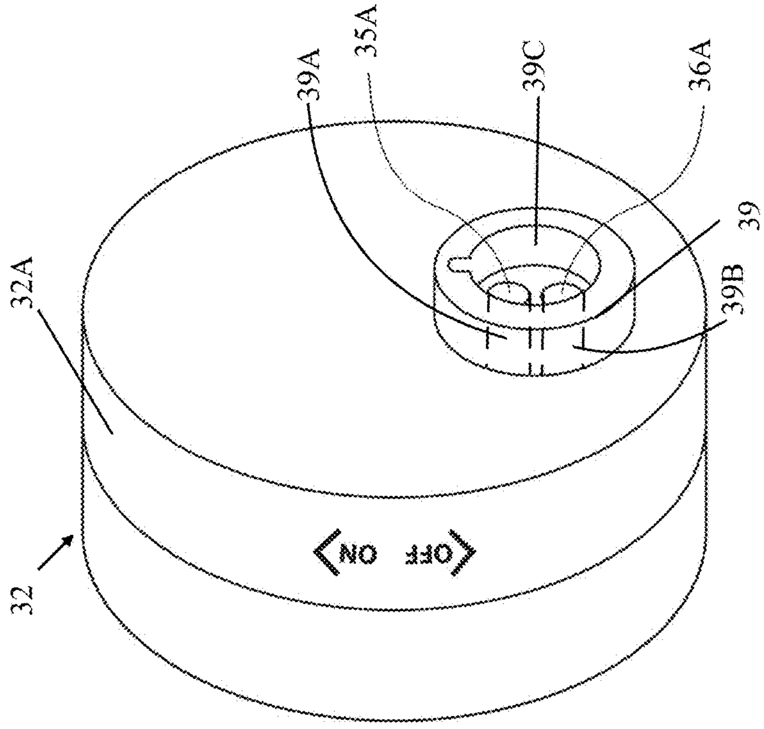
FIG. 8A shows a perspective view of a third exemplary embodiment of a filter of the shower filter system of FIG. 1.

FIGS. 8A-C show yet another exemplary embodiment according to the present disclosure of yet another filter assembly including an inlet pipe 31 and a filter 32. The inlet pipe 31 and the filter 32 are substantially similar to the inlet pipe 1 and the filter 2, respectively, of the filter assembly 110, except that, the inlet pipe 31 does not have a spout attached thereto, instead the inlet pipe 31 has a valve 40. The valve 40 includes a body 41 extending from a first end to a second end and a head 42 coupled to the first end of the body 41. The head 42 is substantially similar to and functions substantially similar to the spout 8 of the filter assembly 110, except as described below. Although in the exemplary embodiment the head 42 is integrally attached to the body 41, in a further embodiment, the head 42 may be coupled to the body 41 via any mechanism known to one with skills in the art (e.g., threading, snap fit) or the head 42 may be coupled directly to the inlet pipe 31 via any mechanism known to one with skills in the art (e.g., threading, snap fit).

As shown in FIG. 8A, in the exemplary embodiment, the filter 32 is substantially similar to the filters 2, 22. The filter 32 houses a filter cartridge (not shown) in a housing 32A. The housing 32A may be rotated to move another filter assembly from the active configuration to the second bypass configuration. The filter 32 also includes a receptacle 39 having a cavity 39C sized and shaped to receive a head 42 of the valve 40 in a similar manner as the cavity 9C of the receptacle 9 of the filter 2 receives the spout 8 of the inlet pipe 1. The receptacle 39 further includes a receptacle inlet channel 39A having a third opening 35A for receiving the shower water from the inlet pipe 31 and a receptacle outlet channel 39B having a fourth opening 36A for releasing the shower water into the inlet pipe 31, as will be described in further detail below.

As shown in FIG. 8B, in the exemplary embodiment, the inlet pipe 31 is substantially similar to the inlet pipes 1, 21, however the inlet pipe 31 includes a socket 38 sized and shaped to receive a body 41 of the valve 40. The inlet pipe 31 further includes an inlet pipe channel 37 for delivering the shower water from the water source to the user. The inlet pipe channel 37 includes an upstream portion 37A, through which the shower water flows into the socket 38, and a downstream portion 37B, through which the shower water flows onto the user.

As shown in FIG. 8C, in this exemplary embodiment, the valve 40 includes the body 41 and the head 42. The body 41 has an enlarged protrusion 43 extending outward from the body 41 in a direction perpendicular to a longitudinal axis of the body 41. The body 41 further includes a valve channel 44 extending therethrough and through the enlarged protrusion 43, the valve channel 44 being perpendicular to the longitudinal axis of the body 41. The head 42 is attached to the body 41 and includes a first head channel 42A (e.g., a spout outlet channel) having a first opening 35 and a second head channel 42B (e.g., a spout inlet channel) having a second opening 36, each of the head channels 42A, 42B extending longitudinally through the head 42. The first head channel 42A is sized and shaped to correspond to the receptacle inlet channel 39A and the second head channel 42B is sized and shaped to correspond to the receptacle outlet channel 39B.

The valve 40 is further movable between a filter configuration, when the valve channel 44 is aligned with the upstream portion 37A and the downstream portion 37B such that the shower water flows directly through the body 41 onto the user, and a non-filter configuration, when the valve channel 44 is not aligned with the upstream portion 37A and the downstream portion 37B. In an exemplary embodiment, the valve 40 may further include a pin 45 sized and shaped to be inserted into a correspondingly sized and shaped pin cavity 46 in the inlet pipe 31 to guide the valve 40 into the socket 38 and firmly hold the valve 40 in the socket 38.

When the valve 40 is inserted into the socket 38, as shown in FIG. 8B, the valve 40 separates the socket 38 into a first socket portion 38A and a second socket portion 38B. When the valve 40 is inserted into the socket 38, a seal is formed between the valve 40 and the inlet pipe 31 to prevent the shower water from leaking out of the socket 38. When the filter assembly is moved into the active configuration, the valve 40 is moved into the filter configuration.

Once the valve 40 is in the non-filter configuration, the shower water flows through the upstream portion 37A into the first socket portion 38A. The shower water is then forced through the first head channel 42A, through the first opening 35 of the head 42, through the third opening 35A of the receptacle 39, through the receptacle inlet channel 39A and into the filter cartridge of the filter 32, where the shower water is filtered to remove sedatives. Next, the now filtered shower water is forced by water pressure through the receptacle outlet channel 39B, through the fourth opening 36A, through the second opening 36, through the second head channel 42B, and into the second socket portion 38B. Once in the second socket portion 38B, the filtered shower water is forced through the downstream portion 37B and onto the user.

Once the filter cartridge of the filter 32 gets at least partially filled with sedatives and residue, it may cause the water pressure to drop in the shower head 4. Subsequently, the user may desire to replace the filter cartridge. The replacement of the filter cartridge may improve the water pressure. To achieve the above, the user switches from the active configuration into the second bypass configuration so that the water flow bypasses the filter 32 (and thus, the clogged filter cartridge). Then, the user replaces the filter cartridge. Those skilled in the art will understand that in the second bypass configuration, the user may replace the filter cartridge without the need to switch the shower filter system into the shut off configuration.

When the filter assembly is moved into the second bypass configuration, the valve 40 is moved into the non-filter configuration. Once the valve 40 is in the non-filter configuration, the valve channel 44 is aligned with the upstream portion 37A and the downstream portion 37B and the shower water flows directly through the body 41, through the inlet pipe 31 and onto the user. As mentioned above, the filter assembly may be moved between the second bypass configuration and the active configuration in a substantially similar manner as described above in relation to the filter assembly 110, which in turn moves the valve 40 between the non-filter configuration and the filter configuration, respectively.

Figure 9B:
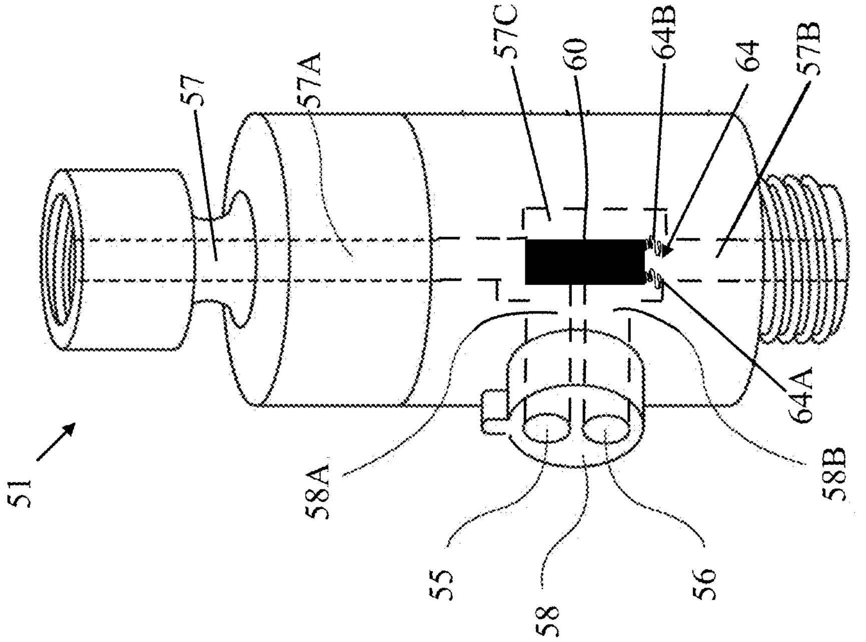
FIG. 9B shows a perspective view of a fourth exemplary embodiment of a connector of the shower filter system of FIG. 1.
Figure 9A:
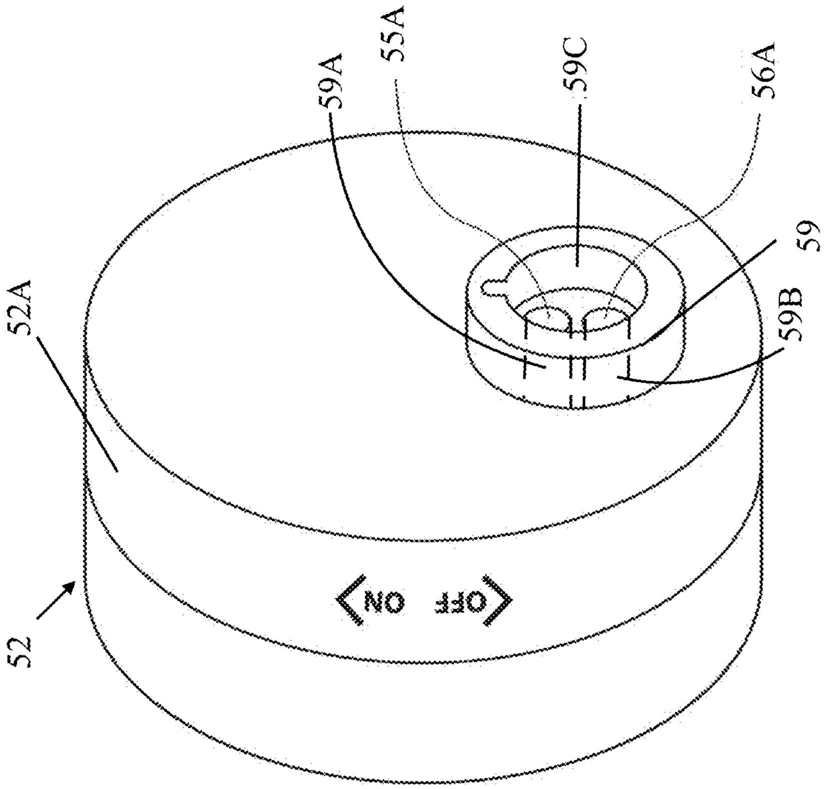
FIG. 9A shows a perspective view of a fourth exemplary embodiment of a filter of the shower filter system of FIG. 1.

FIGS. 9A-D show yet another exemplary embodiment according to the present disclosure of yet another filter assembly including an inlet pipe 51 and a filter 52. As shown in FIG. 9A, in the exemplary embodiment, the filter 52 is substantially similar to the filters 2, 22, 32. The filter 52 houses a filter cartridge (not shown) in a housing 52A. The housing 52A may be rotated to move the filter assembly from a second active configuration to a second bypass configuration. The filter 52 also includes a receptacle 59 having a cavity 59C sized and shaped to receive a spout 58 of the inlet pipe 51 in a similar manner as the receptacle 9 of the filter 2 receives the spout 8 of the inlet pipe 1. The receptacle 59 further includes a receptacle inlet channel 59A having a third opening 55A for receiving the shower water from the inlet pipe 51 and a receptacle outlet channel 59B having a fourth opening 56A for releasing the shower water into the inlet pipe 51, as will be described in further detail below.

As shown in FIG. 9B, in the exemplary embodiment, the inlet pipe 51 is substantially similar to the inlet pipes 1, 21, 31. The inlet pipe 51 includes an inlet pipe channel 57 for delivering the shower water from the water source to the user. The inlet pipe channel 57 includes an upstream portion 57A and a downstream portion 57B, through which the shower water flows onto the user. The inlet pipe 51 further includes the spout 58. The spout 58 includes a spout outlet channel 58A having a first opening 55 and a spout inlet channel 58B having a second opening 56. The spout outlet channel 58A receives the shower water from the upstream portion 57A while the spout inlet channel 58B delivers the shower water to the downstream portion 57B. The first opening 55 is sized and shaped to correspond to the third opening 55A and the second opening 56 is sized and shaped to correspond to the fourth opening 56A.

Figure 9D:
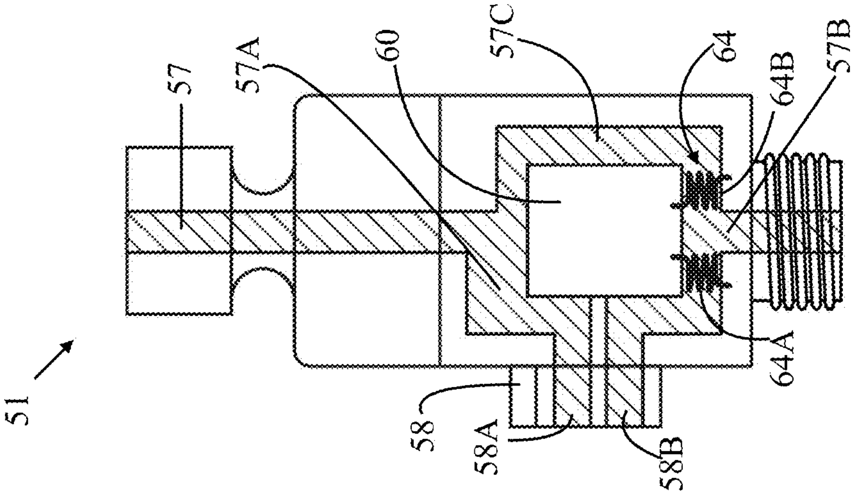
FIG. 9D shows a partially transparent side view of the connector of FIG. 9B in an bypass configuration.
Figure 9C:
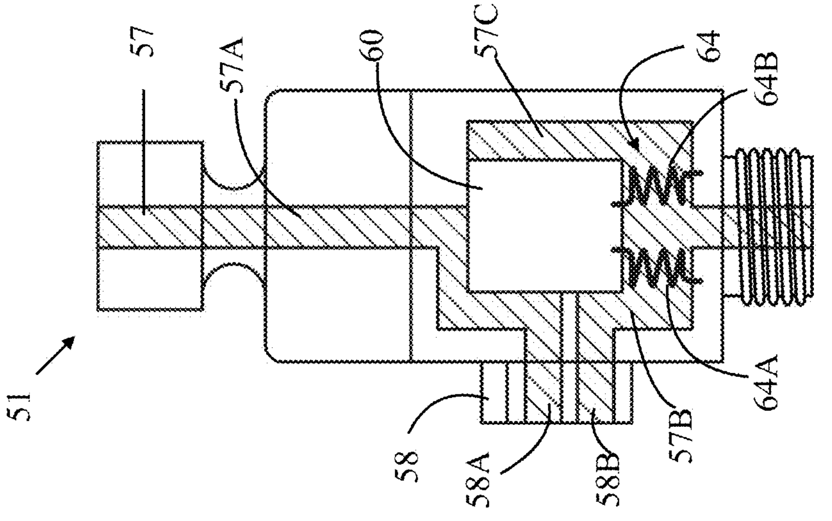
FIG. 9C shows a partially transparent side view of the connector of FIG. 9B in an active configuration.

As shown in FIGS. 9B-9D, the inlet pipe 51 includes a pressure valve 60 configured to move between a filter configuration and a non-filter configuration. In the exemplary embodiment, the pressure valve 60 includes a pressure mechanism 64 having a first spring 64A and a second spring 64B. However, in any further embodiments, the pressure valve 60 can be any water pressure valve activated by a pressure mechanism, the pressure mechanism could be at least one of a spring, retractable membrane or any other known means.

FIG. 9C shows the pressure valve 60 in the filter configuration. When the filter assembly is in the second active configuration, the pressure valve 60 is in the filter configuration and the first opening 55 aligns with the third opening 55A, diverting the water pressure and flow into the filter 52. In the filter configuration, the shower water naturally flows through the upstream portion 57A and into the filter cartridge. Accordingly, since all the shower water flows into the filter cartridge, there is minimum water pressure applied on the pressure valve 60. The minimum water pressure applied on the pressure valve 60 is below (i.e., less than) a predetermined threshold, thus, the first and second springs 64A, B extend and the pressure valve 60 remains in the filter configuration. In the filter configuration, as described above, the shower water passes through the upstream portion 57A, through the spout outlet channel 58A, through the receptacle inlet channel 59A and into the filter cartridge of the filter 52. Then, after the shower water is filtered in the filter cartridge, the now filtered shower water passes through the receptacle outlet channel 59B, through the spout inlet channel 58B and through the downstream portion 57B onto the user.

FIG. 9D shows the pressure valve 60 in the non-filter configuration. When the filter assembly is in the second bypass configuration, the pressure valve 60 is in the non-filter configuration and the first opening 55 is not aligned with the third opening 55A, therefore the water flow into the filter 52 is blocked. In the non-filter configuration, the shower water naturally flows through the upstream portion 57A toward the filter cartridge, however, since the first opening 55 and the third opening 55A are not aligned, the shower water pools and remains in the upstream portion 57A. Accordingly, since all the shower water pools in the upstream portion 57A and does not flow into the filter cartridge of the filter 52, there is a sufficient water pressure applied on the pressure valve 60. The sufficient water pressure applied on the pressure valve 60 is above (i.e., greater than) the predetermined threshold, thus the first and second springs 64A, B are depressed and the pressure valve 60 opens a bypass portion 57C of the inlet pipe channel 57. In the non-filter configuration, the shower water passes through the upstream portion 57A and into the bypass portion 57C, thus, bypassing the filter 52, the spout 58, the receptacle 59 and the filter cartridge, and the non-filtered shower water then flows through the downstream portion 57B onto the user.

In alternative exemplary embodiment, the receptacle 9, 29, 39, 59 may be situated within the housing 2A, 22A, 32A, 52A. In other words, the receptacle 9, 29, 39, 59 instead of extending outward from the housing 2A, 22A, 32A, 52A extends at least partially inward within the housing 2A, 22A, 32A, 52A.

In another alternative exemplary embodiment, the receptacle 9, 29, 39, 59 is a male connector while the spout 8, 28, 58 and the head 42 is a female connector.

Figure 10B:
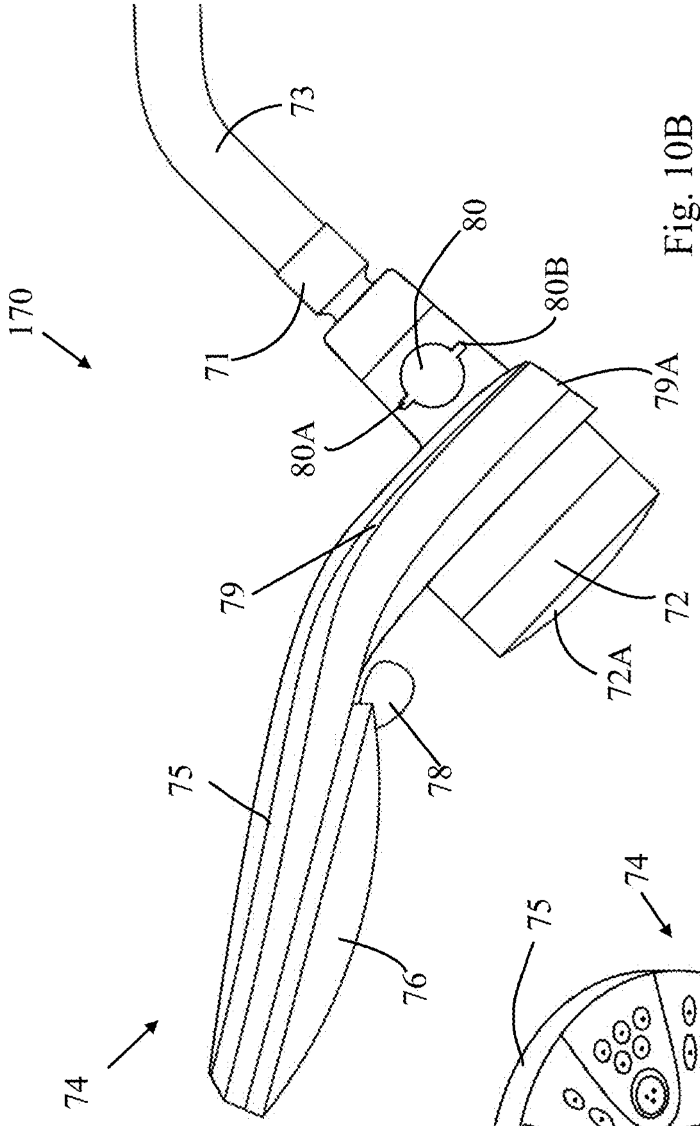
FIG. 10B shows a side view of the shower filter system of FIG. 10.
Figure 10A:
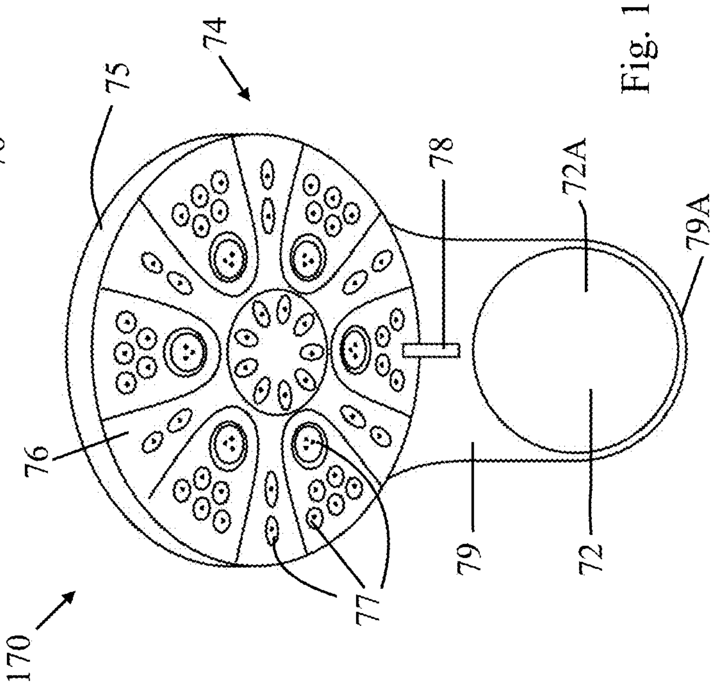
FIG. 10A shows a front view of a second exemplary embodiment of a shower filter system according to the present disclosure.

FIGS. 10A, B show a shower filter system 170 according to a second exemplary embodiment of the present disclosure, the shower filter system 170 including an inlet pipe 71 coupled to a shower arm 73, a filter 72, and a shower head 74. FIG. 10A shows a front view of the shower filter system 170. FIG. 10B shows a side view of the shower filter system 200.

The inlet pipe 71 is substantially similar to the previous embodiments of the inlet pipes as the inlet pipe 71 includes a spout (not shown) and an inlet pipe channel (not shown) extending from a first end of the inlet pipe 71 to a second end of the inlet pipe 71. The first end of the inlet pipe 71 is coupled to and extends from the shower arm 73, the shower arm 73 delivering the shower water from a water source into the inlet pipe 71 and the second end of the inlet pipe 71 is coupled to the filter 72 and the shower head 74. The inlet pipe channel includes an upstream portion and a downstream portion, the downstream portion having a filter outlet passage (not shown) and a non-filter passage (not shown). The filter outlet passage extends through the spout and connects with a receptacle inlet (not shown) of the filter 72. The non-filter outlet passage bypasses the filter 72 and connects with an inlet (not shown) of the shower head 74.

The filter 72 is substantially similar to the previous embodiments of the filters as the filter 72 includes a receptacle (not shown), a housing 72A and a filter cartridge (not shown) situated inside of the housing 72A. The receptacle of the filter 72 includes the receptacle inlet connecting to the filter outlet passage and a receptacle outlet connecting to the inlet of the shower head 74. In an exemplary embodiment, the housing 72A may include a first section coupled to a second section which may be separated to replace the filter cartridge situated therein. In a further exemplary embodiment, the housing 72A may be constructed as a single piece.

The shower head 74 includes a shower head inlet passage (not shown) extending partially therethrough, a head portion 75 having a face plate 76 with a plurality of nozzles 77 through which the shower water is dispersed onto the user. In an exemplary embodiment, the face plate 76 may be rotatable, such that rotation of the face plate 76 via a protrusion 78 controls which of the nozzles 77 disperse the shower water. The shower head 74 further includes a body portion 79 extending from the head portion 75 to a distal end 79A. The body portion 79 includes a cavity (not shown) sized and shaped to receive at least a portion of the filter 72 therein. When the portion of the filter 72 is inserted into the cavity, a receptacle (not shown) of the filter 72 remains open to receive a spout (not shown) of the inlet pipe 71. The receptacle of the filter 72 couples to the spout of the inlet pipe 71 in a substantially similar manner as the receptacle 9 of filter 2 couples to the spout 8 of the inlet pipe 1 of the shower filter system 100. In an exemplary embodiment, the nozzles 77 and the filter 72 are configured to be oriented in a predetermined direction (e.g., toward the user).

The shower filter system 170 is configured to move between an active configuration and a first bypass configuration via a configuration switch 80 coupled to or integrally formed with the inlet pipe 71. In the exemplary embodiment, the switch 80 may be rotated in a first direction (e.g., clockwise) from an initial position to a stop position to move the shower filter system 170 from the first bypass configuration to the active configuration. Similarly, the switch 80 may be rotated in a second direction (e.g., counterclockwise) from the stop initial position to the initial position to move the shower filter system 170 from the active configuration to the first bypass configuration. In an exemplary embodiment, similar to the shower filter system 170, the shower filter system 170 may have at least a tactile feedback and/or an audible feedback to notify the user that the switch 80 was properly rotated until the stop position. In an exemplary embodiment, the switch 80 may have a first protrusion 80A extending from a first end of the switch 80 and a second protrusion 80B extending from a second end of the switch 80, the first and second protrusions 80A, 80B configured to be gripped by the user when rotating the switch 90 between the active configuration and the first bypass configuration.

In an exemplary embodiment, when the shower filter system 170 is in the first bypass configuration, the shower water flows through the upstream portion of the pipe channel, through the non-filter outlet passage of the downstream portion of the pipe channel, through the inlet of the shower head 74, through the shower head inlet passage of the shower head 74 and onto the user. When the shower filter system 170 is in the active configuration, the shower water flows through the upstream portion of the pipe channel, through the filter outlet passage of the downstream portion of the pipe channel and through the receptacle inlet into the filter cartridge of the filter 72. After the shower water is filtered, the now filtered shower water flows out of the filter cartridge, through the receptacle outlet and then through the inlet of the shower head 74, through the shower head inlet passage of the shower head 74 and onto the user.

Figure 11A:
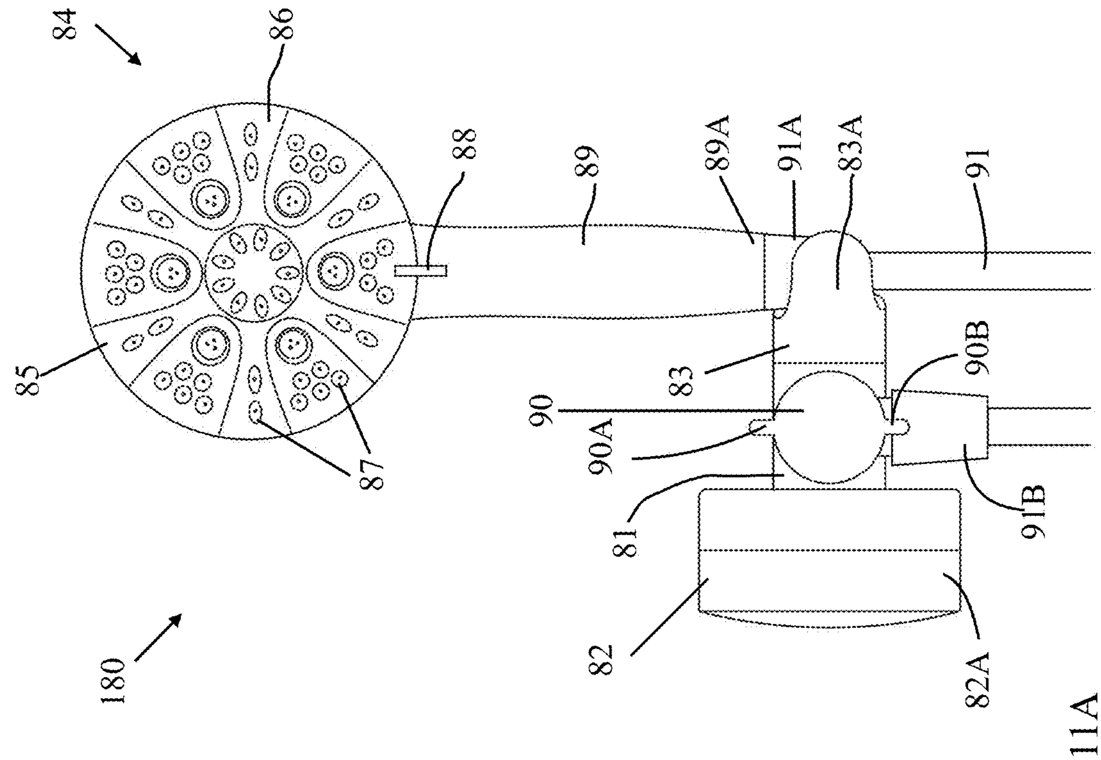
FIG. 11A shows a front view of a third exemplary embodiment of a shower filter system according to the present disclosure.
Figure 11C:
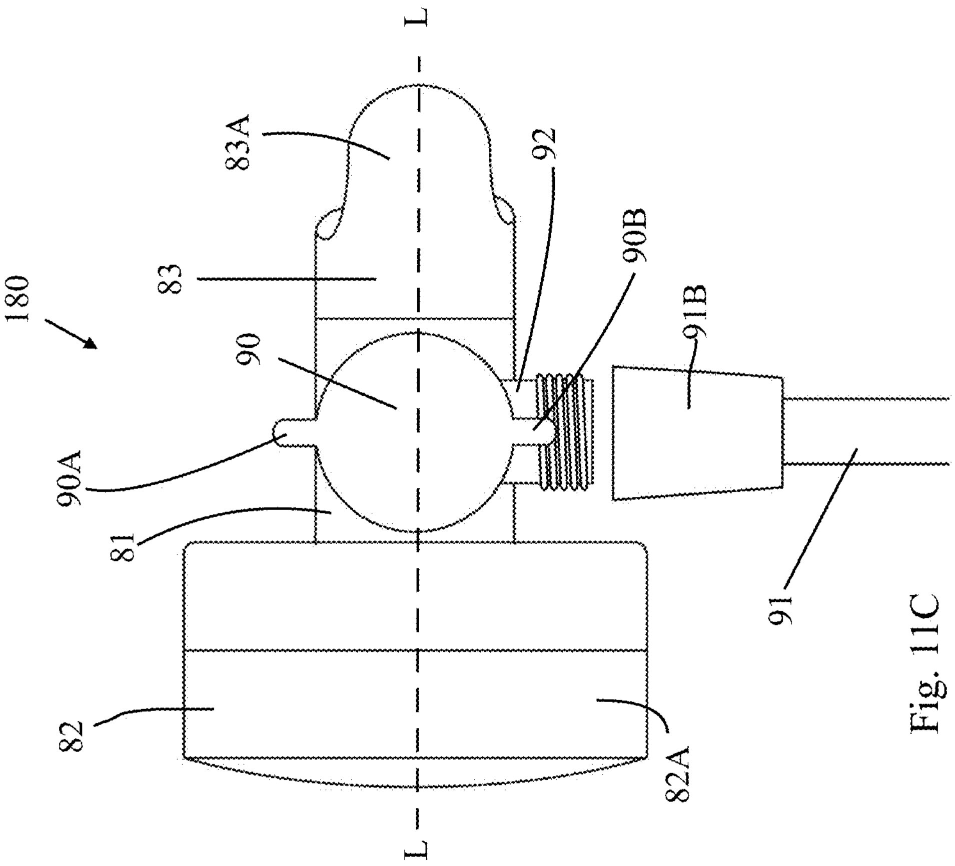
FIG. 11C shows a front view of the inlet pipe, the filter, and the shower head holder configuration of FIG. 11B.
Figure 11B:
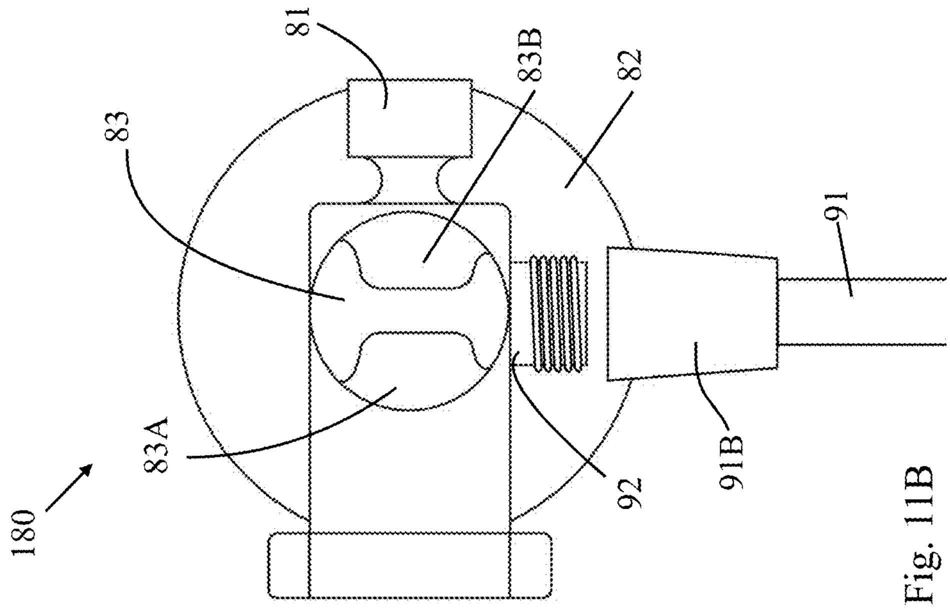
FIG. 11B shows a side view of an inlet pipe, a filter, and a shower head holder configuration of the filter system of FIG. 11A.

FIGS. 11A-C show a shower filter system 180 according to a third exemplary embodiment of the present disclosure, the shower filter system 180 including an inlet pipe 81, a filter 82, a shower head holder 83, a hand shower 84, and a configuration switch 90. FIG. 11A shows a front view of the shower filter system 180. FIG. 11B shows a side view of the inlet pipe 81, the filter 82 and the holder 83 of the shower filter system 200. FIG. 11C shows a front view of the inlet pipe 81, the filter 82 and the holder 83 of the shower filter system 200.

The inlet pipe 81 is substantially similar to the previous embodiments of the inlet pipes as the inlet pipe 81 includes a spout (not shown) and an inlet pipe channel (not shown) extending from an upstream end of the inlet pipe 81 coupled to the water source to a downstream end of the inlet pipe 81 coupled to the filter 82. As opposed to the previous embodiments of the inlet pipes, the inlet pipe 81 includes a connector 92 configured to be coupled to a shower hose 91. The inlet pipe channel includes an upstream portion and a downstream portion, the downstream portion having a filter outlet passage (not shown) and a non-filter passage (not shown). The filter outlet passage extends through the spout and connects with a receptacle inlet (not shown) of the filter 82. The non-filter outlet passage extends through the connector 92, bypasses the filter 82 and connects with a lumen of the shower hose 91, the lumen extending until an inlet (not shown) of the hand shower 84.

The filter 82 is substantially similar to the previous embodiments of the filters as the filter 82 includes a receptacle (not shown), a housing 82A and a filter cartridge (not shown) situated inside of the housing 82A. The receptacle of the filter 82 includes the receptacle inlet connecting to the filter outlet passage and a receptacle outlet connecting to the inlet of the hand shower 84. In an exemplary embodiment, the housing 82A may include a first section coupled to a second section which may be separated to replace the filter cartridge situated therein. In a further exemplary embodiment, the housing 82A may be constructed as a single piece. The receptacle of the filter 82 couples to the spout of the inlet pipe 81 in a substantially similar manner as the receptacle 9 of filter 2 couples to the spout 8 of the inlet pipe 1 of the shower filter system 100.

Similar to the shower head 74, the hand shower 84 includes a shower head inlet passage (not shown) extending partially therethrough, a head portion 85 having a face plate 86 with a plurality of nozzles 87 through which the shower water is dispersed onto the user. In an exemplary embodiment, the face plate 86 may be rotatable, such that rotation of the face plate 86 via a protrusion 88 controls which of the nozzles 87 disperse the shower water. The hand shower 84 further includes a handle portion 89 extending from the head portion 85 to a distal end 89A. The distal end 89A is configured to be coupled to a first end 91A of the shower hose 91 via any coupling mechanism known to one with ordinary skills in the art (e.g., a threading) and a second end 91B of the shower hose 91 is configured to be coupled to the connector 92 of the inlet pipe 81 via a similar coupling mechanism (e.g., a threading). The first end 91A of the shower hose 91 is further sized and shaped to be inserted into the holder 83, such that, when the first end 91A is inserted into the holder 83, a first finger 83A and a second finger 83B of the holder 83 tightly squeeze the first end 91A to hold the handle portion 89 in place relative to the inlet pipe 81.

In an exemplary embodiment, the holder 83 may be configured to be rotatable about a longitudinal axis L of the inlet pipe 81, the longitudinal axis L extending from a first end of the inlet pipe 81 to a second end of the inlet pipe 81. As shown in FIGS. 11A-C, the holder 83 is coupled to the first end of the inlet pipe 81, the filter 82 is coupled to the second end of the inlet pipe 81 and a configuration switch 90 is coupled to the inlet pipe 81 in between the filter 82 and the holder 83. In the exemplary embodiment, the holder 83 may rotate a predetermined number of degrees (e.g., 5 degrees, degrees, 30 degrees, 45 degrees, etc.) in a direction (e.g., clockwise, counterclockwise) each time the user rotates the holder 83 to adjust an angle of the hand shower 84. In another exemplary embodiment, the holder 83 may have a locking mechanism to lock a rotation of the holder 83 relative to the inlet pipe 81. In a further exemplary embodiment, the holder 83 may pivot about the first end of the inlet pipe 81. Additionally, although the holder 83 is described in the embodiment as having the fingers 83A, 83B, in a further embodiment, the holder 83 may be another coupling mechanism configured to be rotatable such that the angle of the hand shower 84 may change relative to the user.

The shower filter system 180 is configured to move between an active configuration and a first bypass configuration via the switch 90 coupled to or integrally formed with the inlet pipe 81. In the exemplary embodiment, the switch 90 may be rotated in a first direction (e.g., clockwise) from an initial position to a stop position to move the shower filter system 180 from the first bypass configuration to the active configuration. Similarly, the switch 90 may be rotated in a second direction (e.g., counterclockwise) from the stop initial position to the initial position to move the shower filter system 180 from the active configuration to the first bypass configuration. In an exemplary embodiment, similar to the shower filter system 180, the shower filter system 180 may have at least a tactile feedback and/or an audible feedback to notify the user that the switch 90 was properly rotated until the stop position. In an exemplary embodiment, the switch 90 may have a first protrusion 90A extending from a first end of the switch 90 and a second protrusion 90B extending from a second end of the switch 90, the first and second protrusions 90A, 90B configured to be gripped by the user when rotating the switch 90 between the active configuration and the first bypass configuration.

In an exemplary embodiment, when the shower filter system 180 is in the first bypass configuration, the shower water flows through the upstream portion of the pipe channel, through the non-filter outlet passage of the downstream portion of the pipe channel, through the lumen of the shower hose 91, through the inlet of the hand shower 84, through the shower head inlet passage of the hand shower 84 and onto the user. When the shower filter system 180 is in the active configuration, the shower water flows through the upstream portion of the pipe channel, through the filter outlet passage of the downstream portion of the pipe channel and through the receptacle inlet into the filter cartridge of the filter 82. After the shower water is filtered, the now filtered shower water flows out of the filter cartridge, through the receptacle outlet, through the lumen of the shower hose 91 and then through the inlet of the hand shower 84, through the shower head inlet passage of the hand shower 84 and onto the user.

Figures 12A, 12B, 12C:
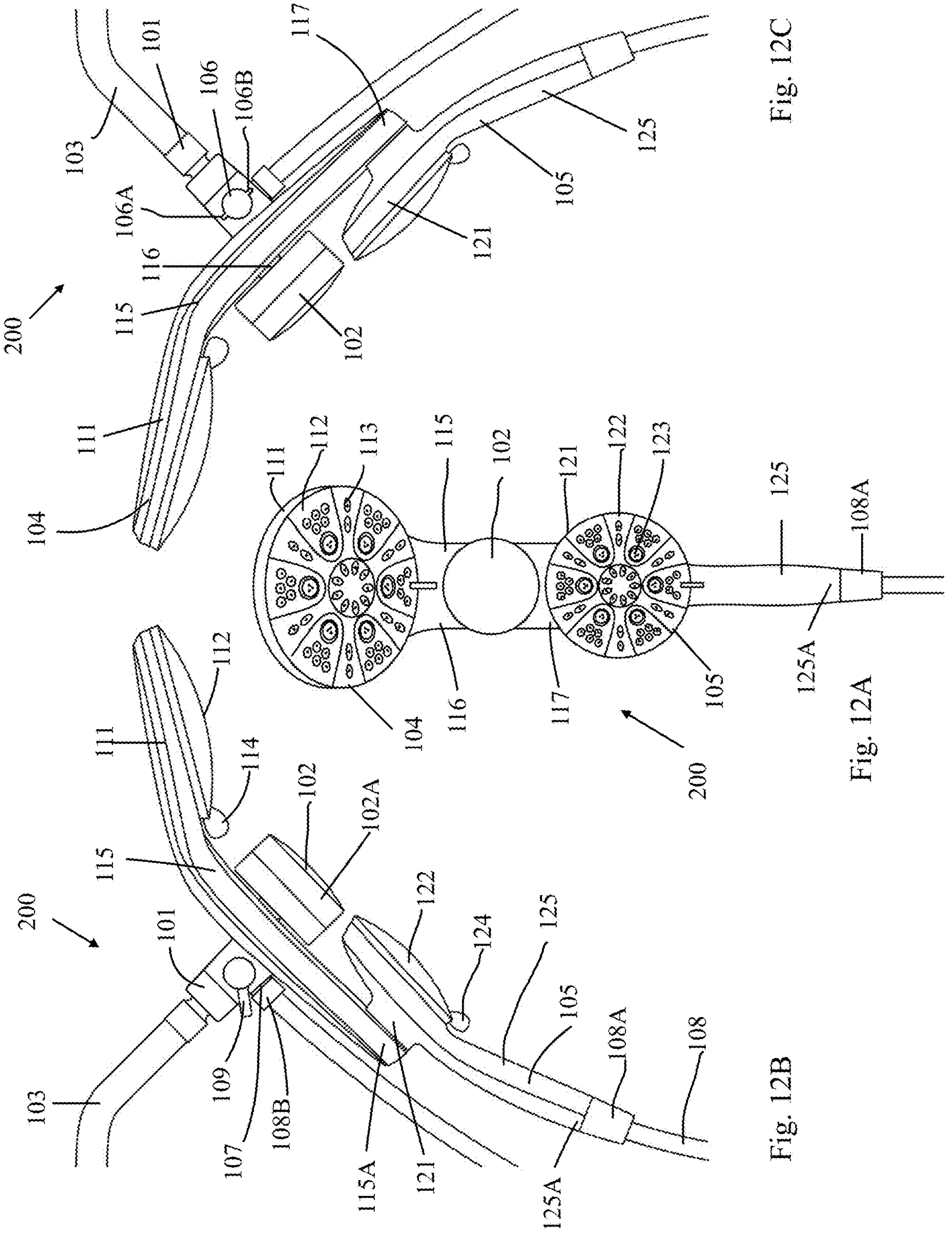
FIG. 12A shows a front view of a fourth exemplary embodiment of a shower filter system according to the present disclosure.
FIG. 12B shows a first side view of the filter system of FIG. 12A.
FIG. 12C shows a second side view of the filter system of FIG. 12A.

FIGS. 12A-C show a shower filter system 200 according to a fourth exemplary embodiment of the present disclosure, the shower filter system 200 including an inlet pipe 101 coupled to a shower arm 103, a filter 102, a shower head 104, a magnetic hand shower 105, a configuration switch 106 and a diverter switch 109. FIG. 12A shows a front view of the shower filter system 200. FIG. 12B shows a first side view of the shower filter system 200. FIG. 12C shows a second side view of the shower filter system 200.

The inlet pipe 101 is substantially similar to the previous embodiments of the inlet pipes as the inlet pipe 101 includes a spout (not shown), an inlet pipe channel (not shown) extending from a first end of the inlet pipe 101 to a second end of the inlet pipe 101 and a connector 107 configured to be coupled to a shower hose 108. The first end of the inlet pipe 101 is coupled to and extends from the shower arm 103, the shower arm 103 delivering the shower water from a water source into the inlet pipe 101 and the second end of the inlet pipe 101 is coupled to the filter 102 and the shower head 104. The inlet pipe channel includes an upstream portion and a downstream portion, the downstream portion having a filter outlet passage (not shown) and a non-filter passage (not shown). The filter outlet passage extends through the spout and connects with a receptacle inlet (not shown) of the filter 102. The non-filter outlet passage separates into a first non-filter outlet passage (not shown) and a second non-filter outlet passage (not shown). The first non-filter outlet passage bypasses the filter 102 and extends into an inlet (not shown) of the shower head 104. The second non-filter outlet passage extends through the connector 107, bypasses the filter 102 and connects with a lumen of the shower hose 108, the lumen extending until an inlet (not shown) of the magnetic hand shower 105.

The filter 102 is substantially similar to the previous embodiments of the filters as the filter 102 includes a receptacle (not shown) having the receptacle inlet, a housing 102A and a filter cartridge (not shown) situated inside of the housing 102A. The receptacle of the filter 102 includes the receptacle inlet connecting to the filter outlet passage and a receptacle outlet connecting to a split that separates into a first filtered passage (not shown) and a second filtered passage (not shown). The first filtered passage connects to the inlet of the shower head 104 and directs the filtered shower water into the shower head 104. The second filtered passage connects with the lumen of the shower hose 108, the lumen extending until the inlet of the magnetic hand shower 105 and directs the filtered shower water into the magnetic hand shower 105. In an exemplary embodiment, the housing 102A may include a first section coupled to a second section which may be separated to replace the filter cartridge situated therein. In a further exemplary embodiment, the housing 102A may be constructed as a single piece. The receptacle of the filter 102 couples to the spout of the inlet pipe 101 in a substantially similar manner as the receptacle 9 of filter 2 couples to the spout 8 of the inlet pipe 1 of the shower filter system 100.

The shower head 104 includes a shower head inlet passage (not shown) extending partially therethrough, a head portion 111 having a face plate 112 with a plurality of nozzles 113 through which the shower water is dispersed onto the user. In an exemplary embodiment, the face plate 112 may be rotatable, such that rotation of the face plate 112 via a protrusion 114 controls which of the nozzles 113 disperse the shower water. The shower head 104 further includes a body portion 115 extending from the head portion 111 to a distal end 115A. The body portion 115 includes a proximal portion 116 below the head portion 111 and a distal portion 117 below the proximal portion 116. The proximal portion 116 includes a cavity (not shown) sized and shaped to receive at least a portion of the filter 102 therein. When the portion of the filter 102 is inserted into the cavity, a receptacle (not shown) of the filter 102 remains open to receive a spout (not shown) of the inlet pipe 101. The receptacle of the filter 102 couples to the spout of the inlet pipe 101 in a substantially similar manner as the receptacle 9 of filter 2 couples to the spout 8 of the inlet pipe 1 of the shower filter system 100. The distal portion 117 includes a coupling mechanism (e.g., bracket, opening, magnets, etc.) configured to couple to a rear of the magnetic hand shower 105 to keep the magnetic hand shower 105 in place relative to the shower head 104. In a further exemplary embodiment, the shower head 104 may rotate relative to the inlet pipe 101 and/or pivot about the inlet pipe 101.

Similar to the hand shower 84, the magnetic hand shower 105 includes a head portion 121 having a face plate 122 with a plurality of nozzles 123 through which the shower water is dispersed onto the user. In an exemplary embodiment, the face plate 122 may be rotatable, such that rotation of the face plate 122 via a protrusion 124 controls which of the nozzles 123 disperse the shower water. The magnetic hand shower 105 further includes a handle portion 125 extending from the head portion 121 to a distal end 125A. The distal end 125A is configured to be coupled to a first end 108A of the shower hose 108 via any coupling mechanism known to one with ordinary skills in the art (e.g., a threading) and a second end 108B of the shower hose 108 is configured to be coupled to the connector 107 of the inlet pipe 101 via a similar coupling mechanism (e.g., a threading).

The shower filter system 200 is configured to move between an active configuration and a first bypass configuration via the configuration switch 106 coupled to or integrally formed with the inlet pipe 101. In the exemplary embodiment, the configuration switch 106 may be rotated in a first direction (e.g., clockwise) from an initial position to a stop position to move the shower filter system 200 from the first bypass configuration to the active configuration. Similarly, the configuration switch 106 may be rotated in a second direction (e.g., counterclockwise) from the stop initial position to the initial position to move the shower filter system 200 from the active configuration to the first bypass configuration. In an exemplary embodiment, similar to the shower filter system 180, the shower filter system 200 may have at least a tactile feedback and/or an audible feedback to notify the user that the configuration switch 106 was properly rotated until the stop position. In an exemplary embodiment, the configuration switch 106 may have a first protrusion 106A extending from a first end of the configuration switch 106 and a second protrusion 106B extending from a second end of the configuration switch 106, the first and second protrusions 106A, 106B configured to be gripped by the user when rotating the configuration switch 106 between the active configuration and the first bypass configuration.

The diverter switch 109 may be any diverter switch known to one skilled in the arts for regulating the flow of shower water between the shower head 104 and the magnetic hand shower 105. When the diverter switch 109 is in a shower head configuration, the shower water, regardless of whether the shower water is filtered or non-filtered, is diverted to the shower head 104. When the diverter switch 109 is in a hand shower configuration, the shower water, regardless of whether the shower water is filtered or non-filtered, is diverted to the magnetic hand shower 105. When the diverter switch 109 is in a combination configuration, the shower water (regardless of whether the shower water is filtered or non-filtered) is diverted to the shower head 104 and the magnetic hand shower 105.

In an exemplary embodiment, when the shower filter system 200 is in the first bypass configuration and the diverter switch 109 is in the shower head configuration, the shower water flows through the upstream portion of the pipe channel, through the non-filter outlet passage of the downstream portion of the pipe channel, through the inlet of the shower head 104, through the shower head inlet passage of the shower head 104 and onto the user. When the shower filter system 200 is in the active configuration and the diverter switch 109 is in the shower head configuration, the shower water flows through the upstream portion of the pipe channel, through the non-filter outlet passage of the downstream portion of the pipe channel and through the receptacle inlet into the filter cartridge of the filter 102. After the shower water is filtered, the now filtered shower water flows out of the filter cartridge, through the receptacle outlet, through the split, through the first filtered passage and then through the inlet of the shower head 104, through the shower head inlet passage of the shower head 104 and onto the user.

In an exemplary embodiment, when the shower filter system 200 is in the first bypass configuration and the diverter switch 109 is in the hand shower configuration, the shower water flows through the upstream portion of the pipe channel, through the non-filter outlet passage of the downstream portion of the pipe channel, through the lumen of the shower hose 108, through the inlet of the magnetic hand shower 105, through the shower head inlet passage of the magnetic hand shower 105 and onto the user. When the shower filter system 200 is in the active configuration and the diverter switch 109 is in the hand shower configuration, the shower water flows through the upstream portion of the pipe channel, through the filter outlet passage of the downstream portion of the pipe channel and through the receptacle inlet into the filter cartridge of the filter 102. After the shower water is filtered, the now filtered shower water flows out of the filter cartridge, through the receptacle outlet, through the split, through the second filtered passage, through the lumen of the shower hose 108 and then through the inlet of the magnetic hand shower 105, through the shower head inlet passage of the magnetic hand shower 105 and onto the user.

In an exemplary embodiment, when the shower filter system 200 is in the first bypass configuration and the diverter switch 109 is in the combination configuration, the shower water flows through the upstream portion of the pipe channel, through the non-filter outlet passage of the downstream portion of the pipe channel, and through to both the shower head 104 and the magnetic hand shower 105 as described above. When the shower filter system 200 is in the active configuration and the diverter switch 109 is in the combination configuration, the shower water flows through the upstream portion of the pipe channel, through the filter outlet passage of the downstream portion of the pipe channel and through to both the shower head 104 and the magnetic hand shower 105 as described above.

Figure 13:
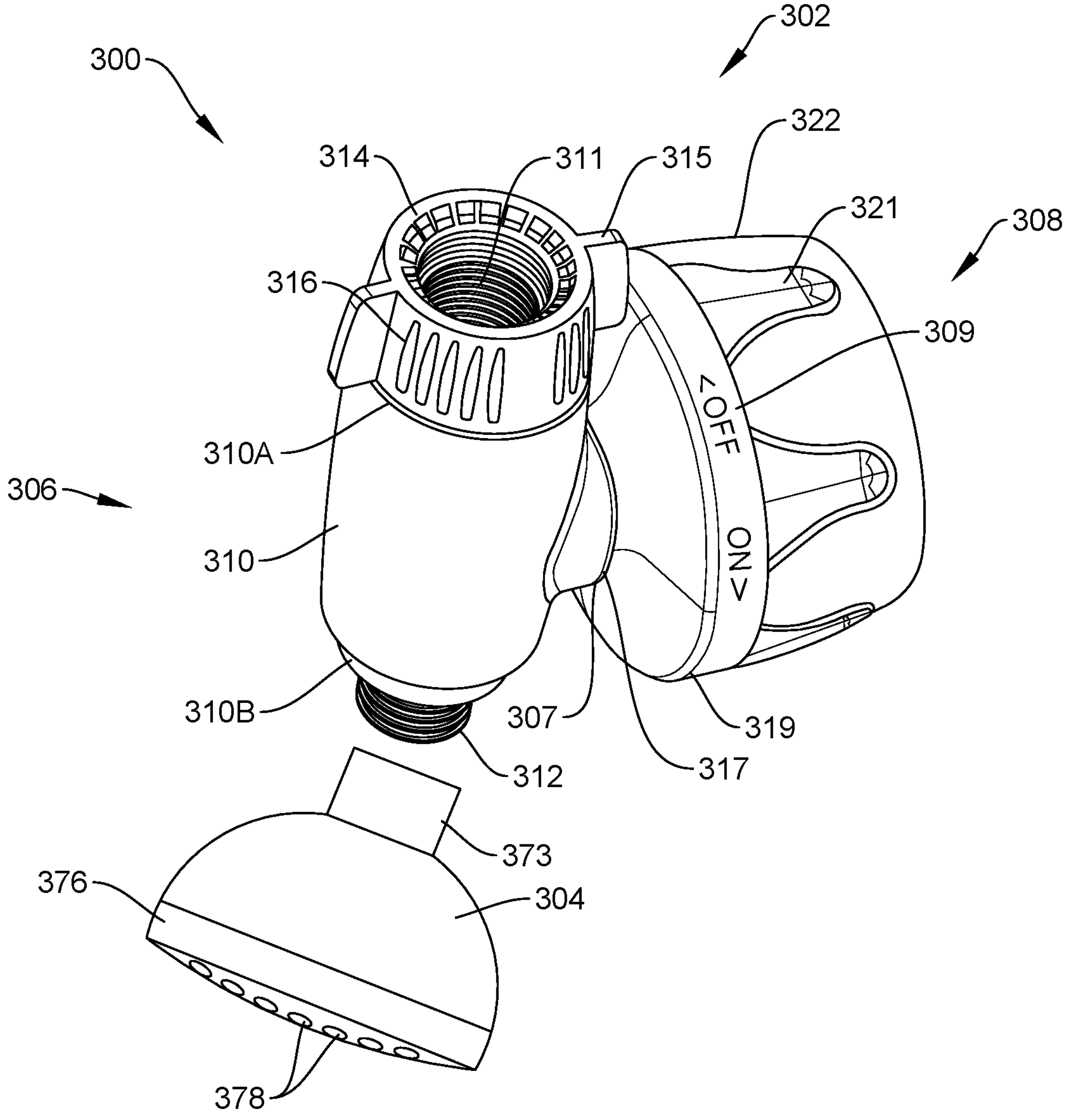
FIG. 13 shows a perspective view of a fifth exemplary embodiment of a shower filter system according to the present disclosure.

FIGS. 13-21 show a shower filter system 300 according to a fifth exemplary embodiment of the present disclosure. The shower filter system 300 may operate in an active configuration (e.g., filtered water flows through the shower filter system 300) and in a bypass configuration (e.g., unfiltered water flows through the shower filter system 300 without entering a filter). FIG. 13 shows a perspective view of the shower filter system 300. The shower filter system 300 may include a filter assembly 302 and a water dispersing arrangement (e.g., a shower head 304). The filter assembly 302 may include an inlet pipe 306 and a filter 308.

The inlet pipe 306 of the filter assembly 302 includes a body 310, a first plug 311 and a second plug. The body 310 extends from a first end 310A to a second end 310B. The first plug 311 is inserted into the body 310, such that a portion thereof extends past the first end 310A of the body 310. The second plug 312 is inserted into the body 310, such that a portion thereof extends past the second end 310B of the body 310. The first plug 311 is connectable to a water source (e.g., a shower arm) via any method known to one skilled in the art (e.g., a threading connection). The second plug 312 is connectable to a coupling end 373 of the shower head 304 via any method known to one skilled in the art (e.g., a threading connection). In the exemplary embodiment, the filter assembly 302 may further include a nut 314 couplable to the first plug 311. The nut 314 may include at least one wing 315 and a plurality of ridges 316 for tightening the inlet pipe 306 to the water source. Although the exemplary embodiment discloses the nut 314 having a pair of wings 315, in a further embodiment, the nut 314 may include more or less than two wings 315. The shower head 304 may include a front face plate 376 having a plurality of nozzles 378 through which shower water is dispersed at a user.

Figure 14:
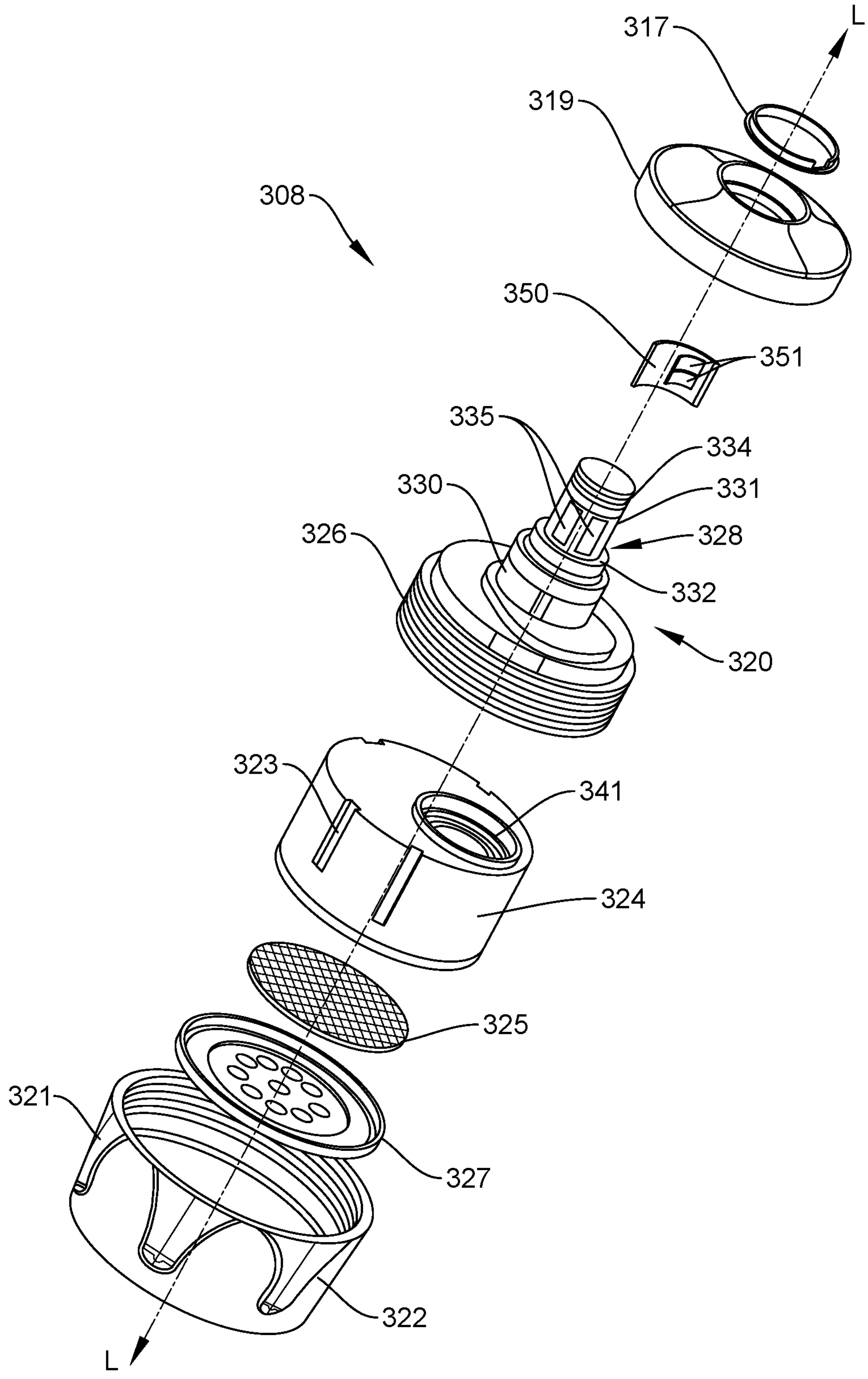
FIG. 14 shows an exploded view a filter of the shower filter system of FIG. 13.
Figure 15:
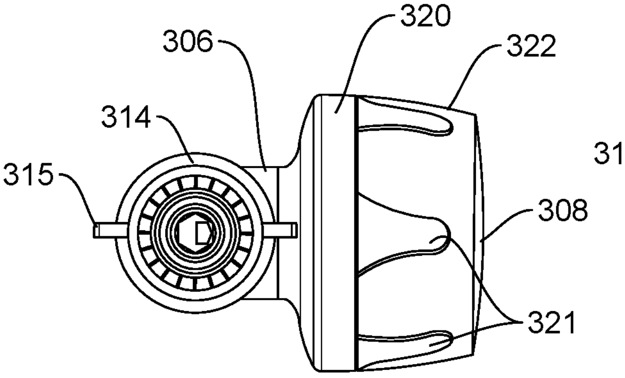
FIG. 15 shows a top view of a filter assembly of the shower filter system of FIG. 13.
Figure 16:
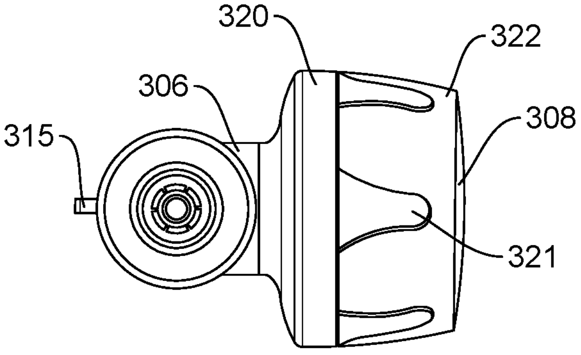
FIG. 16 shows a bottom view of the filter assembly of FIG. 15.
Figure 17:
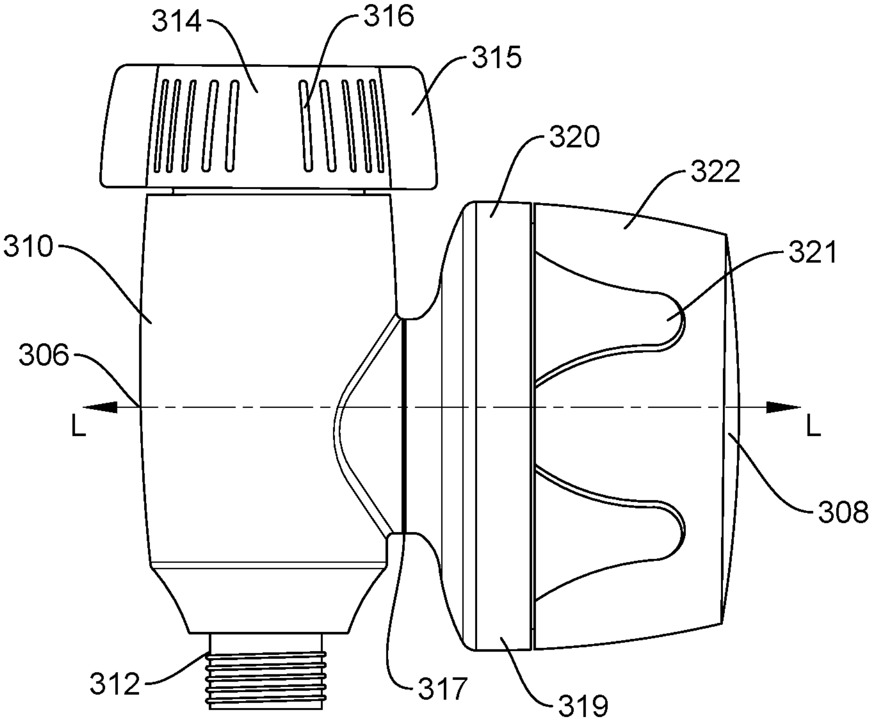
FIG. 17 shows a side view of the filter assembly of FIG. 15.

The filter 308 of the filter assembly 302, as shown in FIG. 14, may include a connector 320, a detachable housing 322, and a filter cartridge 324 configured to be housed between the connector 320 and the detachable housing 322. As will be described in greater detail below, the connector 320 is configured to lock relative to the inlet pipe 306 and rotate about a longitudinal axis L thereof. The detachable housing 322 is configured to connect to the connector 320 via any conventional method known to one skilled in the art (e.g., threading, snapping, locking and fitting), such that the detachable housing 322 may be separated from the connector 320 by the user to replace the filter cartridge 324 housed therein. In an alternative exemplary embodiment, the connector 320 and the detachable housing 322 may be constructed as a single piece (not shown). In the exemplary embodiment, the detachable housing 322 may include a plurality of protrusions 321 extending about a circumference thereof for the user to grip the detachable housing 322. The plurality of protrusions 321 may be composed of or covered by an anti-slip material. In addition, the plurality of protrusions 321 may be composed of an antimicrobial material. A remaining portion of the detachable housing 322 may be composed of or covered by an anti-slip material and/or an antimicrobial material. In the exemplary embodiment, the filter cartridge 324 may be integrally formed with a filter net 325 and a filter cover 327.

The connector 320 is configured to be inserted into the inlet pipe 306 via an opening 307 such that a seal is formed between the inlet pipe 306 and the filter 308 to prevent the water from leaking out through the opening 307. In the exemplary embodiment, the filter 308 may further include a ring 317 to form the seal between the inlet pipe 306 and the filter 308 and a base plate 319 to cover a portion of the connector 320 extending outwardly from the opening 307 of the inlet pipe 306. Further, the connector 320 and the base plate 319 may be integrally formed with the inlet pipe 306 so that the connector 320 may rotate relative to the inlet pipe 306, but the connector 320 may not be separated from the inlet pipe 306 (e.g., the spout 328 may not be removed from the inlet pipe 306).

As shown in FIGS. 14 and 18-21, the connector 320 includes a receiving portion 326 and a spout 328. The receiving portion 326 is configured to receive at least a portion of the filter cartridge 324 therein. The filter cartridge 324 may include a plurality of grooves 323 sized and shaped to slide over a plurality of protrusions (not shown) extending along an interior portion of the receiving portion 326 to guide the filter cartridge 324 into the receiving portion 326. When the filter cartridge 324 is received in the receiving portion 326 and the detachable housing 322 is coupled to the connector 320, a filter cartridge surrounding channel 344 is formed (see FIG. 18). In the exemplary embodiment, when the detachable housing 322 is not coupled to the connector 320, the user may slide the filter cartridge 324 along the longitudinal axis L to insert and remove the filter cartridge 324 from the receiving portion 326. In a further embodiment, the filter cartridge 324 may be fixed relative to the receiving portion 326 via a locking mechanism (e.g., tabs, snap-fit, etc.). In the exemplary embodiment, the spout 328 extends from the receiving portion 326, however, in a further embodiment, the receiving portion 326 may be couplable to the spout 328 via a coupling mechanism.

As shown in FIGS. 14 and 18-21, the spout 328 includes an enlarged diameter portion 330, a reduced diameter portion 332 and a grooved lip portion 334. The enlarged diameter portion 330 protrudes longitudinally outward from the receiving portion 326. The enlarged diameter portion 330 includes a filter inlet channel 342, a valve 345, and a filter outlet channel 346. The filter inlet channel 342 directs unfiltered water into the filter cartridge 324 via the filter cartridge surrounding channel 344. The valve 345 connects the filter outlet channel 346 to a mouth 341 of the filter cartridge 324 so that the now filtered water may flow out of the filter cartridge 324 into the filter outlet channel 346. In the exemplary embodiment, the valve 345 may be a one-way pressure valve configured to open when a pressure of the filtered water exiting the filter cartridge 324 through the mouth 341 is above a predetermined threshold. In other words, when the pressure of the filtered water is above the predetermined threshold, the valve 345 opens and the filtered water travels into the filter outlet channel 346.

The reduced diameter portion 332 includes a spout channel 340 extending therethrough, the spout channel 340 being couplable to the filter inlet channel 342 of the enlarged diameter portion 330. The reduced diameter portion 332 further includes a pair of spout input holes 335 extending through a wall thereof, the spout input holes 335 opening into the spout channel 340. The spout 328 further includes a washer 350 fixed relative to the inlet pipe 306 and configured to slide along an outside surface 331 of the reduced diameter portion 332. The washer 350 includes a pair of washer holes 351 openable to the spout input hole 335 and the spout channel 340. Although the exemplary embodiment discloses the spout 328 having two spout input holes 335, in a further embodiment, the spout 328 may include more than or less than two spout input holes 335. Similarly, although the exemplary embodiment discloses the washer 350 having two washer holes 351, in a further embodiment, the washer 350 may include more than or less than two washer holes 351.

In a further exemplary embodiment, the reduced diameter portion 332 may include a spout inlet channel extending therethrough and a spout outlet channel extending therethrough. The spout inlet channel and the spout outlet channel may be separated by a wall. The spout inlet channel may be coupled to the filter inlet channel 342 of the enlarged diameter portion 330 to guide the unfiltered shower water into the filter cartridge 324. The spout outlet channel may be coupled to the filter outlet channel 346 of the enlarged diameter portion 330 to guide the filtered shower water out of the filter cartridge 324 and onto the user.

The grooved lip portion 334 is couplable to a locking piece 333 (e.g., a bolt) of the inlet pipe 306 that prevents the spout 328 from sliding along the longitudinal axis L. The locking piece 333, however, does not prevent the spout 328 from rotating about the longitudinal axis L when the user exerts a clockwise or counter-clockwise force on the detachable housing 322. In the exemplary embodiment, a portion of the locking piece 333 is configured to be inserted into a groove of the grooved lip portion 334 to lock the spout 328. In a further embodiment, the spout 328 may be coupled to the locking piece 333 in a different configuration.

FIGS. 17-21 show the filter assembly 302 with the inlet pipe 306 coupled to the filter 308. The filter assembly 302 may be configured to be in an active configuration (e.g., when the shower water gets filtered by the filter cartridge 324 of the filter 308) and a bypass configuration (e.g., when the shower water is not filtered and bypasses the filter cartridge 324 of the filter 308). To move the filter assembly 302 from the bypass configuration into the active configuration, the filter 308 may be rotated in a first direction (e.g., clockwise) from an initial position to a stop position. The filter 308 may have at least a tactile feedback and/or an audible feedback to notify the user that the filter 308 was properly rotated until the stop position.

To switch the filter assembly 302 into the bypass configuration, the filter 308 may be rotated in a second direction (e.g., counterclockwise) from the stop position back to the initial position or an intermediary position. Each of the bypass and active configurations of the filter assembly 302 may include a corresponding indicative. For example, the indicative may be a printed on or glued on label, an engraving, a light, a sound beep, or any other means known in the art to show configurations and/or directions. In an exemplary embodiment, the filter 308 contains a label 309 on the detachable housing 322, the label 309 including an "OFF" position, in which the filter assembly 302 is in the bypass configuration, and an "ON" position, in which the filter assembly 302 is in the active configuration. In further exemplary embodiments, the label 309 may including words such as "ACTIVE", "BYPASS", "FILTER," among other words that indicate a configuration of the filter assembly 302.

Figure 19:
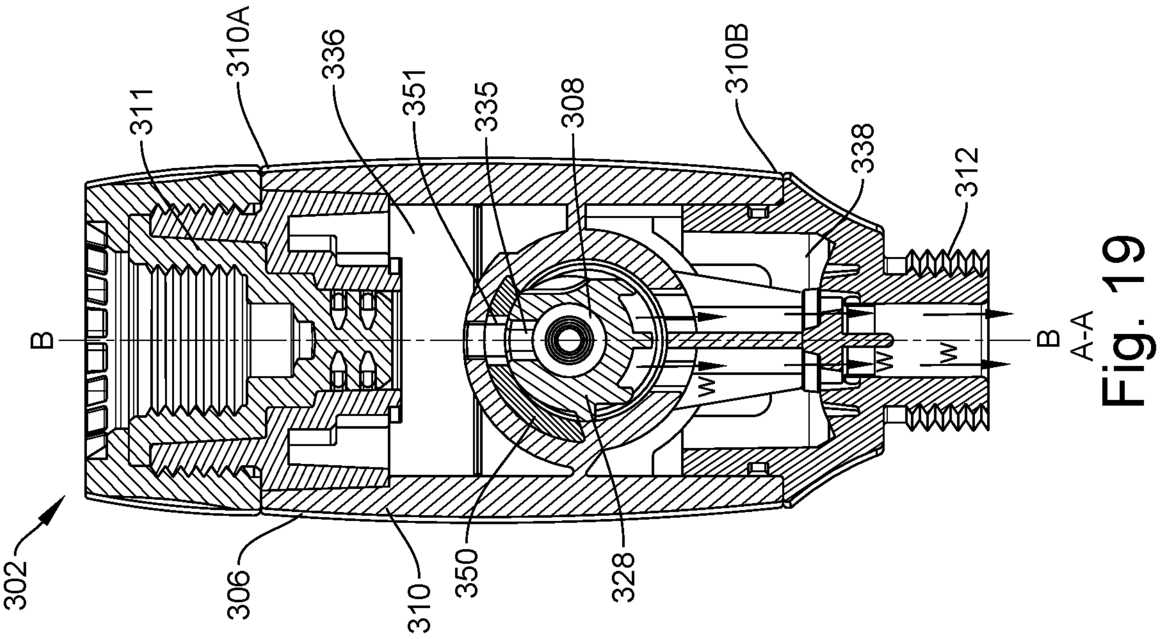
FIG. 19 shows a second cross section of the filter assembly of FIG. 15 in an active configuration.
Figure 18:
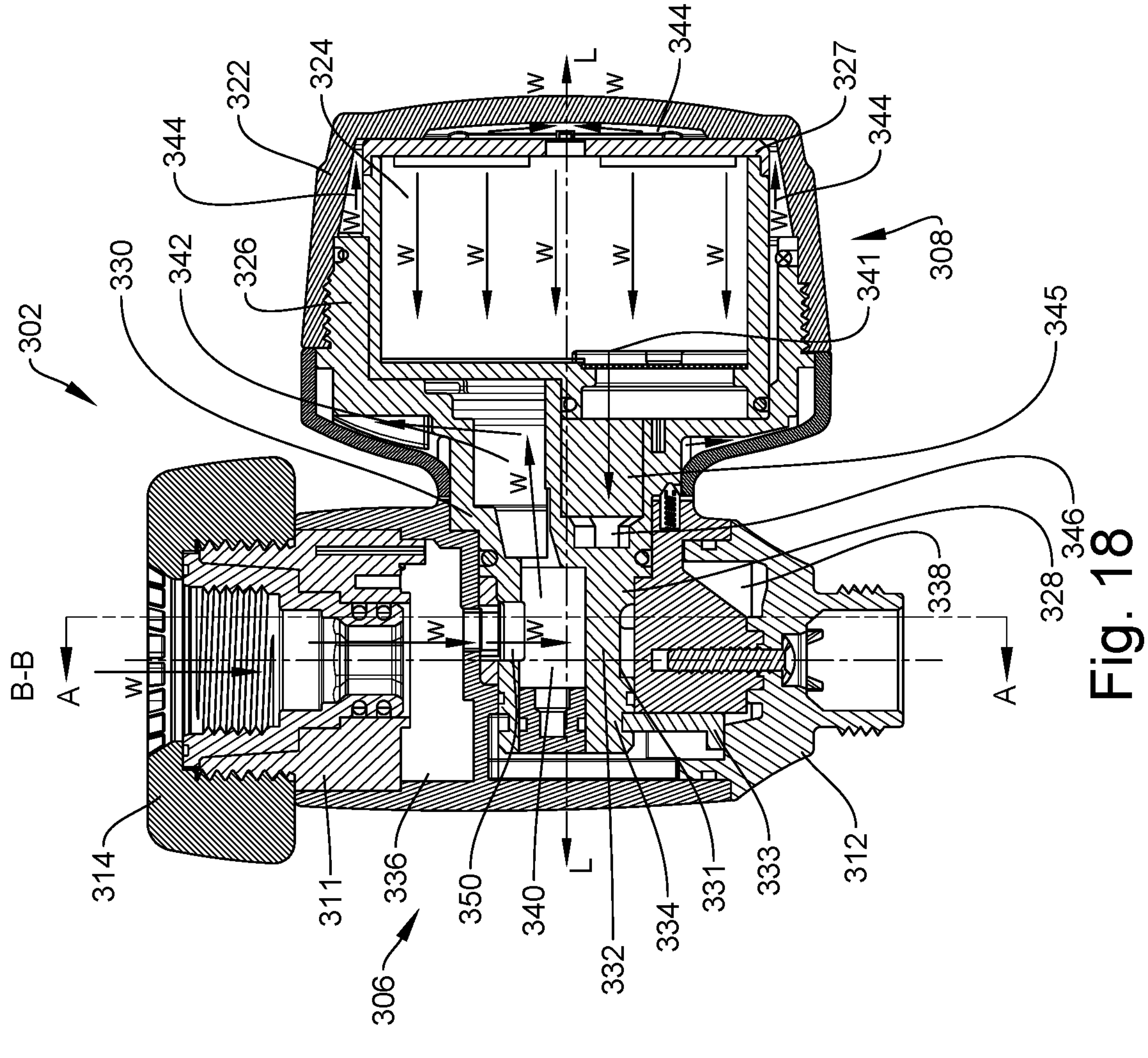
FIG. 18 shows a first cross section of the filter assembly of FIG. 15 in an active configuration.
Figure 21:
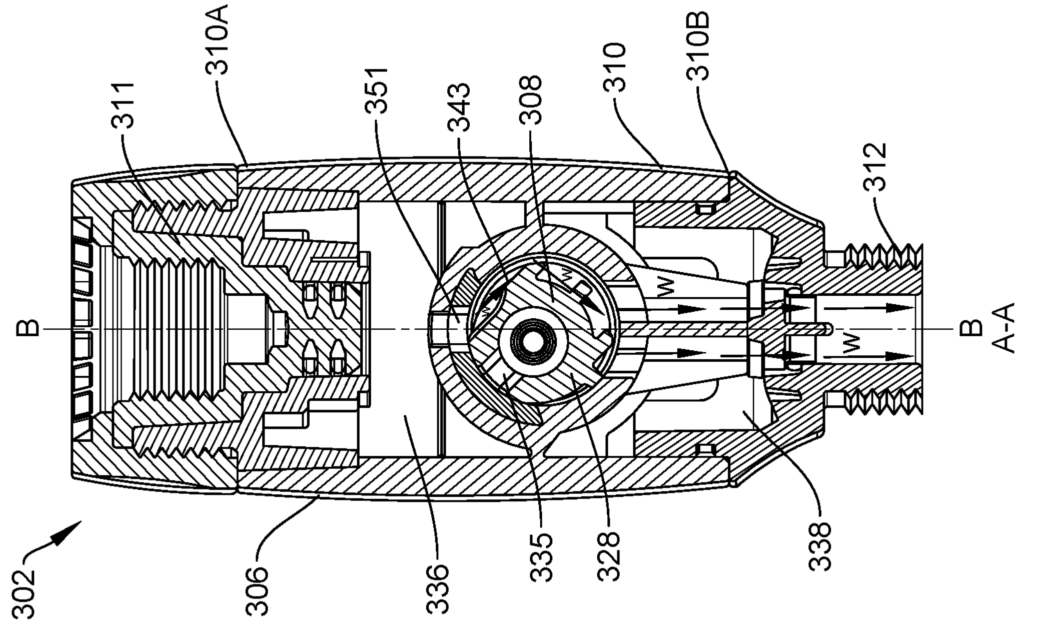
FIG. 21 shows a second cross section of the filter assembly of FIG. 15 in a bypass configuration.
Figure 20:
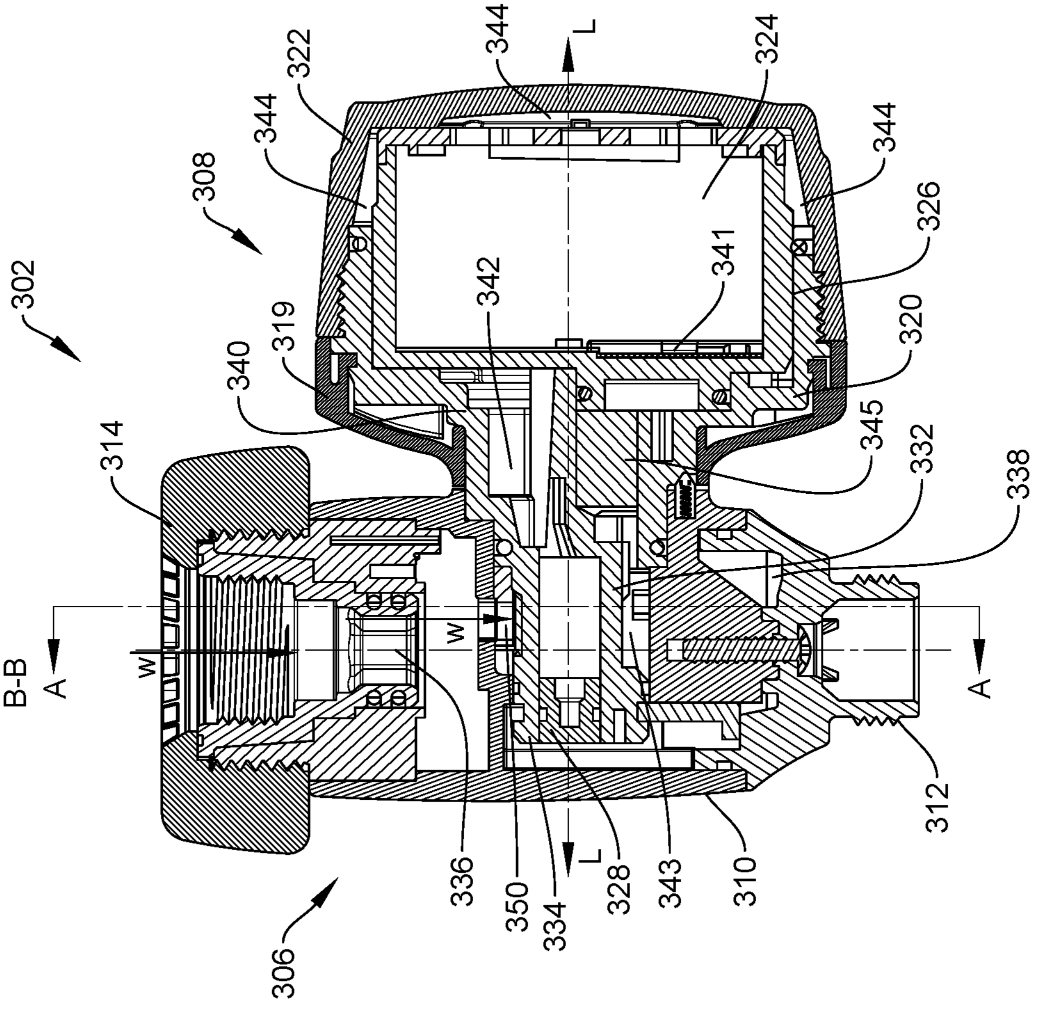
FIG. 20 shows a first cross section of the filter assembly of FIG. 15 in a bypass configuration.

FIGS. 18-21 show cross-sections of the filter assembly 302 in the active and the bypass configurations. FIG. 18 shows a cross-section A-A of the filter assembly 302 in the active configuration. FIG. 19 shows a cross section B-B of the filter assembly 302 in the active configuration, the cross-section B-B being orthogonal to the cross-section A-A. FIG. 20 shows the cross-section A-A of the filter assembly 302 in the bypass configuration. FIG. 21 shows the cross-section B-B of the filter assembly 302 in the bypass configuration.

In the active configuration (e.g., see FIGS. 18, 19), the shower water flows through an upper inlet pipe channel 336 of the inlet pipe 306, then through the filter cartridge 324 of the filter 308, then through a lower inlet pipe channel 338, and then disperses out of the shower head 304. In the bypass configuration (e.g., see FIGS. 20, 21), the shower water flows through the upper inlet pipe channel 336, then through the lower inlet pipe channel 338, bypassing the filter cartridge 324, and then disperses out of the shower head 304. In other words, in the active configuration, the shower water filters by passing through the filter cartridge 324, and, thus, the shower water is filtered when it is dispersed onto the user. On the other hand, in the bypass configuration, the shower water does not pass through the filter cartridge 324 and, thus, the shower water remains unfiltered when it is dispersed onto the user. Those skilled in the art will understand that there are a number of other options for the shower water to bypass the filter cartridge 324 and/or the filter 308.

As shown in FIGS. 18-19, when the filter assembly 302 is in the active configuration, the shower water, as shown by the arrows (e.g., the arrows W), enters through the upper inlet pipe channel 336, flows through the filter 308, and exits through the lower inlet pipe channel 338. Specifically, when the filter assembly 302 is in the active configuration, the washer holes 351 of the washer 350 aligns with the spout input holes 335 of the spout 328, and the spout channel 340 aligns with the filter inlet channel 342. Accordingly, the unfiltered shower water enters the upper inlet pipe channel 336, passes through the washer holes 351 and the spout input holes 335, enters the spout channel 340, and passes through the filter inlet channel 342 into the filter cartridge surrounding channel 344. The unfiltered shower water then surrounds the filter cartridge 324 and enters the filter cartridge 324 through a plurality of openings in the filter cover 327. The unfiltered water then passes through the filter net 325 and filters as it permeates through the filter cartridge 324. The now filtered shower water, as still shown by the arrows, flows out of the mouth 341 of the filter cartridge 324, through the valve 345, through the filter outlet channel 346, and into the lower inlet pipe channel 338. The filtered water then flows out of the lower inlet pipe channel 338, through the shower head 304, and onto the user. In an embodiment, the filtered shower water may flow from the filter outlet channel 346 into the lower inlet pipe channel 338 through one or more holes (not shown).

As shown in FIGS. 20-21, when the filter assembly 302 is in the bypass configuration, the shower water, as shown by the arrows, enters through the upper inlet pipe channel 336, bypasses the filter 308, and exits through the lower inlet pipe channel 338. Specifically, when the filter assembly 302 is in the bypass configuration, the washer hole 351*s* of the washer 350 does not align with the spout input holes 335 of the spout 328, and the spout channel 340 does not align with the filter inlet channel 342. Accordingly, the unfiltered shower water enters the upper inlet pipe channel 336, gets blocked by the washer 350 from entering the spout channel 340 and, thus, is redirected by the washer 350 into a filter bypass channel 343. The filter bypass channel 343 surrounds the outside surface 331 of the reduced diameter portion 332 of the spout 328, such that the unfiltered shower water is funneled into the lower inlet pipe channel 338 without passing through the filter cartridge 324. The unfiltered shower water, as still shown by the arrows, then flows out of the lower inlet pipe channel 338 and through the shower head 304 onto the user. In an embodiment, the unfiltered shower water may flow from the filter bypass channel 343 into the lower inlet pipe channel 338 through one or more holes (not shown).

Once the filter cartridge 324 gets at least partially filled with sedatives and residue, it may cause the water pressure to drop in the shower head 304. Subsequently, the user may desire to replace the filter cartridge 324. To replace the filter cartridge 324, the user must first turn off the water flow from the water source so that the water stops flowing from the water source to the inlet pipe 306. Then, the user may uncouple the detachable housing 322 from the inlet pipe 306 (e.g., by twisting the detachable housing 322 relative to the connector 320) and replace the filter cartridge 324 housed therein with a new filter cartridge 324. The new filter cartridge 324 would similarly be guided by its plurality of grooves 323 into the receiving portion 326 of the connector 320. In an exemplary embodiment, the filter assembly 302 may have at least a tactile feedback and/or an audible feedback to notify the user that the new filter cartridge 324 was properly inserted into the connector 320. In an alternative exemplary embodiment, the filter 308 may be uncoupled from the inlet pipe 306 to separate the detachable housing 322 from the connector 320 and replace the filter cartridge 324.

In another alternative exemplary embodiment (not shown), the detachable housing 322 may be integrally formed with the connector 320, thus the detachable housing 322 may include an opening for removing the filter cartridge 324. The opening may remain closed while the filter 308 is in the active configuration and it would open through action of the user. In a further alternative exemplary embodiment (not shown), the filter cartridge 324 may be integrally formed with the filter 308, thus, the filter 308 would need to be replaced.

In the exemplary embodiment, the shower head 304 is a universal shower head that may be attached to the filter assembly 302. The shower head 304 may be any commercially available shower head that has a coupling end couplable to the second plug 312 via any method known to one skilled in the art (e.g., a threading connection). In a further embodiment, the shower head 304 may be any commercially available shower head that has a coupling end couplable to the inlet pipe 306 via any method known to one skilled in the art (e.g., a threading connection) without coupling to the second plug 312.

Figure 22:
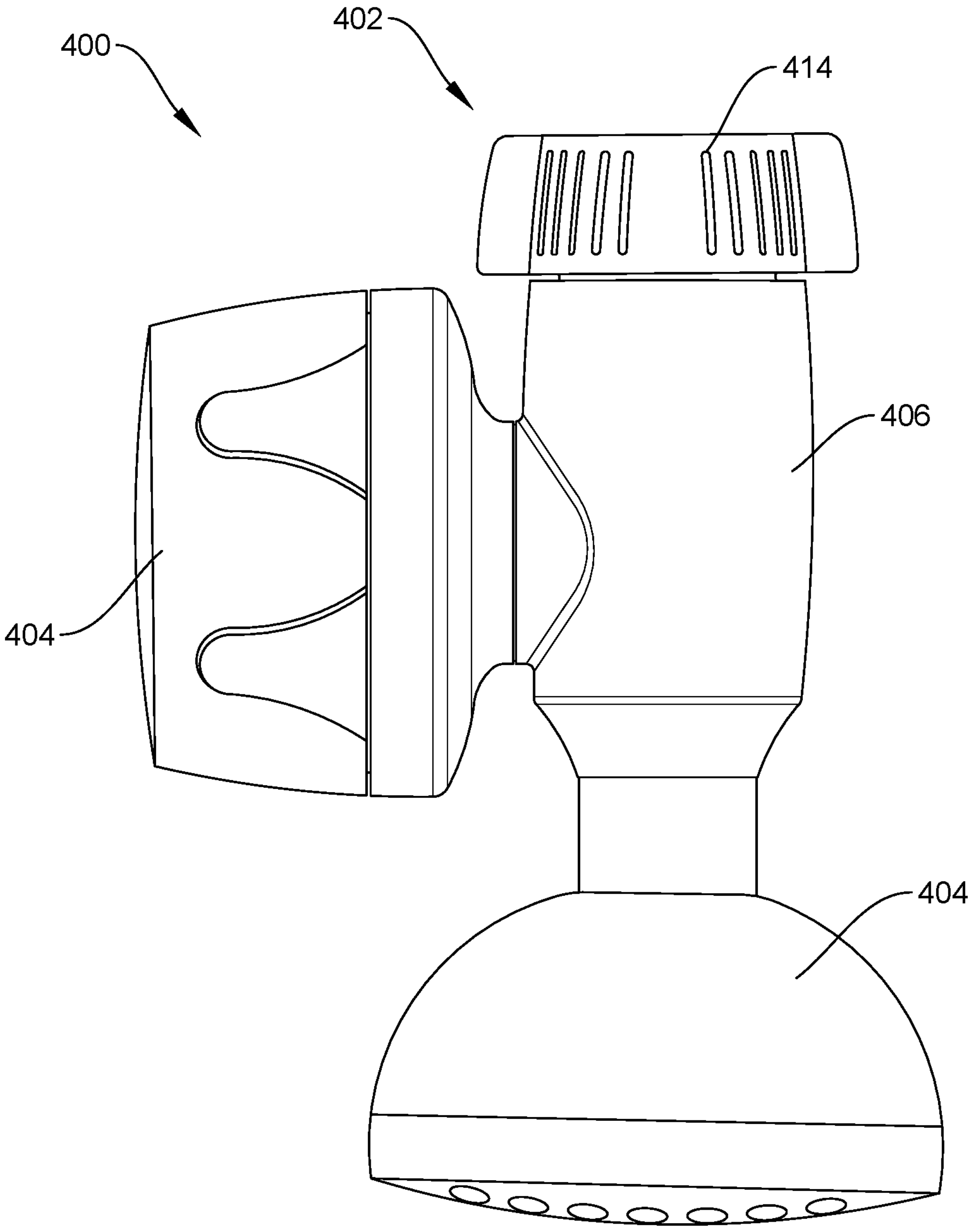
FIG. 22 shows a perspective view of a sixth exemplary embodiment of a shower filter system according to the present disclosure.

In an alternative embodiment, as shown in FIG. 22, a shower filter system 400 according to a sixth exemplary embodiment of the present disclosure may include a filter assembly 402 and a built-in shower head 404 fixedly attached thereto. The filter assembly 402 is substantially similar to the filter assembly 302 and includes an inlet pipe 406, a filter 408 coupled to the inlet pipe 406, and a nut 414 coupled to a plug (not shown) of the inlet pipe 406. Similar to the nut 314, the nut 414 is configured to attach the filter assembly 402 to a water source (not shown). As opposed to the shower filter system 300 that may be used with any commercially available shower head, the shower filter system 400 may only be used with the built-in shower head 404. As opposed to the shower head 304, the built-in shower head 404 may not be separated from or uncoupled from the filter assembly 402. The built-in shower head 404 may be integrally formed with the filter assembly 402 or it may be fixedly attached to the filter assembly 402 via any method known to one skilled in the art (e.g., welding, molding, etc.).

Figure 23:
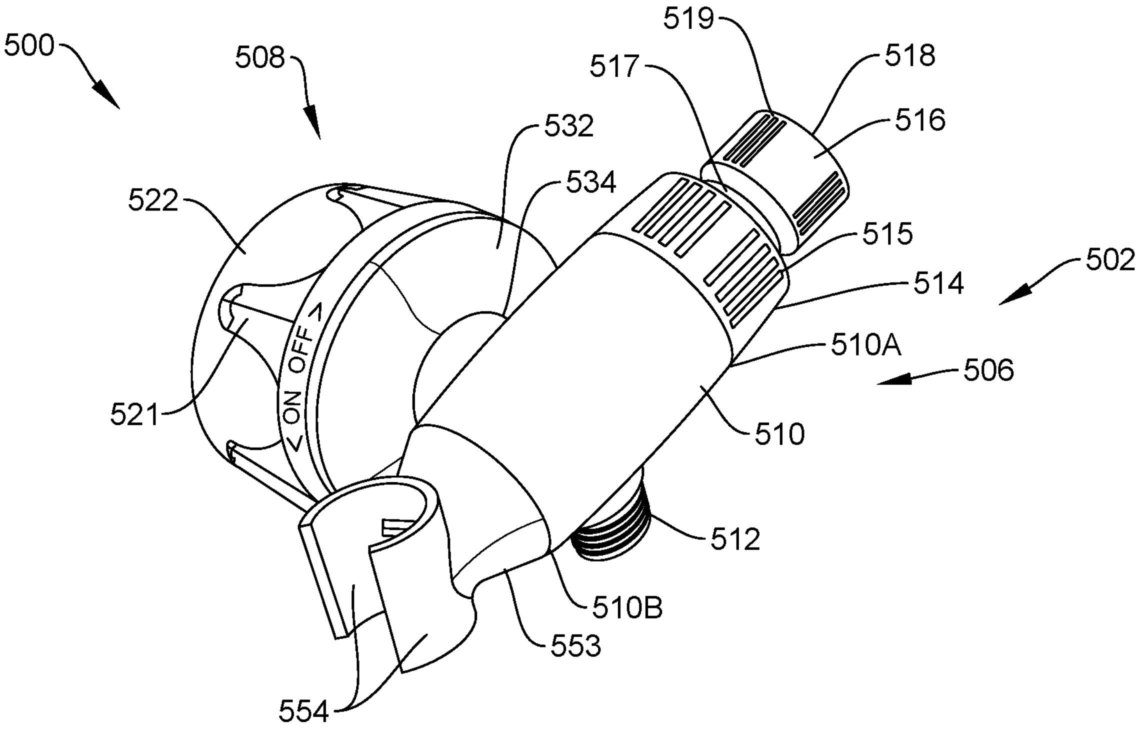
FIG. 23 shows a perspective view of a seventh exemplary embodiment of a shower filter system according to the present disclosure.

FIG. 23 shows a shower filter system 500 according to a seventh exemplary embodiment of the present disclosure. The shower filter system 500 is substantially similar to the shower filter systems 300, 400. The shower filter system 500 may include a filter assembly 502 and a hand shower (not shown). The filter assembly 502 is substantially similar to the filter assemblies 302, 402 and includes an inlet pipe 506 and a filter 508 coupled to the inlet pipe 506.

The inlet pipe 506 of the filter assembly 502 includes a body 510, a first plug (not shown), a second plug 512, and a hand shower holder 553. The body 510 extends from a first end 510A to a second end 510B. The second plug 512 extends outwardly from the body 510 in between the first end 510A and the second end 510B. The second plug 512 is connectable to a coupling end of a hose of a hand shower (not shown) via any method known to one skilled in the art (e.g., a threading connection), similar to the connector 92 of the shower filter system 180 (e.g., see FIGS. 11A-11C). The holder 553 is substantially similar to the holder 83 of the shower filter system 180 (e.g., see FIGS. 11A-11C). The holder 553 is coupled to the second end 510B via any method known to one skilled in the art (e.g., a threading connection). In the exemplary embodiment, the holder 553 includes a pair of fingers 554 configured to tightly squeeze a portion of a handle of the hand shower.

The filter assembly 502 may further include a nut 514 and a ball joint 516. The ball joint 516 includes a ball 517 configured to be inserted into the inlet pipe 506 and a socket 518 configured to connect the filter assembly 502 to the water source. The nut 514 is configured to be coupled to the first plug via any method known to one skilled in the art (e.g., a threading connection) to tighten the inlet pipe 506 around the ball 517 of the ball joint 516. The nut 514 is moveable between a loose configuration and a tightened configuration. In the loose configuration, the nut 514 is loose around the ball 517, thus the inlet pipe 506 may rotate and move relative to the ball 517. In the tightened configuration, the nut 514 is tight around the ball 517, thus the inlet pipe 506 is fixed relative to the ball 517. Instead of a pair of wings, the nut 514 includes a plurality of ridges 515 along a circumference thereof and the ball joint 516 includes a plurality of ridges 519 along a circumference of the socket 518. In a further exemplary embodiment, each of the nut 514 and the socket 518 of the ball joint 516 may also include at least one wing (e.g., a wing similar to the wing 315) to help tighten the filter assembly 502 to the water source.

The filter 508 of the filter assembly 502 is substantially similar to the filter 308 of the filter assembly 302. The filter 508 may include a connector (not shown), a detachable housing 522, and a filter cartridge (not shown) configured to be housed between the connector and the detachable housing 522. The detachable housing 522 is configured to connect to the connector via any conventional method known to one skilled in the art (e.g., threading, snapping, locking and fitting), such that the detachable housing 522 may be separated from the connector by the user to replace the filter cartridge housed therein. In the exemplary embodiment, the detachable housing 522 may include a plurality of protrusions 521 for the user to grip the detachable housing 522. Further, the filter assembly 502 may include a base plate 532 and a ring 534 to cover the connector and form the seal between the inlet pipe 506 and the filter 508. Moreover, the filter assembly 502 may be configured to be in an active configuration (e.g., when the shower water gets filtered by the filter cartridge of the filter 508) and a bypass configuration (e.g., when the shower water is not filtered and bypasses the filter cartridge of the filter 508). The filter assembly 502 may be moved from the active configuration to the bypass configuration in a substantially similar manner as described above with respect to the filter assembly 302.

The hand shower (not shown), is substantially similar to the hand shower 84 of the shower filter system 180 (e.g., see FIGS. 11A-11C). Similar to the shower filter system 300 that may be used with any commercially available shower head, the shower filter system 500 may be used with any commercially available hand shower. Accordingly, the hand shower may be any commercially available hand shower that has a hose with a coupling end couplable to the second plug 512 via any method known to one skilled in the art (e.g., a threading connection). In a further embodiment, the hand shower may be any commercially available hand shower that has a hose with a coupling end couplable to the inlet pipe 506 via any method known to one skilled in the art (e.g., a threading connection) without coupling to the second plug 512. The hand shower may then be separated from the filter assembly 502 and replaced by a new hand shower without having any impact on the filter assembly 502.

Figure 24:
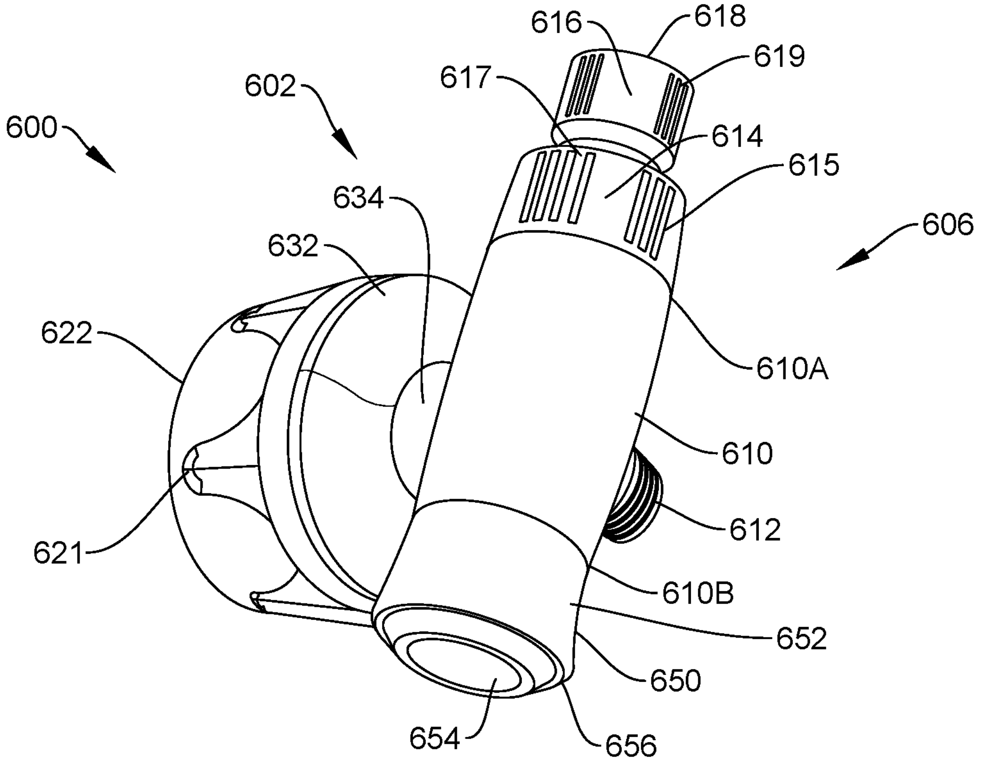
FIG. 24 shows a perspective view of an eight exemplary embodiment of a shower filter system according to the present disclosure.
Figure 25:
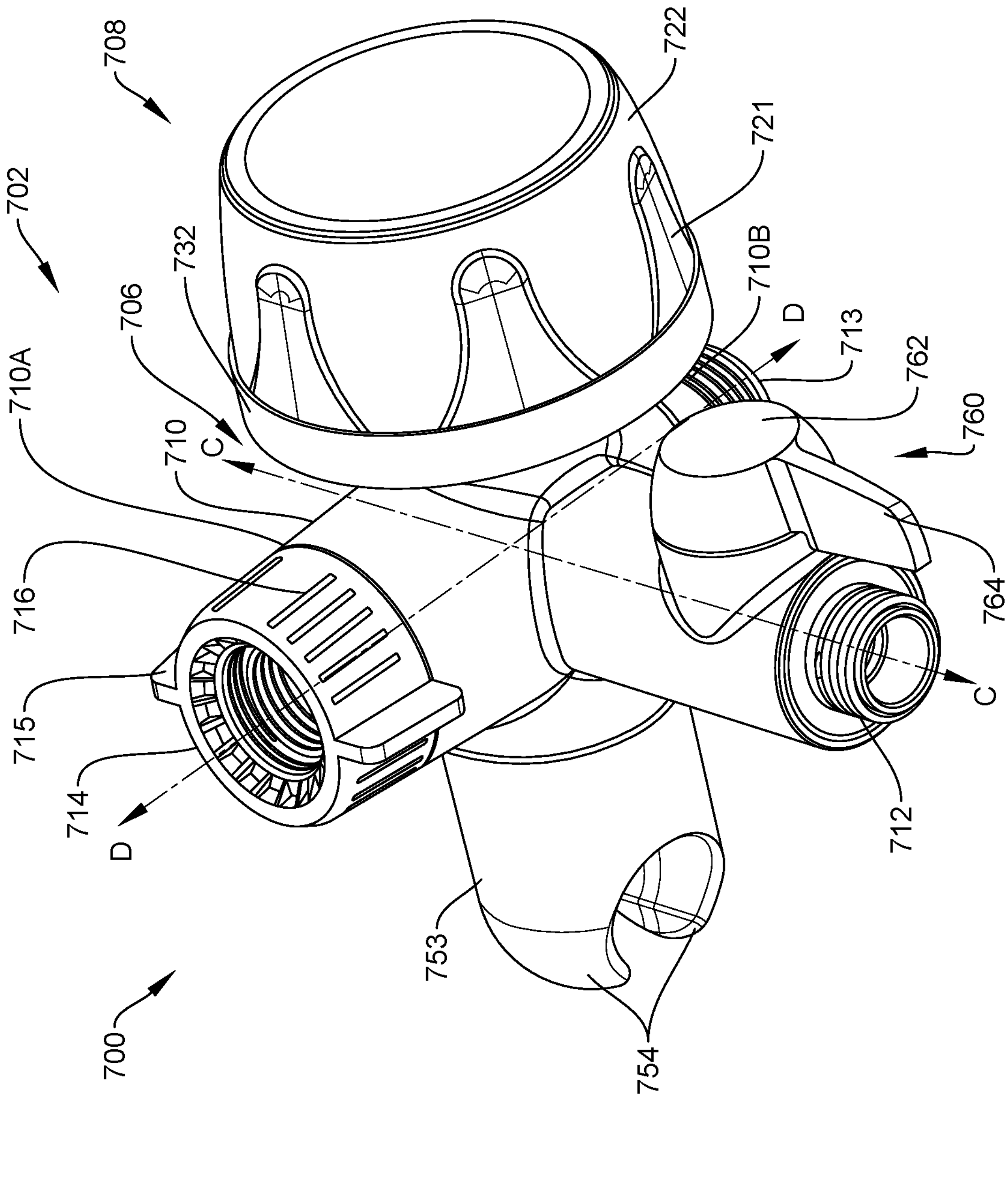
FIG. 25 shows a perspective view of a filter assembly of a ninth exemplary embodiment of a shower filter system according to the present disclosure.

FIG. 24 shows a shower filter system 600 according to an eighth exemplary embodiment of the present disclosure. The shower filter system 600 is substantially similar to the shower filter systems 300, 400, 500. The shower filter system 600 may include a filter assembly 602 and a magnetic hand shower (not shown). The filter assembly 602 is substantially similar to the filter assemblies 302, 402, 502 and includes an inlet pipe 606 and a filter 608 coupled to the inlet pipe 606.

The inlet pipe 606 of the filter assembly 602 is substantially similar to the inlet pipe 506 of the filter assembly 502 and includes a body 610, a first plug (not shown), a second plug 612, and a magnetic holder 650. The body 610 extends from a first end 610A to a second end 610B. The second plug 612 extends outwardly from the body 610 in between the first end 610A and the second end 610B. The second plug 612 is similar to the second plug 512 and is connectable to a coupling end of a hose of a hand shower (not shown) via any method known to one skilled in the art (e.g., a threading connection).

The magnetic holder 650 is coupled to the second end 610B via any method known to one skilled in the art (e.g., a threading connection). In the exemplary embodiment, the magnetic holder 650 includes a magnet base 652, a magnet 654, and a magnet shelf 656. The magnet base 652 extends from a first end 651 couplable to the second end 610B to a second end 653. The magnet 654 is housed in a cavity of the magnet base 652. The magnet 654 may be any magnet that is capable of supporting the weight of the magnetic hand shower. The magnet shelf 656 couples to the second end 653 of the magnet base 652 to prevent the magnet 654 from falling out of the cavity of the magnet base 652. The coupling between magnet shelf 656 and the second end 653 of the magnet base 652 must be strong enough to support the weight of the magnetic hand shower.

The filter assembly 602 may further include a nut 614 and a ball joint 616. The ball joint 616 includes a ball 617 configured to be inserted into the inlet pipe 606 and a socket 618 configured to connect the filter assembly 602 to the water source. The nut 614 is configured to be coupled to the first plug via any method known to one skilled in the art (e.g., a threading connection) to tighten the inlet pipe 606 around the ball 617 of the ball joint 616. The nut 614 is moveable between a loose configuration and a tightened configuration. In the loose configuration, the nut 614 is loose around the ball 617, thus the inlet pipe 606 may rotate and move relative to the ball 617. In the tightened configuration, the nut 614 is tight around the ball 617, thus the inlet pipe 606 is fixed relative to the ball 617. Instead of a pair of wings, the nut 614 includes a plurality of ridges 615 along a circumference thereof and the ball joint 616 includes a plurality of ridges 619 along a circumference of the socket 618. In a further exemplary embodiment, each of the nut 614 and the socket 618 of the ball joint 616 may also include at least one wing (e.g., a wing similar to the wing 315) to help tighten the filter assembly 602 to the water source.

The filter 608 of the filter assembly 602 is substantially similar to the filter 308 of the filter assembly 302. The filter 608 may include a connector (not shown), a detachable housing 622, and a filter cartridge (not shown) configured to be housed between the connector and the detachable housing 622. The detachable housing 622 is configured to connect to the connector via any conventional method known to one skilled in the art (e.g., threading, snapping, locking and fitting), such that the detachable housing 622 may be separated from the connector by the user to replace the filter cartridge housed therein. In the exemplary embodiment, the detachable housing 622 may include a plurality of protrusions 621 for the user to grip the detachable housing 622. Further, the filter assembly 602 may include a base plate 632 and a ring 634 to cover the connector and form the seal between the inlet pipe 606 and the filter 608. Moreover, the filter assembly 602 may be configured to be in an active configuration (e.g., when the shower water gets filtered by the filter cartridge of the filter 608) and a bypass configuration (e.g., when the shower water is not filtered and bypasses the filter cartridge of the filter 608). The filter assembly 602 may be moved from the active configuration to the bypass configuration in a substantially similar manner as described above with respect to the filter assembly 302.

The magnetic hand shower (not shown) is substantially similar to the magnetic hand shower 105 of the shower filter system 200. The magnetic hand shower includes a head portion and a handle portion extending from the head portion. The head portion includes a magnet on a back side thereof, the magnet couplable to the magnet 654 of the magnetic holder 650 to hold the magnetic hand shower in place relative to the filter assembly 602. The magnetic hand shower further includes a hose with a coupling end couplable to the second plug 612 via any method known to one skilled in the art (e.g., a threading connection). In a further embodiment, the magnetic hand shower may include a hose with a coupling end couplable to the inlet pipe 606 via any method known to one skilled in the art (e.g., a threading connection) without coupling to the second plug 612. The magnetic hand shower may then be separated from the filter assembly 602 and replaced by a new magnetic hand shower without having any impact on the filter assembly 602.

FIGS. 25-28 show a shower filter system 700 according to a ninth exemplary embodiment of the present disclosure. The shower filter system 700 is substantially similar to the shower filter system 500 (see FIG. 23), however the shower filter system 700 is configured to include both a shower head and a hand shower, similar to the shower filter system 200 (see FIGS. 12A-C. The shower filter system 700 may include a filter assembly 702, a shower head (not shown) and a hand shower (not shown). The filter assembly 702 includes an inlet pipe 706 and a filter 708.

The inlet pipe 706 of the filter assembly 702 is substantially similar to the inlet pipe 306 of the filter assembly 302 and includes a body 710 extending from a first end 710A to a second end 710B, a first plug 711, a second plug 712, a third plug 713, and a hand shower holder 753. The first plug 711 is inserted into the body 710, such that a portion of the first plug 711 extends past the first end 710A of the body 710. The first plug 711 is couplable to a water source via any method known to one skilled in the art (e.g., a threading connection). The second plug 712 extends outwardly from the body 710 in between the first end 710A and the second end 710B. The second plug 712 is connectable to a coupling end of a hose of a hand shower (not shown) via any method known to one skilled in the art (e.g., a threading connection), similar to the second plug 512 of the shower filter system 500 (e.g., see FIG. 23). The third plug 713 is inserted into the body 710, such that a portion of the third plug 713 extends past the second end 710B of the body 710. The third plug 713 is couplable to a coupling end of the shower head via any method known to one skilled in the art (e.g., a threading connection). The holder 753 is substantially similar to the holder 553 of the shower filter system 500. The holder 753 is coupled to the inlet pipe 706 via any method known to one skilled in the art (e.g., a threading connection, integrally formed) and extends outwardly from the body 710 in between the first end 710A and the second end 710B. In the exemplary embodiment, the holder 753 includes a pair of fingers 754 configured to tightly squeeze a portion of a handle of the hand shower.

The inlet pipe 706 may further include an upstream inlet pipe channel 736, a downstream inlet pipe channel 738, a passing channel 740, a hand shower channel 742, a shower head channel 744, and a diverter channel 746. The upstream inlet pipe channel 736 extends through an upper portion of the body 710 of the inlet pipe 706 and connects a channel extending from the water source to the filter 708 and further to the passing channel 740. The downstream inlet pipe channel 738 extends through a lower portion of the body 710 of the inlet pipe 706 and connects the shower head channel 744 to a shower head inlet passage of the shower head. The hand shower channel 742 extends through a portion of the second plug 712 and connects the passing channel 740 to a hand shower inlet passage of the hand shower via the diverter channel 746. The flow of the shower water through the filter assembly 702 will be described in greater detail below.

The filter assembly 702 may further include a nut 714 configured to couple the first plug 711 to the water source. The nut 714 may include at least one wing 715 and a plurality of ridges 716 for tightening the inlet pipe 706 to the water source. Although the exemplary embodiment discloses the nut 714 having a pair of wings 715, in a further embodiment, the nut 714 may include more or less than two wings 715.

In the exemplary embodiment, the filter assembly 702 may further include a diverter switch 760, the diverter switch 760 being substantially similar to the diverter switch 109 of the shower filter system 200. The diverter switch 760 includes a body portion 762 coupled to the inlet pipe 706, a grip portion 764 configured to be gripped by the user to rotate the diverter switch 760, a protrusion 766 extending from the body portion 762 into the second plug 712, and the diverter channel 746 formed by the protrusion 766. When the diverter switch 760 is in a shower head position, the shower water, regardless of whether the shower water is filtered or non-filtered, is diverted to the shower head. When the diverter switch 760 is in a hand shower position, the shower water, regardless of whether the shower water is filtered or non-filtered, is diverted to the hand shower. When the diverter switch 760 is in a combination position, the shower water (regardless of whether the shower water is filtered or non-filtered) is diverted to the shower head and the hand shower, as will be described in further detail below. As will be understood by one with ordinary skill in the art, the diverter switch 760 may be any diverter switch known to one skilled in the arts for regulating the flow of shower water between the shower head and the hand shower.

The diverter switch 760 is configured to be rotated about a longitudinal axis of the protrusion 766 between the shower head position, the hand shower position, and the combination position. The diverter switch 760 may be rotated in a first direction (e.g., clockwise) from the shower head position to the hand shower position to the combination position. The diverter switch 760 may then be rotated in a second direction (e.g., counter-clockwise) from the combination position, to the hand shower position, to the shower head position. The diverter switch 760 may have at least a tactile feedback and/or an audible feedback to notify the user that the diverter switch 760 is properly rotated between the three positions.

Figure 26:
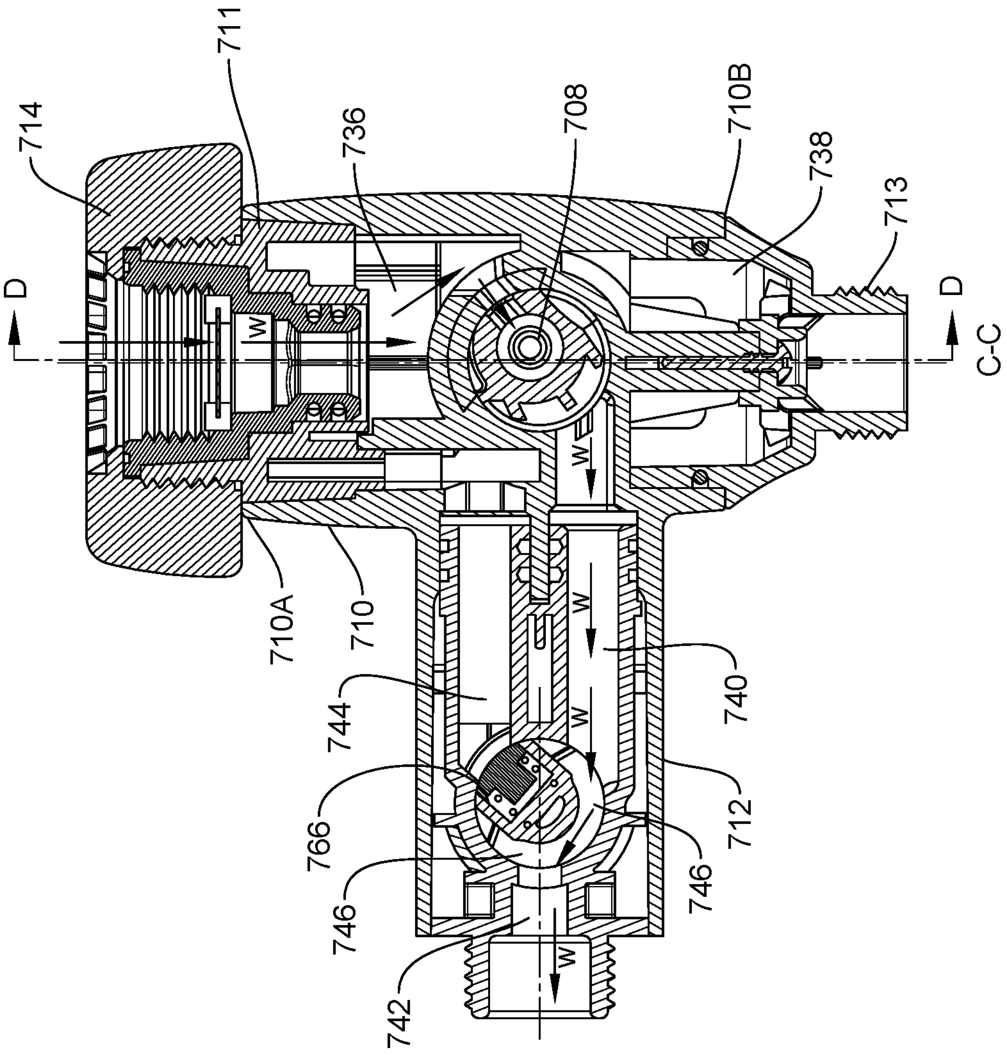
FIG. 26 shows a cross section of the filter assembly of FIG. 25 in a shower head configuration.
Figure 27:
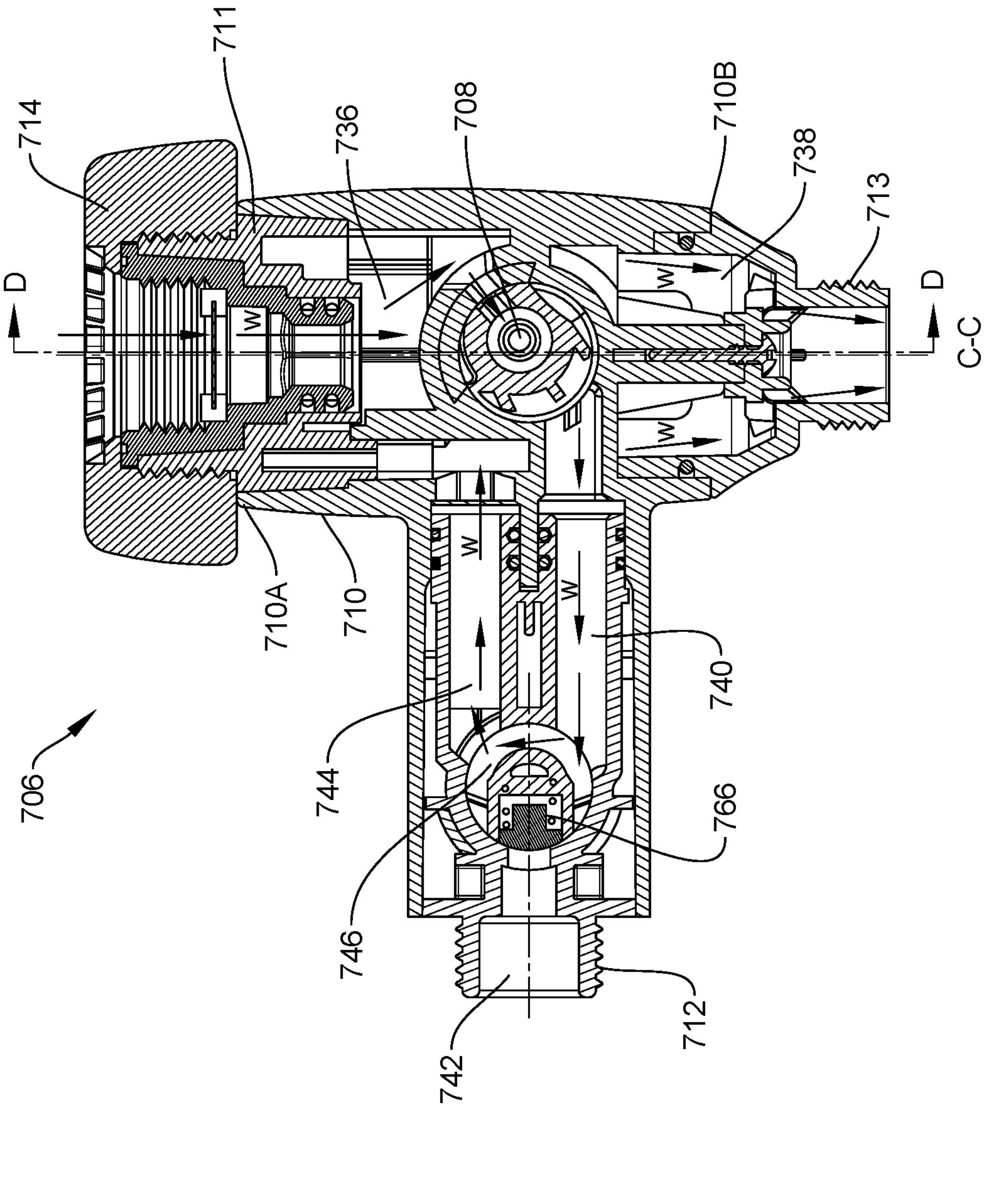
FIG. 27 shows a cross section of the filter assembly of FIG. 25 in a hand shower configuration.
Figure 28:
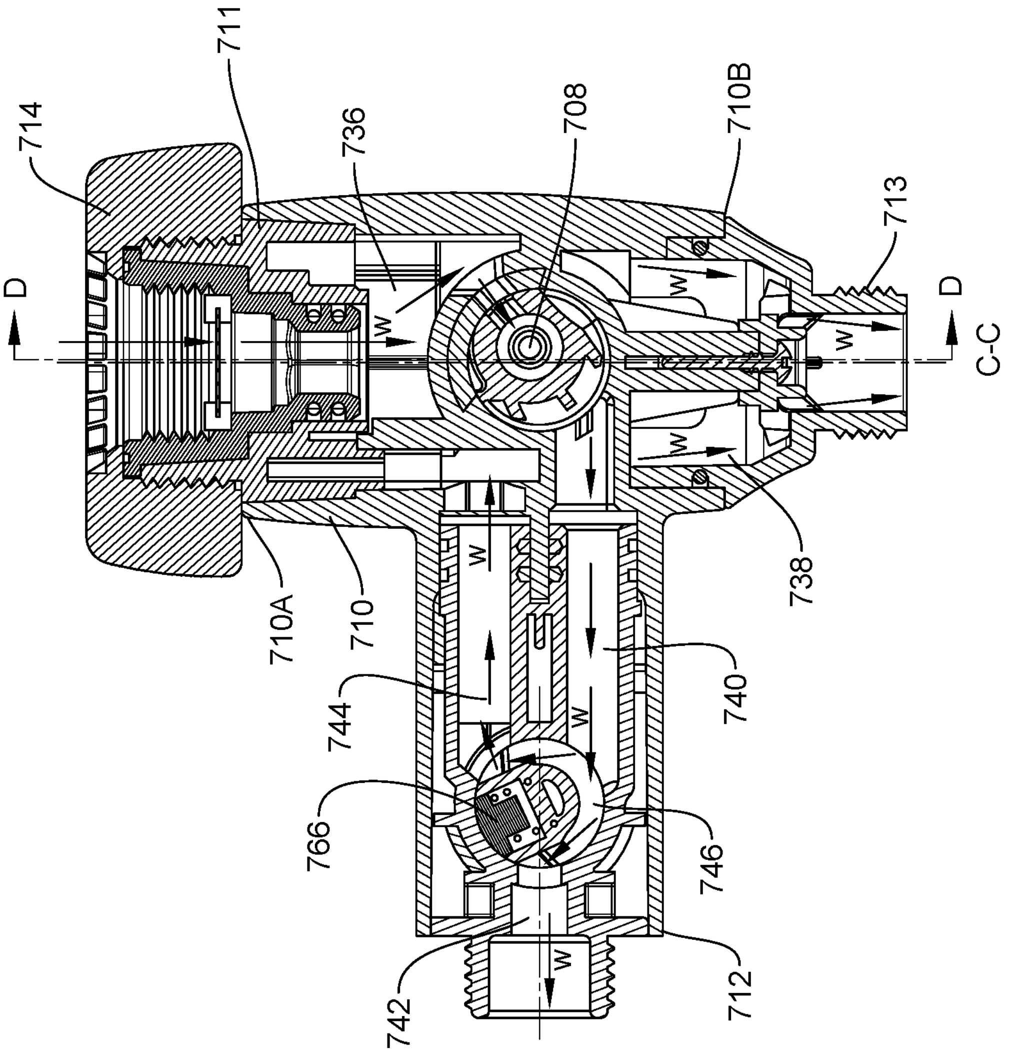
FIG. 28 shows a cross section of the filter assembly of FIG. 25 in a combination configuration.

FIGS. 26-28 show a cross-section CC of the filter assembly 702. When the diverter switch 790 is in the hand shower position, the diverter channel 746 connects the passing channel 740 with the hand shower channel 742, as shown in FIG. 26. Thus, in the hand shower position, the shower water, as shown by the arrows, is guided into the hand shower through the passing channel 740, the hand shower channel 742, and the diverter channel 746. When the diverter switch 790 is in the shower head position, the diverter channel 746 connects the passing channel 740 with the shower head channel 744, as shown in FIG. 27. Thus, in the shower head position, the shower water, as shown by the arrows, is guided into the shower head through the passing channel 740, the shower head channel 744, the diverter channel 746, and out through the downstream inlet pipe channel 738. When the diverter switch 760 is in the combination position, the diverter channel 746 connects the passing channel 740 with the hand shower channel 742 and the shower head channel 744, as shown in FIG. 28. Thus, in the combination position, the shower water is guided, as shown by the arrows, into the shower head and the hand shower through the passing channel 740, the hand shower channel 742, the shower head channel 744, the diverter channel 746, and the downstream inlet pipe channel 738.

The filter 708 of the filter assembly 702 is substantially similar to the filter 308 of the filter assembly 302 (e.g., see FIG. 13). The filter 708 may include a connector (not shown) having a spout (not shown), a detachable housing 722, and a filter cartridge (not shown) configured to be housed between the connector and the detachable housing 722. The detachable housing 722 is configured to connect to the connector via any conventional method known to one skilled in the art (e.g., threading, snapping, locking and fitting), such that the detachable housing 722 may be separated from the connector by the user to replace the filter cartridge housed therein. In the exemplary embodiment, the detachable housing 722 may include a plurality of protrusions 721 for the user to grip the detachable housing 722. Further, the filter assembly 702 may include a base plate 732 and a ring (not shown) to cover the connector and form the seal between the inlet pipe 706 and the filter 708. Moreover, the filter assembly 702 may be configured to be in an active configuration (e.g., when the shower water gets filtered by the filter cartridge of the filter 708) and a bypass configuration (e.g., when the shower water is not filtered and bypasses the filter cartridge of the filter 708). The filter assembly 702 may be moved from the active configuration to the bypass configuration in a substantially similar manner as described above with respect to the filter assembly 302.

In the exemplary embodiment, the shower head is a universal shower head that may be attached to the filter assembly 702. The shower head may be any commercially available shower head that has a coupling end couplable to the third plug 713 or the inlet pipe 707 via any method known to one skilled in the art (e.g., a threading connection). In a further exemplary embodiment, the shower head 704 may be a built-in shower head that is fixedly attached to or integrally formed with the inlet pipe 706, similar to the built-in shower head 404 of the shower filter system 400 (e.g., see FIG. 22). The hand shower (not shown) is substantially similar to the hand shower 84 of the shower filter system 180 (e.g., see FIGS. 11A-11C). Similar to the shower filter system 500, the shower filter system 700 may be used with any commercially available hand shower. The hand shower may be any commercially available hand shower that has a hose with a coupling end couplable to the second plug 712 or the inlet pipe 706 via any method known to one skilled in the art (e.g., a threading connection).

As mentioned above, the diverter switch 760 may be moved between the shower head position, the hand shower position, and the combination position. When the shower filter system 700 is in the bypass configuration and the diverter switch 760 is in the shower head position, the shower water flows from the water source, through the upstream inlet pipe channel 736, through the passing channel 740, through the diverter channel 746, through the shower head channel 744, through the downstream inlet pipe channel 738, through the shower head inlet passage, and through the shower head onto the user. When the shower filter system 700 is in the bypass configuration and the diverter switch 760 is in the hand shower position, the shower water flows from the water source, through the upstream inlet pipe channel 736, through the passing channel 740, through the diverter channel 746, through the hand shower channel 742, through the hand shower inlet passage, and through the hand shower onto the user. When the shower filter system 700 is in the bypass configuration and the diverter switch 760 is in the combination position, the unfiltered shower water flows in the same manners as above, but through both the hand shower channel 742 and the shower head channel 744.

As shown in FIG. 26A, when the shower filter system 700 is in the active configuration and the diverter switch 760 is in the shower head position, the shower water flows from the water source, through the upstream inlet pipe channel 736, and through the spout (not shown) into the filter 708. The filtered shower water then exits the filter 708 through the spout (not shown) and the passes through the passing channel 740, through the diverter channel 746, through the shower head channel 744, through the downstream inlet pipe channel 738, through the shower head inlet passage, and through the shower head onto the user. As shown in FIG. 27B, when the shower filter system 700 is in the active configuration and the diverter switch 760 is in the hand shower position, the shower water flows from the water source, through the upstream inlet pipe channel 736, and through the spout (not shown) into the filter 708. The filtered shower water then exits the filter 708 through the spout (not shown) and the passes through the passing channel 740, through the diverter channel 746, through the hand shower channel 742, through the hand shower inlet passage, and through the hand shower onto the user. As shown in FIG. 27C, when the shower filter system 700 is in the active configuration and the diverter switch 760 is in the combination position, the filtered shower water flows in the same manner as above, but through both the hand shower channel 742 and the shower head channel 744.

Figure 29A:
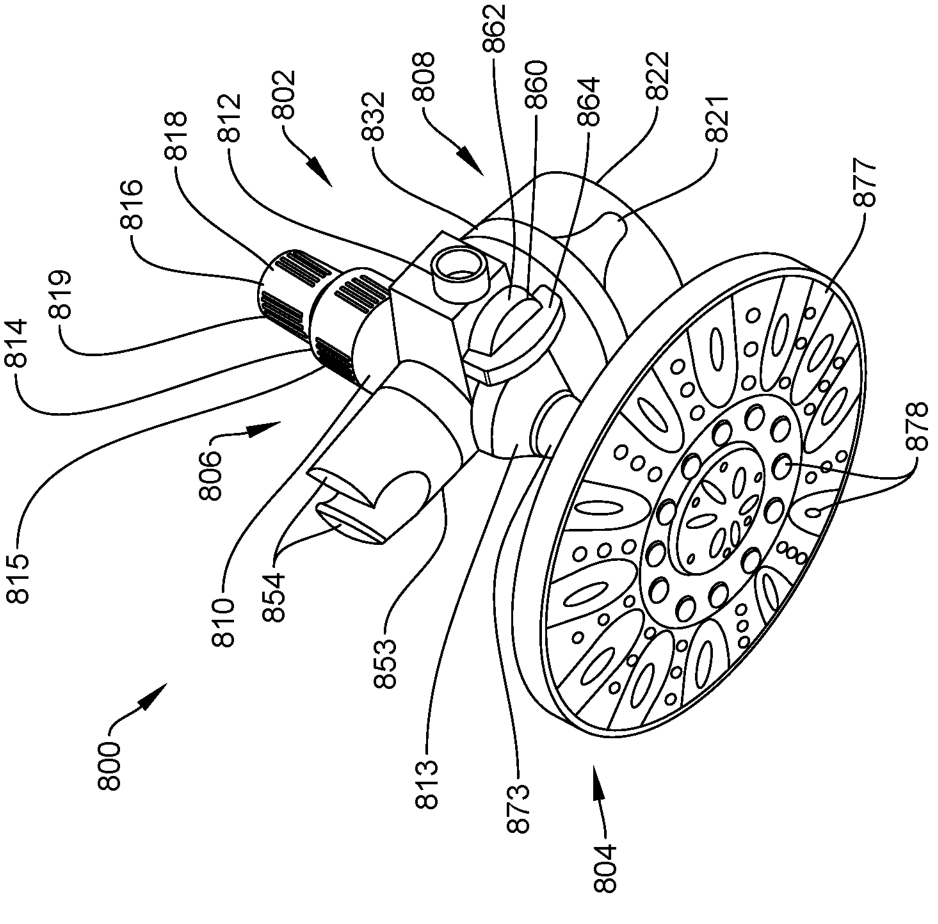
FIG. 29A shows a perspective view of a tenth exemplary embodiment of a shower filter system according to the present disclosure.
Figure 29B:
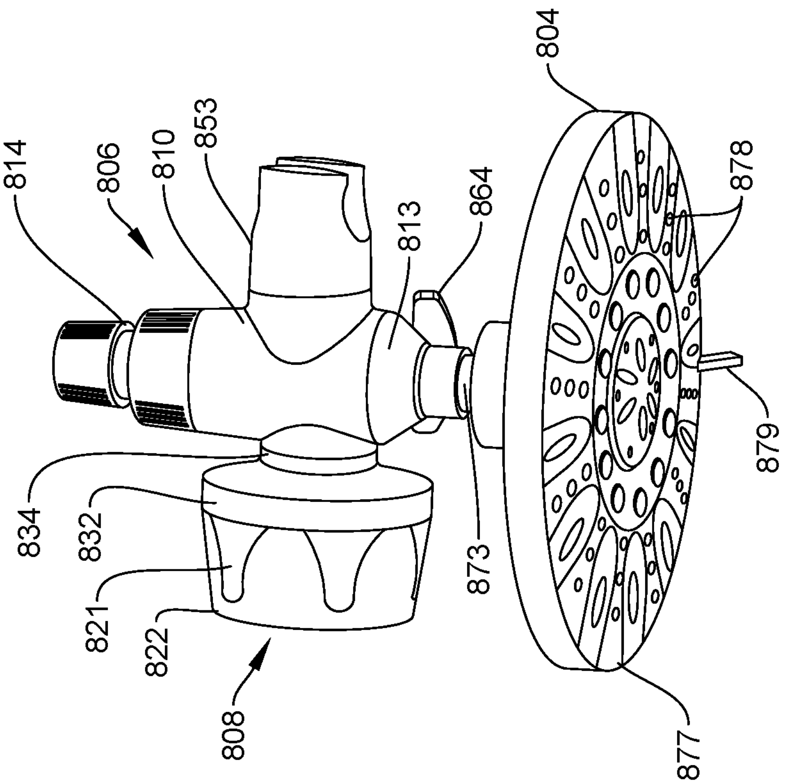
FIG. 29B shows a side view of the shower filter system of FIG. 29A.
Figure 30:
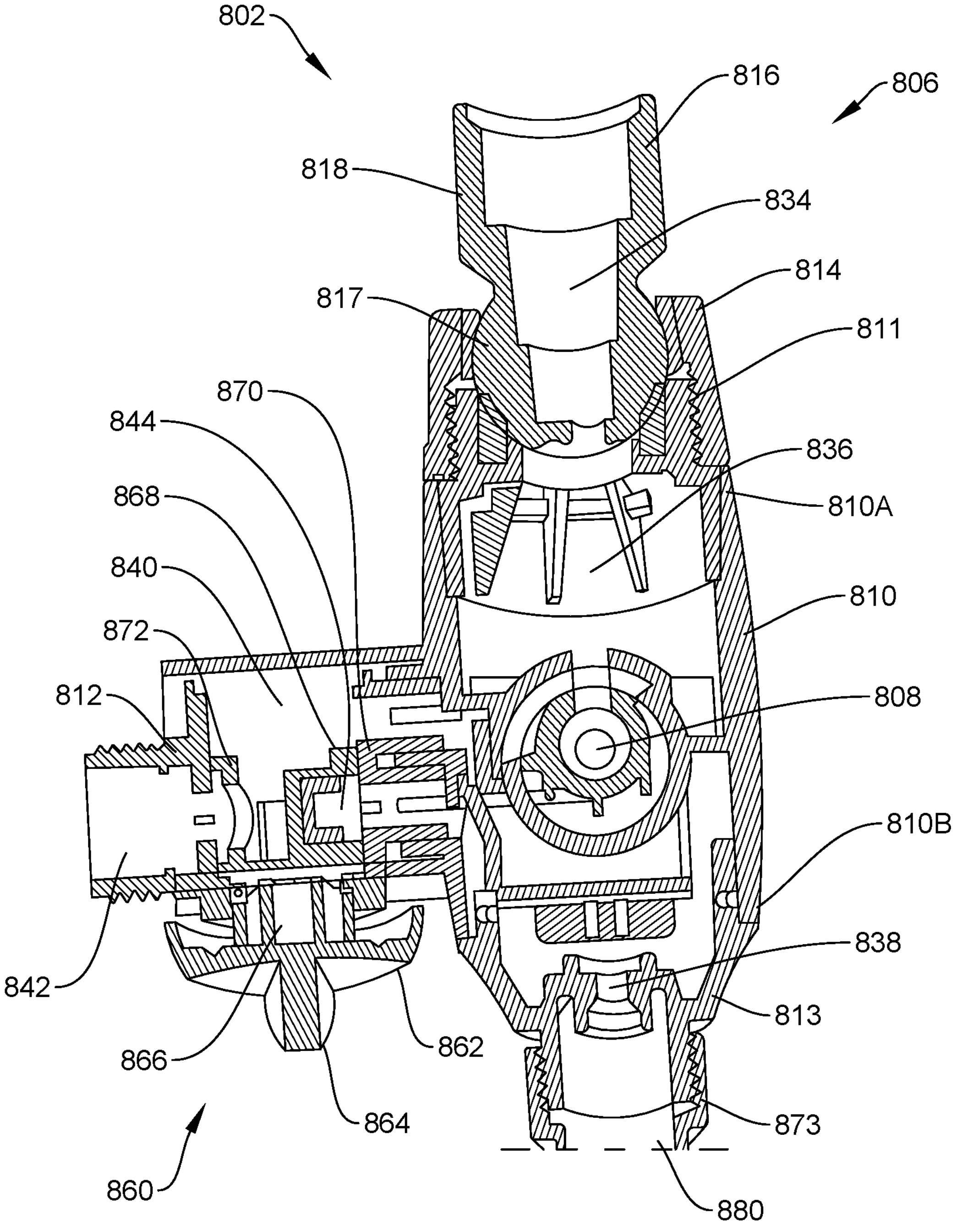
FIG. 30 shows a cross section of a filter assembly of the shower filter system of FIG. 29A in a shower head configuration.
Figure 31B:
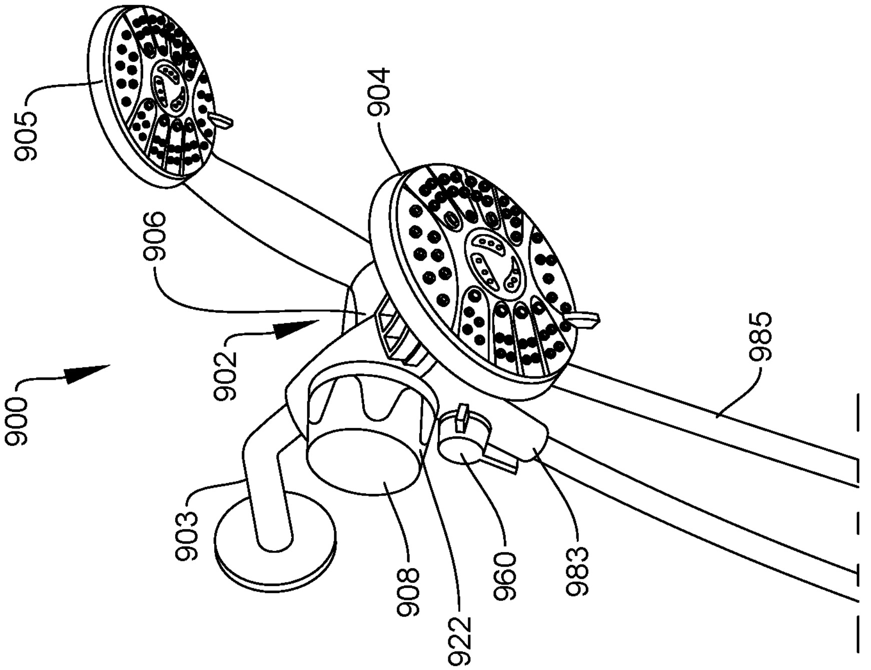
FIG. 31B shows a further perspective view of the shower filter system of FIG. 31A.
Figure 31A:
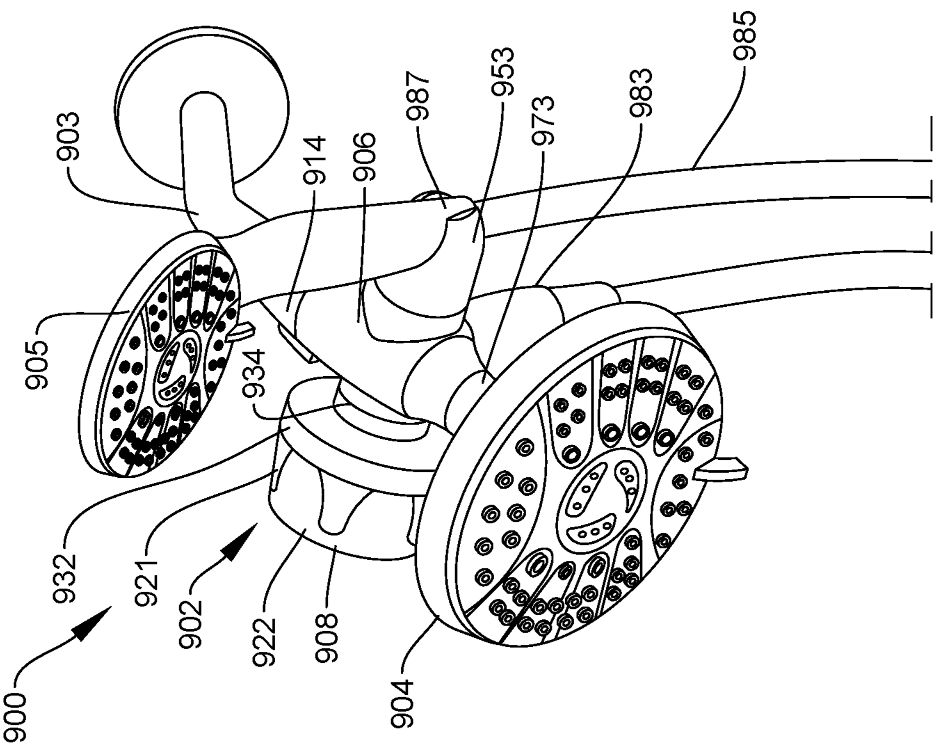
FIG. 31A shows a perspective view of an eleventh exemplary embodiment of a shower filter system according to the present disclosure.

FIGS. 29A-30 show a shower filter system 800 according to a tenth exemplary embodiment of the present disclosure. The shower filter system 800 is substantially similar to the shower filter system 700 (e.g., see FIG. 25). The shower filter system 800 may include a filter assembly 802, a shower head 804 and a hand shower (not shown). The filter assembly 802 includes an inlet pipe 806 and a filter 808.

The inlet pipe 806 of the filter assembly 802 is substantially similar to the inlet pipe 306 of the filter assembly 302 and includes a body 810 extending from a first end 810A to a second end 810B, a first plug 811, a second plug 812, a third plug 813, and a hand shower holder 853. The first plug 811 is inserted into the body 810, such that a portion of the first plug 811 extends past the first end 810A of the body 810. The first plug 811 is couplable to a water source via any method known to one skilled in the art (e.g., a threading connection). The second plug 812 extends outwardly from the body 810 in between the first end 810A and the second end 810B. The second plug 812 is connectable to a coupling end of a hose of a hand shower (not shown) via any method known to one skilled in the art (e.g., a threading connection), similar to the second plug 512 of the shower filter system 500 (e.g., see FIG. 23). The third plug 813 is inserted into the body 810, such that a portion of the third plug 813 extends past the second end 810B of the body 810. The third plug 813 is couplable to a coupling end 873 of the shower head 804 via any method known to one skilled in the art (e.g., a threading connection). The holder 853 is substantially similar to the holder 553 of the shower filter system 500. The holder 853 is coupled to the inlet pipe 806 via any method known to one skilled in the art (e.g., a threading connection, integrally formed) and extends outwardly from the body 810 in between the first end 810A and the second end 810B. In the exemplary embodiment, the holder 853 includes a pair of fingers 854 configured to tightly squeeze a portion of a handle of the hand shower.

The inlet pipe 806 may further include an upstream inlet pipe channel 836, a downstream inlet pipe channel 838, a passing channel 840, a hand shower channel 842, and a shower head channel 844. The upstream inlet pipe channel 836 extends through an upper portion of the body 810 of the inlet pipe 806 and connects the joint channel 834 to the filter 808 and further to the passing channel 840. The downstream inlet pipe channel 838 extends through a lower portion of the body 810 of the inlet pipe 806 and connects the shower head channel 844 to a shower head inlet passage 880 of the shower head 804. The hand shower channel 842 extends through a portion of the second plug 812 and connects the passing channel 840 to the hand shower. The flow of the shower water through the filter assembly 802 will be described in greater detail below.

The filter assembly 802 may further include a nut 814 and a ball joint 816. The ball joint 816 includes a ball 817 configured to be inserted into the inlet pipe 806, a socket 818 configured to connect the filter assembly 802 to the water source, and a joint channel 834 extending therethrough. The nut 814 is configured to be coupled to the first plug 811 via any method known to one skilled in the art (e.g., a threading connection) to tighten the inlet pipe 806 around the ball 817 of the ball joint 816. The nut 814 is moveable between a loose configuration and a tightened configuration. In the loose configuration, the nut 814 is loose around the ball 817, thus the inlet pipe 806 may rotate and move relative to the ball 817. In the tightened configuration, the nut 814 is tight around the ball 817, thus the inlet pipe 806 is fixed relative to the ball 817. Instead of a pair of wings, the nut 814 includes a plurality of ridges 815 along a circumference thereof and the ball joint 816 includes a plurality of ridges 819 along a circumference of the socket 818. In a further exemplary embodiment, each of the nut 814 and the socket 818 of the ball joint 816 may also include at least one wing (e.g., a wing similar to the wing 315) to help tighten the filter assembly 802 to the water source.

In the exemplary embodiment, the filter assembly 802 may further include a diverter switch 860, the diverter switch 860 being substantially similar to the diverter switch 109 of the shower filter system 200. The diverter switch 860 includes a body portion 862 coupled to the inlet pipe 806, a grip portion 864 configured to be gripped by the user to rotate the diverter switch 860, a protrusion 866 extending from the body portion 862 into the second plug 812, and a bracket 868. When the diverter switch 860 is in a shower head position, the shower water, regardless of whether the shower water is filtered or non-filtered, is diverted to the shower head 804. When the diverter switch 860 is in a hand shower position, the shower water, regardless of whether the shower water is filtered or non-filtered, is diverted to the hand shower. When the diverter switch 860 is in a combination position, the shower water (regardless of whether the shower water is filtered or non-filtered) is diverted to the shower head 804 and the hand shower, as will be described in further detail below. As will be understood by one with ordinary skill in the art, the diverter switch 860 may be any diverter switch known to one skilled in the arts for regulating the flow of shower water between the shower head 804 and the hand shower.

The diverter switch 860 is configured to be rotated about a longitudinal axis of the protrusion 866 between the shower head position, the hand shower position, and the combination position. The diverter switch 860 may be rotated in a first direction (e.g., clockwise) from the shower head position, to the hand shower position, to the combination position. The diverter switch 860 may then be rotated in a second direction (e.g., counter-clockwise) from the combination position, to the hand shower position, to the shower head position. The diverter switch 860 may have at least a tactile feedback and/or an audible feedback to notify the user that the diverter switch 860 is properly rotated between the three positions.

When in the diverter switch 860 is in the hand shower position, the bracket 868 abuts a first shoulder 870 of the second plug 812 to connect the passing channel 840 with the hand shower channel 842 and to close the shower head channel 844. Thus, in the hand shower position, the shower water is guided into the hand shower through the passing channel 840 and the hand shower channel 842. When in the diverter switch 860 is in the shower head position, the bracket 868 abuts a second shoulder 872 of the second plug 812 to connect the passing channel 840 with the shower head channel 844 and to close the hand shower channel 842. Thus, in the shower head position, the shower water is guided into the shower head 804 through the passing channel 840, through the shower head channel 844, and out through the downstream inlet pipe channel 838. When in the diverter switch 860 is in the combination position, the bracket 868 rests in between the first shoulder 870 and the second shoulder 872 to connect the passing channel 840 with the shower head channel 844 and the hand shower channel 842. Thus, in the combination position, the shower water is guided into the shower head 804 and the hand shower through the passing channel 840, the hand shower channel 842, and the shower head channel 844.

The filter 808 of the filter assembly 802 is substantially similar to the filter 308 of the filter assembly 302 (see FIG. 13). The filter 808 may include a connector (not shown) having a spout (not shown), a detachable housing 822, and a filter cartridge (not shown) configured to be housed between the connector and the detachable housing 822. The detachable housing 822 is configured to connect to the connector via any conventional method known to one skilled in the art (e.g., threading, snapping, locking and fitting), such that the detachable housing 822 may be separated from the connector by the user to replace the filter cartridge housed therein. In the exemplary embodiment, the detachable housing 822 may include a plurality of protrusions 821 for the user to grip the detachable housing 822. Further, the filter assembly 802 may include a base plate 832 and a ring 834 to cover the connector and form the seal between the inlet pipe 806 and the filter 808. Moreover, the filter assembly 802 may be configured to be in an active configuration (e.g., when the shower water gets filtered by the filter cartridge of the filter 808) and a bypass configuration (e.g., when the shower water is not filtered and bypasses the filter cartridge of the filter 808). The filter assembly 802 may be moved from the active configuration to the bypass configuration in a substantially similar manner as described above with respect to the filter assembly 302.

In the exemplary embodiment, the shower head 804 is a universal shower head that may be attached to the filter assembly 802. The shower head 804 includes the shower head inlet passage 880 extending partially therethrough and a face plate 877 with a plurality of nozzles 878 through which the shower water is dispersed onto the user. In an exemplary embodiment, the face plate 877 may be rotatable, such that rotation of the face plate 877 via a protrusion 879 controls which of the nozzles 878 disperse the shower water. The shower head 804 may be any commercially available shower head that has a coupling end couplable to the third plug 813 or the inlet pipe 806 via any method known to one skilled in the art (e.g., a threading connection). In a further exemplary embodiment, the shower head 804 may be a built-in shower head that is fixedly attached to or integrally formed with the inlet pipe 806, similar to the built-in shower head 404 of the shower filter system 400 (e.g., see FIG. 22). The hand shower (not shown) is substantially similar to the hand shower of the shower filter system 700. Similar to the shower filter system 700, the shower filter system 800 may be used with any commercially available hand shower. The hand shower may be any commercially available hand shower that has a hose with a coupling end couplable to the second plug 812 or the inlet pipe 806 via any method known to one skilled in the art (e.g., a threading connection).

As mentioned above, the diverter switch 860 may be moved between the shower head position, the hand shower position, and the combination position. When the shower filter system 800 is in the bypass configuration and the diverter switch 860 is in the shower head position, the shower water flows from the water source, through the joint channel 834, through the upstream inlet pipe channel 836, through the passing channel 840, through the shower head channel 844, through the downstream inlet pipe channel 838, through the shower head inlet passage 880, and through the shower head 804 onto the user. When the shower filter system 800 is in the bypass configuration and the diverter switch 860 is in the hand shower position, the shower water flows from the water source, through the joint channel 834, through the upstream inlet pipe channel 836, through the passing channel 840, through the hand shower channel 842, and through the hand shower onto the user. When the shower filter system 800 is in the bypass configuration and the diverter switch 860 is in the combination position, the unfiltered shower water flows in the same manner as above, but through both the hand shower channel 842 and the shower head channel 844.

Further, when the shower filter system 800 is in the active configuration and the diverter switch 860 is in the shower head position, the shower water flows from the water source, through the joint channel 834, through the upstream inlet pipe channel 836, and through the spout (not shown) into the filter 808. The filtered shower water then exits the filter 808 through the spout and the passes through the passing channel 840, through the shower head channel 844, through the downstream inlet pipe channel 838, through the shower head inlet passage 880, and through the shower head 804 onto the user. When the shower filter system 800 is in the active configuration and the diverter switch 860 is in the hand shower position, the shower water flows from the water source, through the joint channel 834, through the upstream inlet pipe channel 836, and through the spout (not shown) into the filter 808. The filtered shower water then exits the filter 808 through the spout and the passes through the passing channel 840, through the hand shower channel 842, and through the hand shower onto the user. When the shower filter system 800 is in the active configuration and the diverter switch 860 is in the combination position, the filtered shower water flows in the same manner as above, but through both the hand shower channel 842 and the shower head channel 844.

FIGS. 31A-32B show a shower filter system 900 according to an eleventh exemplary embodiment of the present disclosure. The shower filter system 900 is substantially similar to the shower filter system 700 (e.g., see FIG. 25). The shower filter system 900 may include a filter assembly 902, a water source 903 (e.g., a shower arm), a shower head 904 and a hand shower 905. The filter assembly 902 includes an inlet pipe 906 and a filter 908.

The inlet pipe 906 of the filter assembly 902 is substantially similar to the inlet pipe 706 of the filter assembly 702 (e.g., see FIG. 30A). The inlet pipe 906 includes a body 910, a first plug (not shown), a second plug 912, a third plug (not shown), and a hand shower holder 953. The first, second, and thirds plugs are inserted into the inlet pipe 906 in a substantially similar manner as the first, second and third plugs 811, 812, 813 are inserted into the inlet pipe 806. The first plug is couplable to a water source via any method known to one skilled in the art (e.g., a threading connection). The second plug 912 is connectable to a coupling end 983 of a hose 985 of the hand shower 905 via any method known to one skilled in the art (e.g., a threading connection). The third plug is couplable to a coupling end 973 of the shower head 904 via any method known to one skilled in the art (e.g., a threading connection). The holder 953 is substantially similar to the holder 753 of the shower filter system 700. The holder 953 is coupled to the inlet pipe 906 via any method known to one skilled in the art (e.g., a threading connection, integrally formed) and includes a pair of fingers 954 configured to tightly squeeze a portion of handle 987 of the hand shower 905.

In the exemplary embodiment, the filter assembly 902 may further include a nut 914 couplable to the first plug. The nut 914 may be substantially similar to the nut 714 of the shower filter system 700 and may include at least one wing 915 for tightening the inlet pipe 906 to the water source 903. Although the exemplary embodiment discloses the nut 914 having a pair of wings 915, in a further embodiment, the nut 914 may include more or less than two wings 915. Further, the nut 914 may have a plurality of ridges (not shown) for the user to grip when tightening the inlet pipe 906 to the water source 903.

Figure 32B:
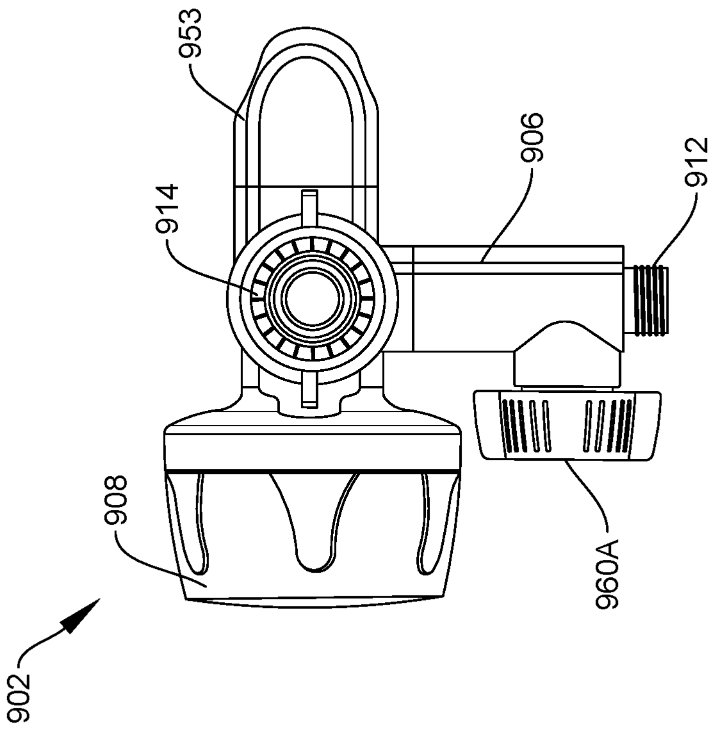
FIG. 32B shows a top view of a second embodiment of a filter assembly of the shower filter system of FIG. 31A.
Figure 32A:
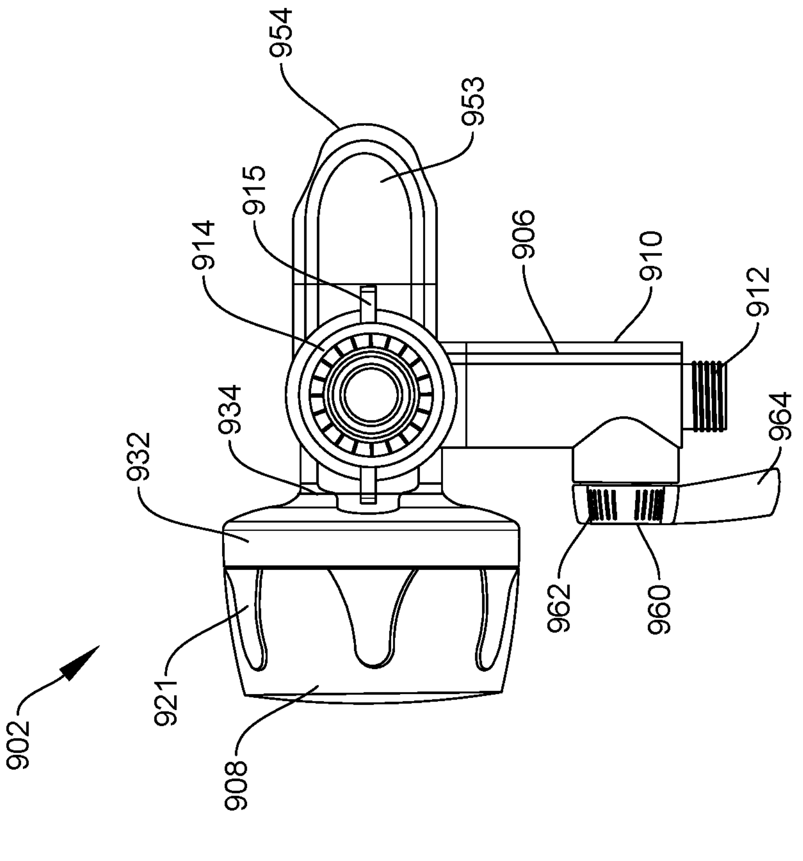
FIG. 32A shows a top view of a first embodiment of a filter assembly of the shower filter system of FIG. 31A.

In the exemplary embodiment, the filter assembly 902 may further include a diverter switch 960 that functions substantially similar to the diverter switch 760 of the shower filter system 700. The diverter switch 960 includes a body portion 962 coupled to the inlet pipe 906, a grip portion 964 configured to be gripped by the user to rotate the diverter switch 960, a protrusion (not shown) extending from the body portion 962 into the second plug 912, and a bracket (not shown). Similar to the diverter switch 760, the diverter switch 960 may be rotated between a shower head position (e.g., the shower water passes through the shower head 904), a hand shower position (e.g., the shower water passes through the hand shower 905), and a combination position (e.g., the shower water passes through both the shower head 904 and the hand shower 905). As shown in FIG. 32B, a diverter switch 960A may be used with the filter assembly 902 instead of the diverter switch 960. The diverter switch 960A may be substantially similar to the diverter switch 860 of the shower filter system 800.

The filter 908 of the filter assembly 902 is substantially similar to the filter 308 of the filter assembly 302 (e.g., see FIG. 13). The filter 908 may include a connector (not shown) having a spout (not shown), a detachable housing 922, and a filter cartridge (not shown) configured to be housed between the connector and the detachable housing 922. The detachable housing 922 is configured to connect to the connector via any conventional method known to one skilled in the art (e.g., threading, snapping, locking and fitting), such that the detachable housing 922 may be separated from the connector by the user to replace the filter cartridge housed therein. In the exemplary embodiment, the detachable housing 922 may include a plurality of protrusions 921 for the user to grip the detachable housing 922. Further, the filter assembly 902 may include a base plate 932 and a ring 934 to cover the connector and form the seal between the inlet pipe 906 and the filter 908. Moreover, the filter assembly 902 may be configured to be in an active configuration (e.g., when the shower water gets filtered by the filter cartridge of the filter 908) and a bypass configuration (e.g., when the shower water is not filtered and bypasses the filter cartridge of the filter 908). The filter assembly 902 may be moved from the active configuration to the bypass configuration in a substantially similar manner as described above with respect to the filter assembly 302.

In the exemplary embodiment, the shower head 904 is a universal shower head that may be attached to the filter assembly 902. The shower head 904 may be any commercially available shower head that has a coupling end couplable to the third plug or the inlet pipe 906 via any method known to one skilled in the art (e.g., a threading connection). In a further exemplary embodiment, the shower head 904 may be a built-in shower head that is fixedly attached to or integrally formed with the inlet pipe 906, similar to the built-in shower head 404 of the shower filter system 400 (e.g., see FIG. 22). The hand shower 905 is substantially similar to the hand shower 84 of the shower filter system 180 (see FIGS. 11A-11C). Similar to the shower filter system 800, the shower filter system 900 may be used with any commercially available hand shower. The hand shower 905 may be any commercially available hand shower that has a hose with a coupling end couplable to the second plug 912 or the inlet pipe 906 via any method known to one skilled in the art (e.g., a threading connection).

Figure 33B:
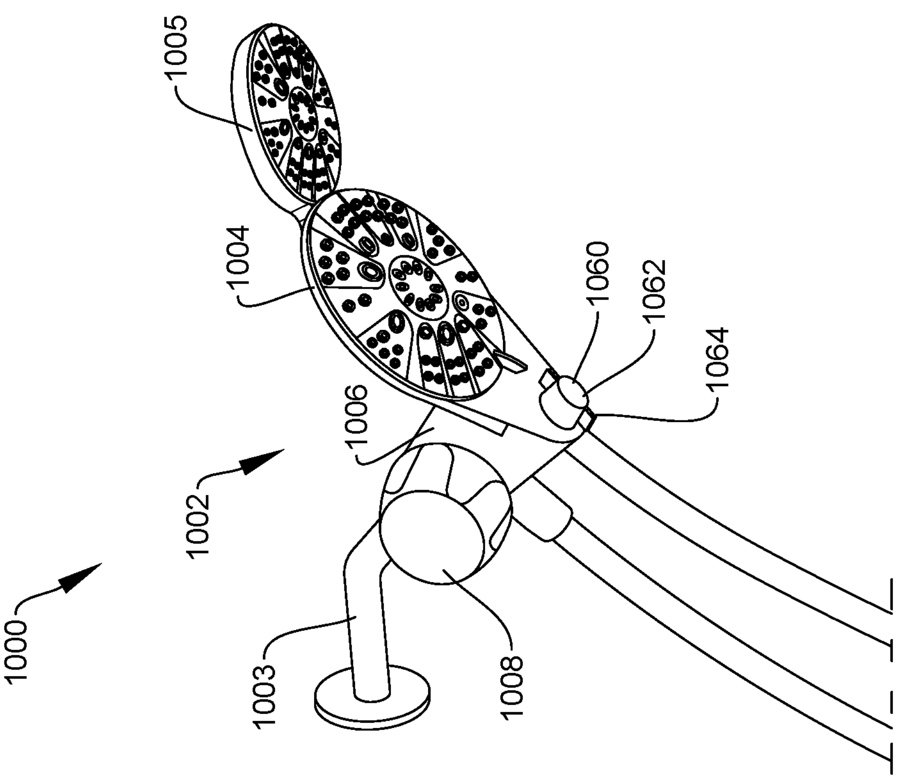
FIG. 33B shows a further perspective view of the shower filter system of FIG. 33A.
Figure 33A:
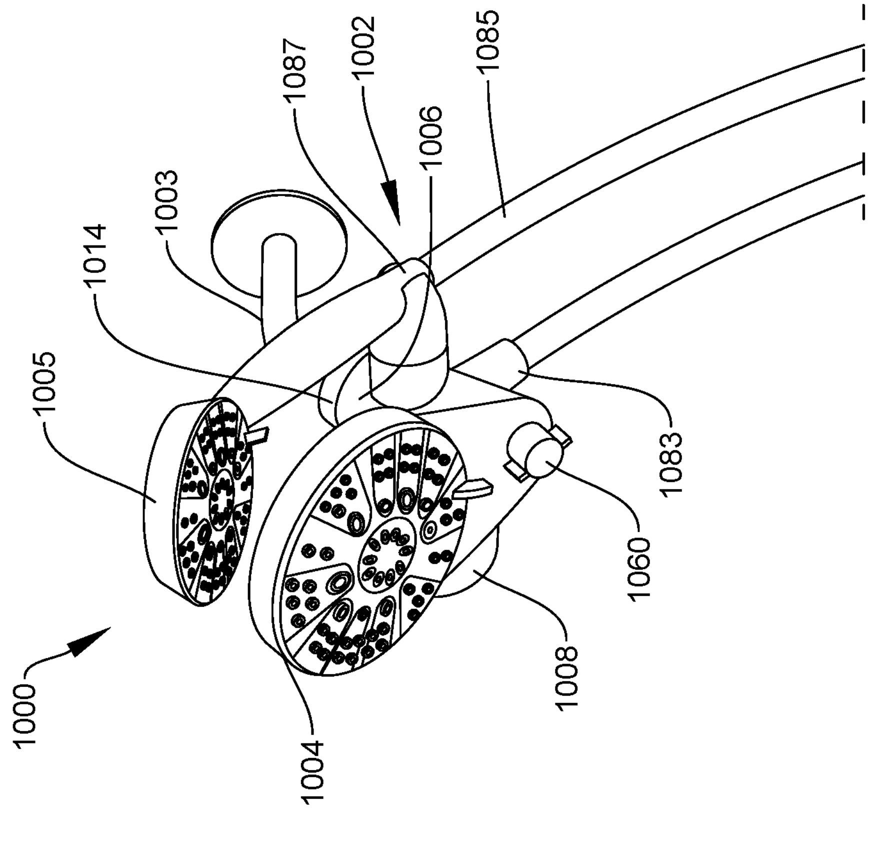
FIG. 33A shows a perspective view of a twelfth exemplary embodiment of a shower filter system according to the present disclosure.
Figure 34:
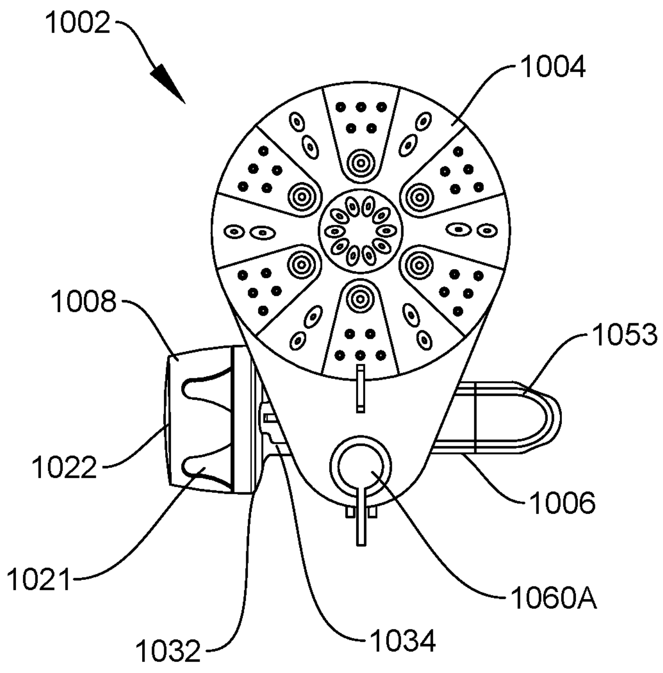
FIG. 34 shows a front view of a second embodiment of a built-in shower head of the shower filter system of FIG. 33A.

FIGS. 33A-34 show a shower filter system 1000 according to a twelfth exemplary embodiment of the present disclosure. The shower filter system 1000 is substantially similar to the shower filter system 900 (e.g., see FIG. 31A), however the shower filter system 1000 includes a built-in shower head instead of a universal shower head. The shower filter system 1000 may include a filter assembly 1002, a water source 1003 (e.g., a shower arm), a built-in shower head 1004 and a hand shower 1005. The filter assembly 1002 includes an inlet pipe 1006 and a filter 1008.

The inlet pipe 1006 of the filter assembly 1002 is substantially similar to the inlet pipe 806 of the filter assembly 802 (e.g., see FIG. 30A). The inlet pipe 1006 includes a body 1010, a first plug (not shown), a second plug (not shown), and a hand shower holder 1053. The first and second plugs are inserted into the inlet pipe 1006 in a substantially similar manner as the first and second plugs 811, 812, are inserted into the inlet pipe 806. The first plug is couplable to a water source via any method known to one skilled in the art (e.g., a threading connection). The second plug is connectable to a coupling end 1083 of a hose 1085 of the hand shower 1005 via any method known to one skilled in the art (e.g., a threading connection). The holder 1053 is substantially similar to the holder 853 of the shower filter system 800. The holder 1053 is coupled to the inlet pipe 1006 via any method known to one skilled in the art (e.g., a threading connection, integrally formed) and includes a pair of fingers 1054 configured to tightly squeeze a portion of handle 1087 of the hand shower 1005.

In the exemplary embodiment, the filter assembly 1002 may further include a nut 1014 couplable to the first plug. The nut 1014 may be substantially similar to the nut 714 of the shower filter system 700 and may include at least one wing 1015 for tightening the inlet pipe 1006 to the water source 1003. The nut 1014 may include at least one wing (not shown) similar to the wing 915 of the nut 914. Further, the nut 1014 may have a plurality of ridges (not shown) for the user to grip when tightening the inlet pipe 1006 to the water source 1003.

In the exemplary embodiment, the filter assembly 1002 may further include a diverter switch 1060 that functions substantially similar to the diverter switch 1060 of the shower filter system 800. The diverter switch 1060 includes a body portion 1062 coupled to the built-in shower head 1004, a grip portion 1064 configured to be gripped by the user to rotate the diverter switch 1060, a protrusion (not shown) extending from the body portion 1062 into the inlet pipe 1006, and a bracket (not shown). Similar to the diverter switch 860, the diverter switch 1060 may be rotated between a shower head position (e.g., the shower water passes through the built-in shower head 1004), a hand shower position (e.g., the shower water passes through the hand shower 1005), and a combination position (e.g., the shower water passes through both the built-in shower head 1004 and the hand shower 1005). As shown in FIG. 34, a diverter switch 1060A may be used with the filter assembly 1002 instead of the diverter switch 1060. The diverter switch 1060A may be substantially similar to the diverter switch 960 of the shower filter system 900.

The filter 1008 of the filter assembly 1002 is substantially similar to the filter 308 of the filter assembly 302 (e.g., see FIG. 13). The filter 1008 may include a connector (not shown) having a spout (not shown), a detachable housing 1022, and a filter cartridge (not shown) configured to be housed between the connector and the detachable housing 1022. The detachable housing 1022 is configured to connect to the connector via any conventional method known to one skilled in the art (e.g., threading, snapping, locking and fitting), such that the detachable housing 1022 may be separated from the connector by the user to replace the filter cartridge housed therein. In the exemplary embodiment, the detachable housing 1022 may include a plurality of protrusions 1021 for the user to grip the detachable housing 1022. Further, the filter assembly 1002 may include a base plate 1032 and a ring 1034 to cover the connector and form the seal between the inlet pipe 1006 and the filter 1008. Moreover, the filter assembly 1002 may be configured to be in an active configuration (e.g., when the shower water gets filtered by the filter cartridge of the filter 1008) and a bypass configuration (e.g., when the shower water is not filtered and bypasses the filter cartridge of the filter 1008). The filter assembly 1002 may be moved from the active configuration to the bypass configuration in a substantially similar manner as described above with respect to the filter assembly 302.

In the exemplary embodiment, instead of a third plug and a coupling end, the built-in shower head 1004 is fixedly attached to and extends from the inlet pipe 1006. The built-in shower head 1004 may be integrally formed with the inlet pipe 1006, similar to the built-in shower head 404 of the shower filter system 400 (e.g., see FIG. 22). Further, in the exemplary embodiment, the hand shower 1005 is substantially similar to the hand shower 905 of the shower filter system 900 (e.g., see FIG. 31A). Similar to the shower filter system 800, the shower filter system 1000 may be used with any commercially available hand shower. The hand shower 1005 may be any commercially available hand shower that has a hose with a coupling end couplable to the second plug 1012 via any method known to one skilled in the art (e.g., a threading connection). In a further embodiment, the hand shower may be any commercially available hand shower that has a hose with a coupling end couplable to the inlet pipe 1006 via any method known to one skilled in the art (e.g., a threading connection) without coupling to the second plug 1012. The hand shower 1005 may then be separated from the filter assembly 1002 and replaced by a new hand shower without having any impact on the filter assembly 1002.

Figure 35:
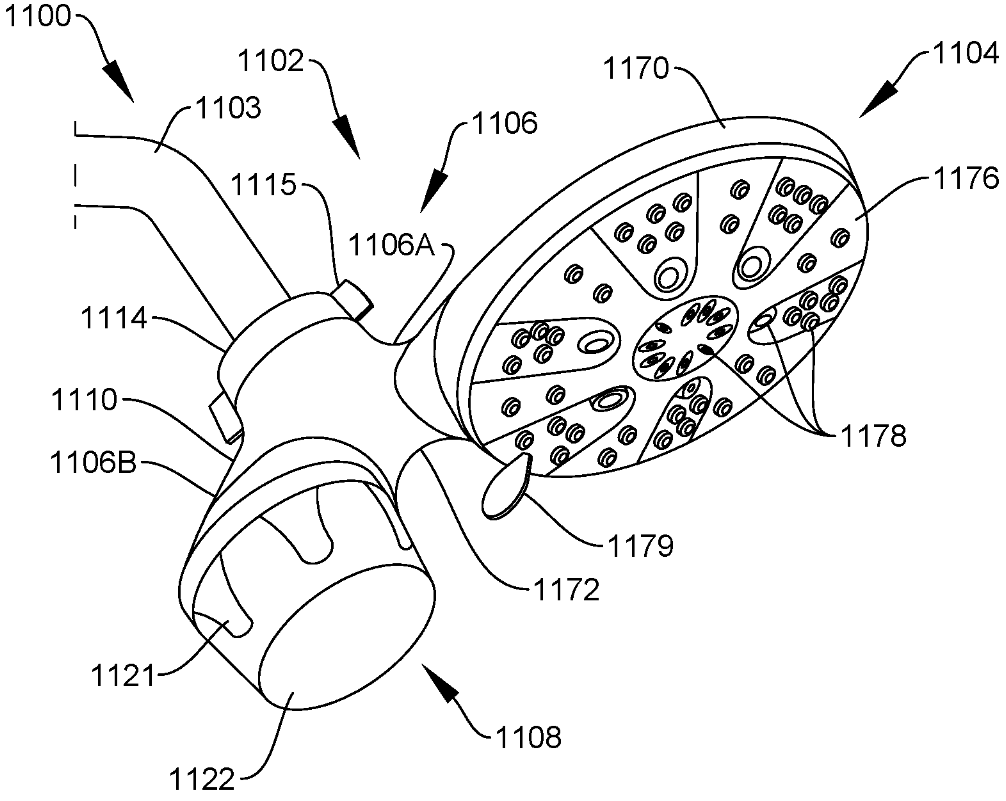
FIG. 35 shows a perspective view of a thirteenth exemplary embodiment of a shower filter system according to the present disclosure.

FIG. 35 shows a shower filter system 1100 according to a thirteenth exemplary embodiment of the present disclosure. The shower filter system 1100 is substantially similar to the shower filter system 170 (e.g., see FIGS. 10A, B). The shower filter system 1100 may include a filter assembly 1102 and a water source 1103 (e.g., a shower arm). The filter assembly 1102 includes a built-in shower head portion 1104, an inlet pipe portion 1106, and a filter 1108. As will be described in greater detail below, the filter assembly 1102 may be configured to be in an active configuration (e.g., when the shower water gets filtered by a filter cartridge 1124 of the filter 1108) and a bypass configuration (e.g., when the shower water is not filtered and bypasses the filter cartridge 1124 of the filter 1108). The filter assembly 1102 may be moved from the active configuration to the bypass configuration in a substantially similar manner as described above with respect to the filter assembly 302.

The built-in shower head portion 1104 includes a head portion 1170 and a neck portion 1172. The head portion 1170 includes a back plate 1174 extending integrally from a first end 1106A of the inlet pipe portion 1106 and a face plate 1176 coupled to the back plate 1174. The face plate 1176 includes a plurality of nozzles 1178 extending therethrough. In an exemplary embodiment, the face plate 1176 may be rotatable relative to the back plate 1174, such that rotation of the face plate 1176 via a protrusion 1179 controls which of the nozzles 1178 disperse the shower water onto the user. The neck portion 1172 may be substantially concave for the user to grip when coupling the filter assembly 1102 to the water source 1103.

The inlet pipe portion 1106 extends from the first end 1106A to a second end 1106B and includes a body 1110, a plug 1111, and an inlet pipe channel 1136 extending through the plug 1111 and a portion of the body 1110. The plug 1111 is inserted into the body 1110, such that a portion of the plug 1111 extends past the body 1110. The plug 1111 is couplable to the water source 1103 via any method known to one skilled in the art (e.g., a threading connection). In the exemplary embodiment, the filter assembly 1102 may further include a nut 1114 couplable to the plug 1111. The nut 1114 may be substantially similar to the nut 314 of the shower filter system 300 and may include at least one wing 1115 for tightening the inlet pipe portion 1106 to the water source 1103. Although the exemplary embodiment discloses the nut 1114 having a pair of wings 1115, in a further embodiment, the nut 1114 may include more or less than two wings 1115. Further, the nut 1114 may have a plurality of ridges for the user to grip when tightening the inlet pipe portion 1106 to the water source 1103.

The filter 1108 includes a connector 1120, a detachable housing 1122, and the filter cartridge 1124 configured to be housed between the connector 1120 and the detachable housing 1122. As will be described in greater detail below, the connector 1120 is couplable to the second end 1106B of the inlet pipe portion 1106 and rotatable relative to the inlet pipe portion 1106. The detachable housing 1122 is configured to connect to the connector 1120 via any conventional method known to one skilled in the art (e.g., threading, snapping, locking and fitting), such that the detachable housing 1122 may be separated from the connector 1120 by the user to replace the filter cartridge 1124 housed therein. In an alternative exemplary embodiment, the connector 1120 and the detachable housing 1122 may be constructed as a single piece (not shown). In the exemplary embodiment, the detachable housing 1122 may include a plurality of protrusions 1121 extending about a circumference thereof for the user to grip the detachable housing 1122. The plurality of protrusions 1121 may be composed of or covered by an anti-slip material. In addition, the plurality of protrusions 1121 may be composed of an antimicrobial material. A remaining portion of the detachable housing 1122 may be composed of or covered by an anti-slip material and/or an antimicrobial material.

Figure 38:
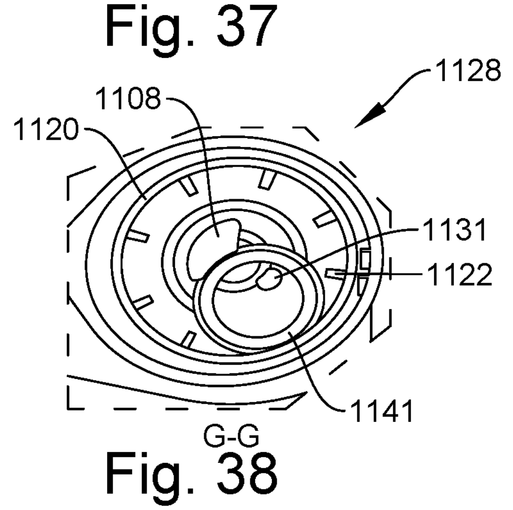
FIG. 38 shows a cross section of a filter of the shower filter system of FIG. 35 in an active configuration.
Figure 41:
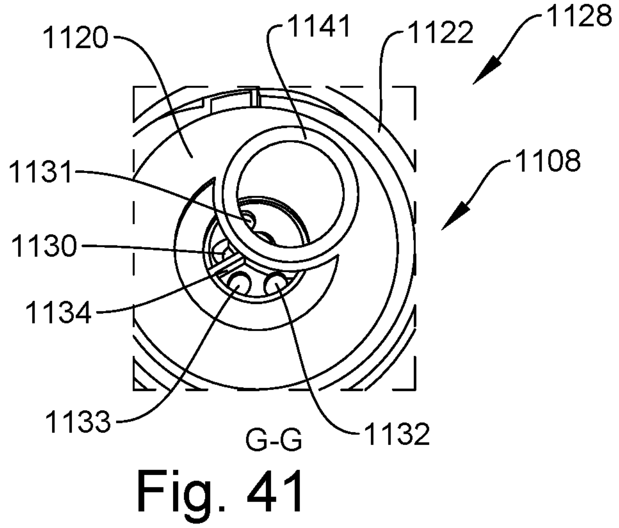
FIG. 41 shows a cross section of a filter of the shower filter system of FIG. 35 in a bypass configuration.

The connector 1120 is configured to rotate about a longitudinal axis L2 thereof and to receive at least a portion of the filter cartridge 1124 therein. Similar to the filter cartridge 324 of the shower filter system 300, the filter cartridge 1124 may include a plurality of grooves (not shown) sized and shaped to slide over a plurality of protrusions (not shown) extending along an interior portion of the connector 1120 to guide the filter cartridge 1124 into the connector 1120. When the filter cartridge 1124 is received in the connector 1120 and the detachable housing 1122 is coupled to the connector 1120, a filter cartridge surrounding channel 1144 is formed (e.g., see FIG. 36). In the exemplary embodiment, when the detachable housing 1122 is not coupled to the connector 1120, the user may slide the filter cartridge 1124 along the longitudinal axis L2 to insert and remove the filter cartridge 1124 from the connector 1120. In a further embodiment, the filter cartridge 1124 may be fixed relative to the connector 1120 via a locking mechanism (e.g., tabs, snap-fit, etc.). In the exemplary embodiment, instead of the connector 1120 including a spout (e.g., the spout 328 of the connector 320), the connector 1120 includes a shower water directing mechanism 1128. As shown in FIGS. 38 and 41, the directing mechanism 1128 may include a filter input hole 1130, a filter output hole 1131, a bypass input hole 1132, a bypass output hole 1133, and a recess 1134, functions of which will be described in greater detail below.

As shown in FIGS. 36-41, the filter assembly 1102 includes a connector inlet channel 1142, a filter bypass channel 1143, the filter cartridge surrounding channel 1144, a valve 1145, a connector outlet channel 1146 and a shower head channel 1148. The connector inlet channel 1142 directs unfiltered water from the inlet pipe channel 1136 toward the directing mechanism 1128. The filter bypass channel 1143 directs unfiltered water away from the filter cartridge 1124. The filter cartridge surrounding channel 1144 directs unfiltered water toward the filter cartridge 1124. The shower head channel 1148 directs the water from the connector outlet channel 1146 and through the built-in shower head portion 1104. The valve 1145 regulates the flow of filtered water out of a mouth 1141 of the filter cartridge 1124. In the exemplary embodiment, the valve 1145 may be a one-way pressure valve configured to open when a pressure of the filtered water exiting the filter cartridge 1124 through the mouth 1141 is above a predetermined threshold. In other words, when the pressure of the filtered water is above the predetermined threshold, the valve 1145 opens and the filtered water flows through it.

Figure 36:
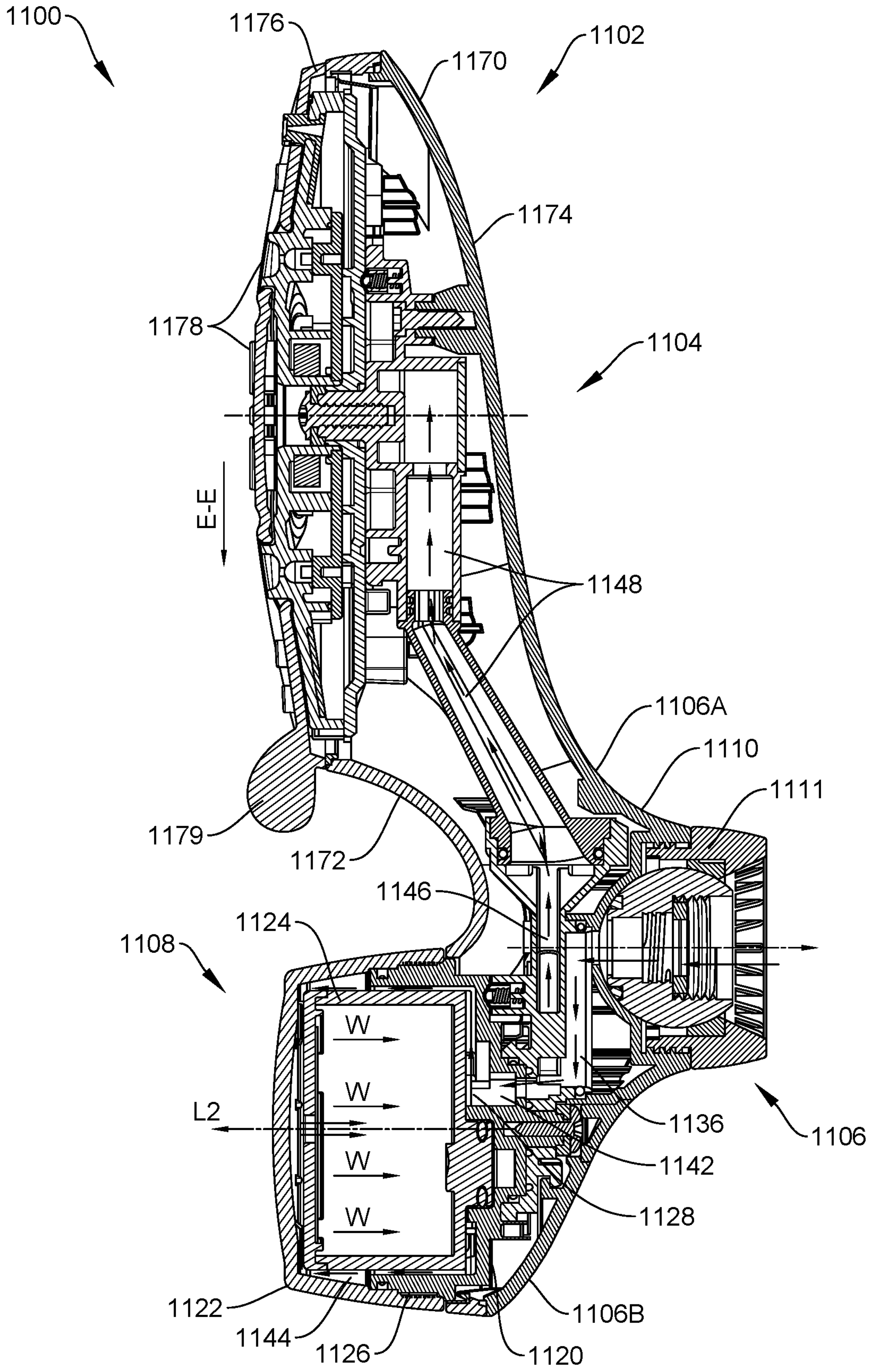
FIG. 36 shows a first cross section of the shower filter system of FIG. 35 in an active configuration.
Figure 37:
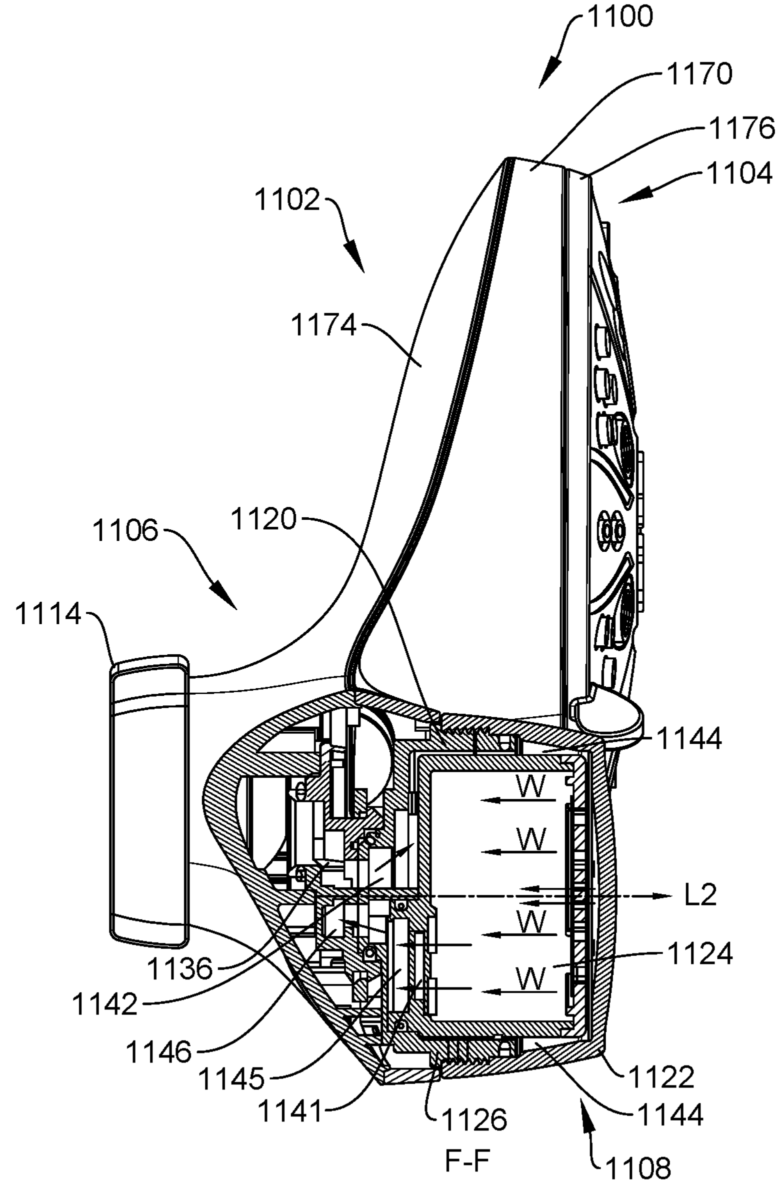
FIG. 37 shows a second cross section of the shower filter system of FIG. 35 in an active configuration.
Figure 39:
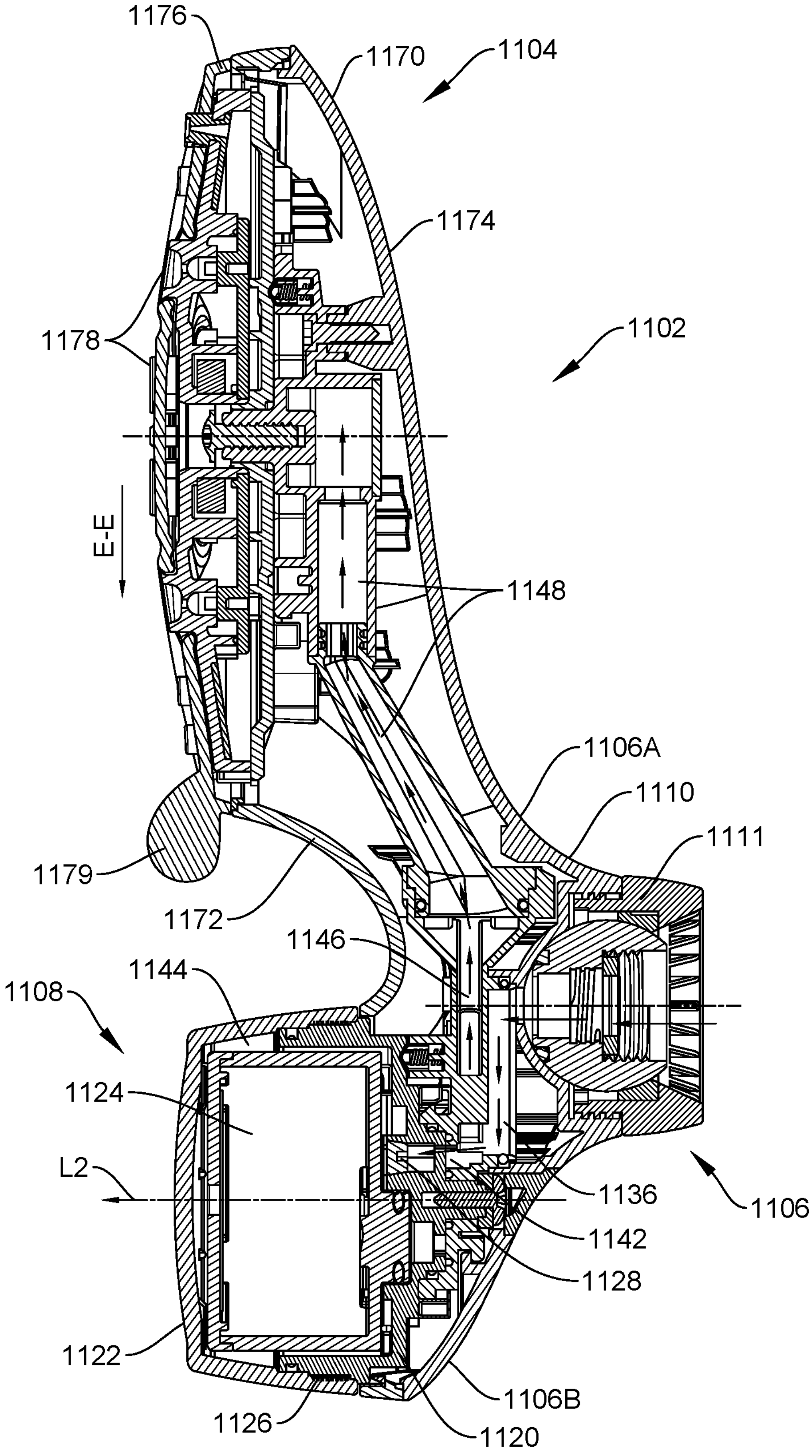
FIG. 39 shows a first cross section of the shower filter system of FIG. 35 in a bypass configuration.
Figure 40:
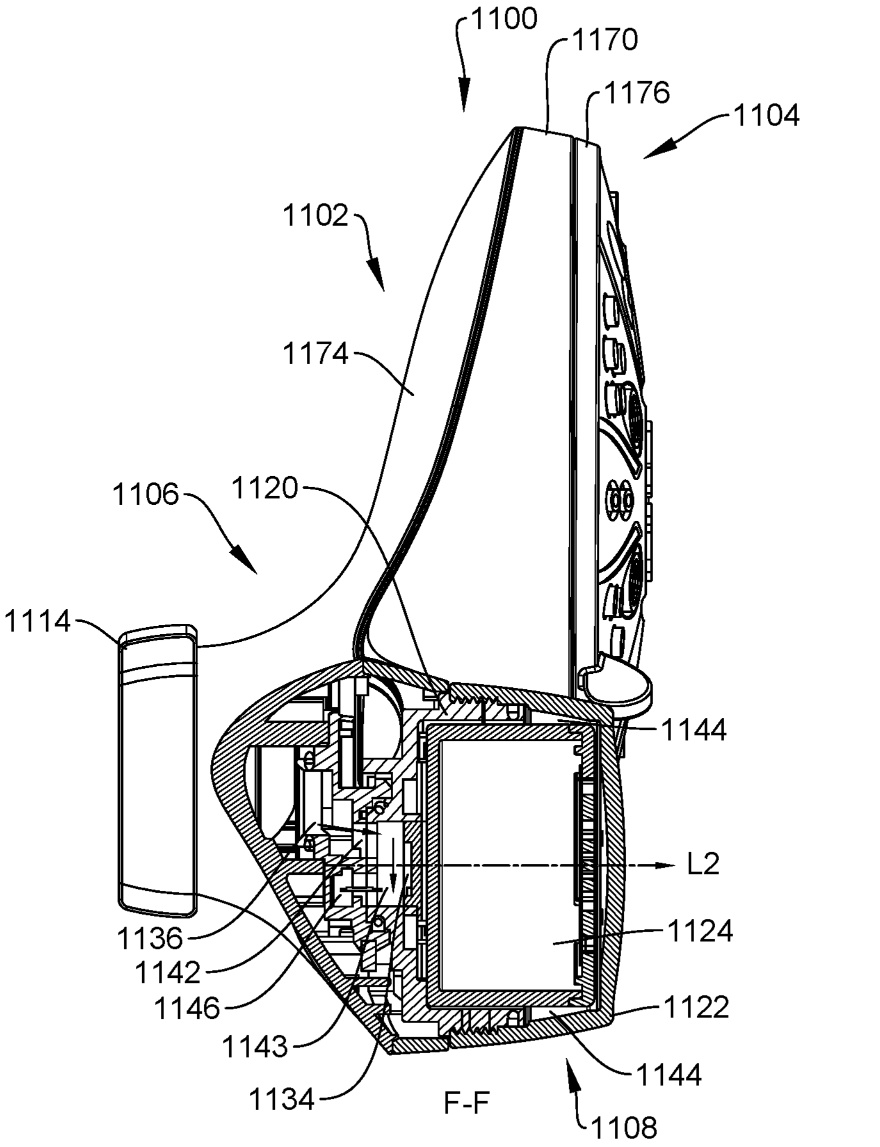
FIG. 40 shows a second cross section of the shower filter system of FIG. 35 in a bypass configuration.

FIGS. 36-41 show cross-sections of the filter assembly 1102 in the active and the bypass configurations. In particular, FIG. 36 shows a cross-section E-E of the filter assembly 1102 in the active configuration. FIG. 37 shows a cross section F-F of the filter assembly 1102 in the active configuration, the cross-section F-F being orthogonal to the cross-section E-E. FIG. 38 shows a cross section G-G of the filter 1108 of the filter assembly 1102 in the active configuration, the cross-section G-G being orthogonal to the cross-section E-E and orthogonal to the cross-section F-F. FIG. 39 shows the cross-section E-E of the filter assembly 1102 in the bypass configuration. FIG. 40 shows the cross-section F-F of the filter assembly 1102 in the bypass configuration. FIG. 41 shows the cross-section G-G of the filter 1108 in the bypass configuration.

As shown in FIGS. 36-38, when the filter assembly 1102 is in the active configuration, the shower water, as shown by the arrows, enters through the inlet pipe channel 1136, flows through the filter cartridge 1124, and exits through the shower head channel 1148. Specifically, when the filter assembly 1102 is in the active configuration, the filter input hole 1130 of the directing mechanism 1128 aligns with the connector inlet channel 1142 and the filter output hole 1131 of the directing mechanism 1128 aligns with the connector outlet channel 1146. Accordingly, the unfiltered shower water is directed from the inlet pipe channel 1136, through the connector inlet channel 1142, through the filter input hole 1130, and into the filter cartridge surrounding channel 1144. The unfiltered shower water then surrounds the filter cartridge 1124 and enters the filter cartridge 1124 through a plurality of openings in a filter cover (not shown) of the filter cartridge 1124. The unfiltered water filters as it permeates through the filter cartridge 1124. The now filtered shower water, as still shown by the arrows, flows out of the mouth 1141 of the filter cartridge 1124, through the valve 1145, through the filter output hole 1131, through the connector outlet channel 1146, and into the shower head channel 1148. The filtered water then flows out of the shower head channel 1148, through the nozzles 1178 of the head portion 1170, and onto the user.

As shown in FIGS. 39-41, when the filter assembly 1102 is in the bypass configuration, the shower water, as shown by the arrows, enters through the inlet pipe channel 1136, bypasses the filter cartridge 1124, and exits through the shower head channel 1148. Specifically, when the filter assembly 1102 is in the bypass configuration, the bypass input hole 1132 of the directing mechanism 1128 and the bypass output hole 1133 of the directing mechanism 1128 align with the recess 1134 of the connector to form the filter bypass channel 1143. Accordingly, the unfiltered shower water is directed from the inlet pipe channel 1136, through the connector inlet channel 1142, through the bypass input hole 1132, through the filter bypass channel 1143, through the bypass output hole 1133, through the connector outlet channel 1146, and into the shower head channel 1148. Having bypassed the filter cartridge 1124, the unfiltered shower water, as still shown by the arrows, then flows out of the shower head channel 1148, through the nozzles 1178 of the head portion 1170, and onto the user.

Similar to the filter cartridge 324 of the shower filter system 300, once the filter cartridge 1124 gets at least partially filled with sedatives and residue, it may cause the water pressure to drop in the built-in shower head portion 1104. Subsequently, the user may desire to replace the filter cartridge 1124. To replace the filter cartridge 1124, the user must first turn off the water flow from the water source 1103 so that the water stops flowing from the water source 1103 into the inlet pipe portion 1106. Then, the user may uncouple the detachable housing 1122 from the connector 1120 (e.g., by moving the filter assembly 1102 into the bypass configuration and continuously twisting the detachable housing 1122 relative to the connector 1120) and replace the filter cartridge 1124 housed therein with a new filter cartridge 1124.

Figure 42:
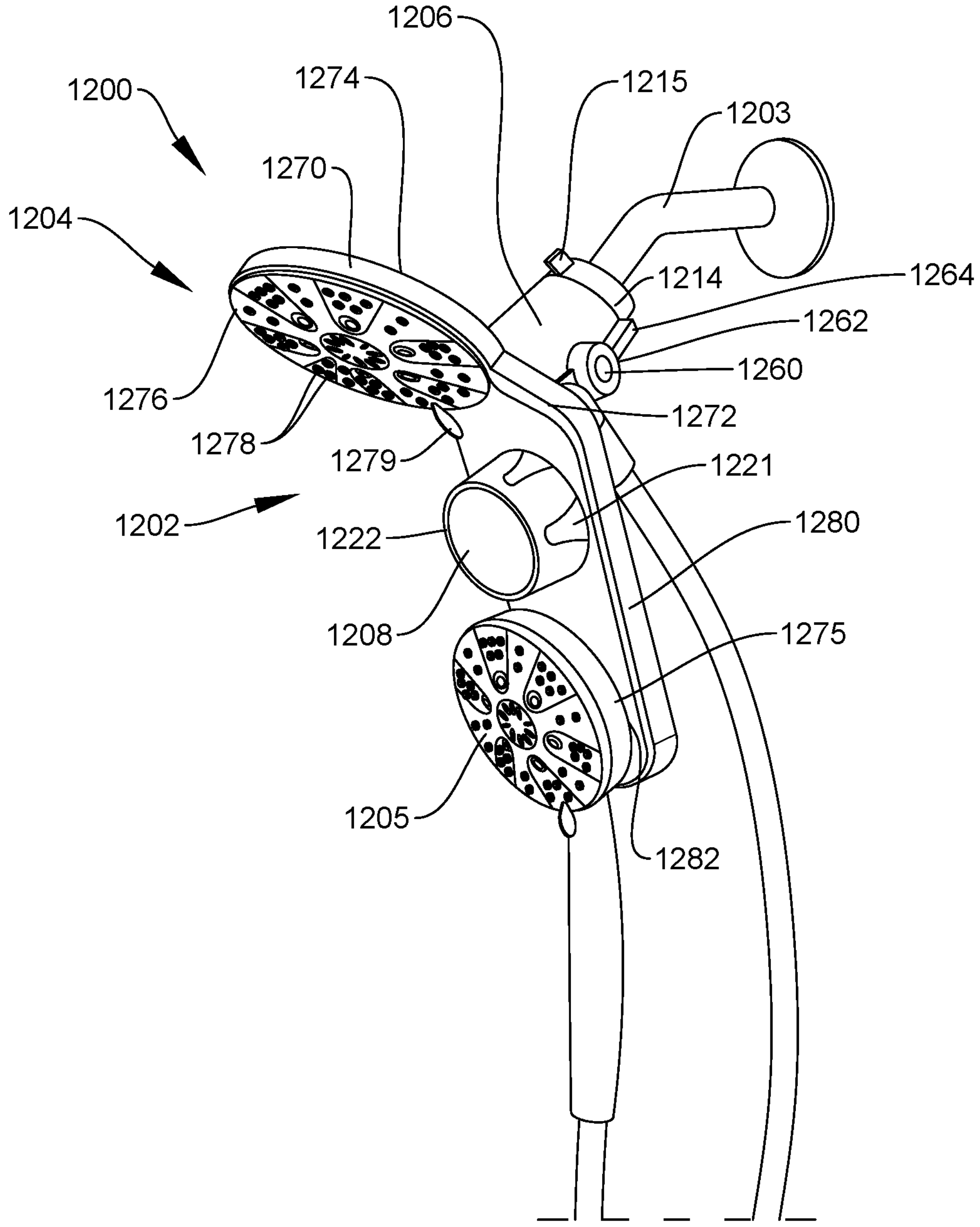
FIG. 42 shows a perspective view of a fourteenth exemplary embodiment of a shower filter system according to the present disclosure.

FIG. 42 shows a shower filter system 1200 according to a fourteenth exemplary embodiment of the present disclosure. The shower filter system 1200 is substantially similar to the shower filter system 1100 (e.g., see FIG. 35), however the shower filter system 1200 is configured to include both a built-in shower head and a hand shower, similar to the shower filter system 900 (e.g., see FIG. 31A). The shower filter system 1200 may include a filter assembly 1202 and a water source 1203 (e.g., a shower arm). The filter assembly 1202 includes a built-in shower head portion 1204, a hand shower 1205, an inlet pipe portion 1206, and a filter 1208.

The built-in shower head portion 1204 includes a head portion 1270, a neck portion 1272, and a handle portion 1280. The head portion 1270 extends integrally from the inlet pipe portion 1206. The head portion 1270 includes a back plate 1274 and a face plate 1276 coupled to the back plate 1274. The face plate 1276 includes a plurality of nozzles 1278 extending therethrough. In an exemplary embodiment, the face plate 1276 may be rotatable relative to the back plate 1274, such that rotation of the face plate 1276 via a protrusion 1279 controls which of the nozzles 1278 disperse the shower water onto the user. The neck portion 1272 extends integrally from the head portion 1270.

The handle portion 1280 extends integrally from the inlet pipe portion 1206. The handle portion 1280 extends from the neck portion 1272 of the built-in shower head portion 1204 to a hand shower coupling mechanism (not shown). The coupling mechanism is configured to couple the hand shower 1205 to the handle portion 1280. In the exemplary embodiment, the coupling mechanism includes a first magnet (not shown) embedded in a front plate 1282 of the handle portion 1280, the first magnet configured to couple to a second magnet (not shown) embedded in a head portion 1275 of the hand shower 1205. The first magnet and the second magnet may be substantially similar to the magnet 654 of the shower filter system 600 (see FIG. 24). In a further exemplary embodiment, the coupling mechanism 1250 may protrude perpendicularly from the front plate 1282 of the handle portion 1280 and include the first magnet embedded therein. In a further exemplary embodiment, the coupling mechanism may be a hand shower holder similar to the holder 1053 of the shower filter system 1000 (e.g., see FIG. 33A).

The inlet pipe portion 1206 includes a body 1210, a plug (not shown), and an inlet pipe channel (not shown) extending therethrough. The plug is inserted into the body 1210, such that a portion of the plug extends past the body 1210. The plug is couplable to the water source 1203 via any method known to one skilled in the art (e.g., a threading connection). In the exemplary embodiment, the filter assembly 1202 may further include a nut 1214 couplable to the plug. The nut 1214 may be substantially similar to the nut 314 of the shower filter system 300 and may include at least one wing 1215 for tightening the inlet pipe portion 1206 to the water source 1203. Although the exemplary embodiment discloses the nut 1214 having a pair of wings 1215, in a further embodiment, the nut 1214 may include more or less than two wings 1215. Further, the nut 1214 may have a plurality of ridges for the user to grip when tightening the inlet pipe portion 1206 to the water source 1203.

The filter 1208 includes a connector (not shown), a detachable housing 1222, and the filter cartridge (not shown) configured to be housed between the connector and the detachable housing 1222. As will be described in greater detail below, the connector is couplable to the handle portion 1280 of the built-in shower head portion 1204 and rotatable relative to the handle portion 1280. The detachable housing 1222 is configured to connect to the connector via any conventional method known to one skilled in the art (e.g., threading, snapping, locking and fitting), such that the detachable housing 1222 may be separated from the connector by the user to replace the filter cartridge housed therein. The detachable housing 1222 may include a plurality of protrusions 1221 extending about a circumference thereof for the user to grip the detachable housing 1222. The plurality of protrusions 1221 may be composed of or covered by an anti-slip material. In addition, the plurality of protrusions 1221 may be composed of an antimicrobial material. A remaining portion of the detachable housing 1222 may be composed of or covered by an anti-slip material and/or an antimicrobial material. The filter assembly 1202 may be configured to be in an active configuration (e.g., when the shower water gets filtered by the filter cartridge of the filter 1208) and a bypass configuration (e.g., when the shower water is not filtered and bypasses the filter cartridge of the filter 1208). The filter assembly 1202 may be moved from the active configuration to the bypass configuration in a substantially similar manner as described above with respect to the filter assembly 1102.

In the exemplary embodiment, the filter assembly 1202 may further include a diverter switch 1260, the diverter switch 1260 being substantially similar to the diverter switch 760 of the shower filter system 700 (e.g., see FIGS. 25-28). The diverter switch 1260 includes a body portion 1262 coupled to the inlet pipe portion 1206 and a grip portion 1264 configured to be gripped by the user to rotate the diverter switch 1260. When the diverter switch 1260 is in a shower head position, the shower water, regardless of whether the shower water is filtered or non-filtered, is diverted to the built-in shower head portion 1204. When the diverter switch 1260 is in a hand shower position, the shower water, regardless of whether the shower water is filtered or non-filtered, is diverted to the hand shower 1205. When the diverter switch 1260 is in a combination position, the shower water (regardless of whether the shower water is filtered or non-filtered) is diverted to the built-in shower head portion 1204 and the hand shower 1205. As will be understood by one with ordinary skill in the art, the diverter switch 1260 may be any diverter switch known to one skilled in the arts for regulating the flow of shower water between the built-in shower head portion 1204 and the hand shower 1205.

The diverter switch 1260 is configured to be rotated about a longitudinal axis thereof between the shower head position, the hand shower position, and the combination position. The diverter switch 1260 may be rotated in a first direction (e.g., clockwise) from the shower head position to the hand shower position, to the combination position. The diverter switch 1260 may then be rotated in a second direction (e.g., counter-clockwise) from the combination position, to the hand shower position, to the shower head position. The diverter switch 1260 may have at least a tactile feedback and/or an audible feedback to notify the user that the diverter switch 1260 is properly rotated between the three positions.

One of advantages of the present disclosure is that a user may use the shower without removing the filter or the filter cartridge. When the filter cartridge is full of sediment and the water pressure decreased, the user may replace the filter or replace the filter cartridge, however, if the user does not have a new filter cartridge available, the user may direct the water to bypass the filter to increase the pressure of the water. One of the advantages of the further embodiments of the filter systems is that, instead of rotating the filter, the water may be directed to bypass the filter by turning the configuration switch.

The present disclosure is illustrated and described in reference to a particular embodiment, however, it includes other alternative embodiments, alterations and modifications generated by anyone skilled in the art.

EXAMPLES

In an exemplary embodiment, a shower filter system, comprising a filter assembly, the filter assembly including: a filter including a filter housing and a filter cartridge situated within the filter housing, the filter cartridge being configured to filter water passed therethrough; an inlet pipe configured to feed water to a water dispersing arrangement via an inlet pipe channel extending therethrough from an upstream end to a downstream end configured to be coupled to the water dispersing arrangement; and a connector including a spout having a spout outlet channel couplable to an upstream portion of the inlet pipe channel and a spout inlet channel couplable to a downstream portion of the inlet pipe channel, wherein the filter is configured to be attached to the inlet pipe via the connector, wherein, when the filter assembly is in an active configuration, water from the upstream portion of the inlet pipe channel passes through the spout outlet channel, through the filter cartridge, through the spout inlet channel and into the downstream portion of the inlet pipe channel, and wherein, when the filter assembly is in a bypass configuration, water from the upstream portion of the inlet pipe channel passes into a bypass channel to exit the filter assembly without passing through the filter cartridge.

In an exemplary embodiment, the filter further comprises: a receptacle configured to be attached to the connector, the receptacle including a receptacle inlet channel and a receptacle outlet channel, wherein, when the filter assembly is in the active configuration, the receptacle inlet channel is open to the spout outlet channel and the receptacle outlet channel is open to the spout inlet channel, so that water from the upstream portion of the inlet pipe channel passes through the spout outlet channel, through the receptacle inlet channel, through the filter cartridge, through the receptacle outlet channel, through the spout inlet channel and into the downstream portion of the inlet pipe channel, and wherein, when the filter assembly is in the bypass configuration, water from the upstream portion of the inlet pipe channel passes through the spout outlet channel, through a bypass channel, and through the spout inlet channel without passing through the filter cartridge.

In an exemplary embodiment, the spout includes a first opening corresponding to the spout outlet channel and a second opening corresponding to the spout inlet channel.

In an exemplary embodiment, the receptacle includes a third opening corresponding to the receptacle inlet channel, a fourth opening corresponding to the bypass channel, and a fifth opening corresponding to the receptacle outlet channel.

In an exemplary embodiment, the third opening of the receptacle is larger than each of the fourth opening of the receptacle and the fifth opening of the receptacle.

In an exemplary embodiment, the filter housing includes an indicative indicating the bypass configuration and the active configuration.

In an exemplary embodiment, the water dispersing arrangement includes at least one of a fixed mounted shower head and a removable hand shower.

In an exemplary embodiment, the spout includes a protrusion sized and shaped to be inserted into a correspondingly sized and shaped protrusion cavity in the receptacle to guide the receptacle onto the spout.

In an exemplary embodiment, the filter housing includes a first section and a second section, the first section configured to be uncoupled from the second section to access the filter cartridge.

In an exemplary embodiment, a shower filter system comprising a filter assembly, the filter assembly including: a filter housing including a filter cartridge situated within the filter housing, the filter cartridge being configured to filter water passed therethrough; an inlet pipe configured to feed water to a water dispersing arrangement via an inlet pipe channel extending therethrough from an upstream end to a downstream end configured to be coupled to the water dispersing arrangement, the inlet pipe including a connector including a spout having a spout outlet channel coupled to an upstream portion of the inlet pipe channel and a spout inlet channel coupled to a downstream portion of the inlet pipe channel; a receptacle configured to be attached to the connector and including a receptacle inlet channel open to the spout outlet channel and a receptacle outlet channel open to the spout inlet channel so that water from the upstream portion of the inlet pipe channel passes through the spout outlet channel, through the receptacle inlet channel, through the filter cartridge and through the receptacle outlet channel into the spout inlet channel and out through the downstream portion of the inlet pipe channel; and a valve mounted within the inlet pipe, the valve being movable between (a) a filter configuration in which water from the upstream portion of the inlet pipe channel passes via the valve into the spout outlet channel and (b) a non-filter configuration in which the water from the upstream portion of the inlet pipe channel passes via the valve directly to the downstream portion of the inlet pipe channel to exit the inlet pipe without passing through the filter cartridge.

In an exemplary embodiment, the valve includes a pressure mechanism.

In an exemplary embodiment, when a pressure of the water is greater than a predetermined threshold, the pressure valve moves into the filter configuration, and when the pressure of the water is less than the predetermined threshold, the pressure valve moves into the non-filter configuration.

In an exemplary embodiment, when the pressure valve is in the filter configuration the pressure valve closes access to a bypass channel of the inlet pipe channel and when the pressure valve is in the non-filter configuration the pressure valve opens access to the bypass channel of the inlet pipe channel.

In an exemplary embodiment, the spout is coupled to the valve.

In an exemplary embodiment, the inlet pipe includes a socket sized and shaped to receive the valve therein, such that, when the valve is inserted into the socket, a first socket portion and a second socket portion are formed, the first socket portion opening into the spout outlet channel and the second socket portion opening into the spout inlet channel.

In an exemplary embodiment, rotation of the valve in a first direction moves the valve into the filter configuration and rotation of the valve in a second direction moves the valve into the non-filter configuration.

In an exemplary embodiment, the valve further comprises a pin extending outward from a body of the valve, the pin sized and shaped to be inserted into a correspondingly sized and shaped pin cavity in the inlet pipe to guide the valve into the inlet pipe.

In an exemplary embodiment, the valve includes a valve channel extending therethrough, such that, when in the non-filter configuration, the valve channel aligns with the inlet pipe channel and when in the filter configuration the valve channel does not align with the inlet pipe channel.

In an exemplary embodiment, the water dispersing arrangement includes at least one of a fixed mounted shower head and a removable hand shower.

In an exemplary embodiment, a shower filter system comprising a filter assembly, the filter assembly including: a filter including a filter housing and a filter cartridge situated within the filter housing, the filter housing including a receptacle inlet configured to pass water flowing therethrough to the filter cartridge and through the filter cartridge to a receptacle outlet; and an inlet pipe configured to feed water to a water dispersing arrangement via an inlet pipe channel extending therethrough from an upstream end to a downstream end and including an upstream portion and a downstream portion, the downstream portion of the inlet pipe channel including a filter outlet passage and a non-filter outlet passage, the non-filter outlet passage being configured to be coupled to an inlet of the water dispersing arrangement so that water from the inlet pipe passes to the water dispersing arrangement without passing through the filter, the filter outlet passage being configured to connect to the receptacle inlet of the filter housing so that water from the inlet pipe passes through the filter, the inlet pipe further including a switch configured to couple the upstream portion of the inlet pipe channel to a selected one of the filter outlet passage and the non-filter outlet passage.

In an exemplary embodiment, the water dispersing arrangement includes at least one of (a) at least one fixed mounted shower head and (b) at least one removable hand shower.

In an exemplary embodiment, the water dispersing arrangement includes a fixed mounted shower head having the inlet and a removable hand shower having a further inlet and wherein the non-filter outlet passage couples to the inlet and the further inlet via a lumen of a shower hose attached to the removable hand shower.

In an exemplary embodiment, the fixed mounted shower head includes a head portion and a body portion, the body portion including a proximal portion and a distal portion, the proximal portion having a cavity sized and shaped to receive the filter therein and the distal portion having a coupling mechanism configured to couple the removable hand shower to the distal portion.

In an exemplary embodiment, the distal portion of the body portion is vertically below the proximal portion of the body portion such that the filter is positioned between the head portion of the fixed mounted shower head and the coupling mechanism configured to receive the removable hand shower.

In an exemplary embodiment, the water dispersing arrangement is a removable hand shower and wherein the system further comprising a coupling mechanism configured to couple the removable hand shower to the inlet pipe, the coupling mechanism permitting the removable hand shower to pivot and/or rotate relative to the inlet pipe.

In an exemplary embodiment, the coupling mechanism is a hand shower holder including a plurality of fingers sized and shaped to grip the removable hand shower therebetween.

In an exemplary embodiment, the coupling mechanism is coupled to a first end of the inlet pipe, the filter is coupled to a second end of the inlet pipe, and the switch is coupled to the inlet pipe between the coupling mechanism and the filter, the first end and the second end of the inlet pipe being along a longitudinal axis of the inlet pipe.

In an exemplary embodiment, water disperses from the fixed mounted shower head and the removable hand shower at the same time.

In an exemplary embodiment, the receptacle outlet couples to a first filtered passage and a second filtered passage, the first filtered passage delivering filtered water to the fixed mounted shower head and the second filtered passage delivering filtered water to the removable hand shower.

In an exemplary embodiment, the water dispersing arrangement is a fixed mounted shower head including a head portion and a body portion, the head portion having a plurality of nozzles, the body portion being configured to be coupled to the filter, the nozzles and the filter being oriented in a predetermined direction.

In an exemplary embodiment, a shower filter system with a filter assembly including: a filter including a filter housing and a filter cartridge situated within the filter housing to filter water passed therethrough, the filter including a filter inlet channel and a filter outlet channel; and an inlet pipe configured to feed water to a water dispersing arrangement via an inlet pipe channel extending therethrough from an upstream end to a downstream end, an upstream portion of the inlet pipe channel being coupled to the filter inlet channel and a downstream portion of the inlet pipe channel being coupled to the filter outlet channel, wherein, the filter assembly is configured to move between (a) an active configuration, in which the filter inlet channel is open to the upstream portion of the inlet pipe channel and the filter outlet channel is open to the downstream portion of the inlet pipe channel so that water passes through the upstream portion of the inlet pipe channel, through the filter inlet channel into the filter cartridge, and through the filter outlet channel into the downstream portion of the inlet pipe channel, and (b) a bypass configuration, in which the filter inlet channel and the filter outlet channel are closed to the upstream and downstream portions of the inlet pipe channel so that water passes through the upstream portion of the inlet pipe channel and through a filter bypass channel into the downstream portion of the inlet pipe channel without passing through the filter cartridge.

In an exemplary embodiment, the filter assembly is rotatable between the active configuration and the bypass configuration.

In an exemplary embodiment, the filter inlet channel includes a first portion and a second portion, and wherein the filter outlet channel includes a third portion and a fourth portion.

In an exemplary embodiment, the first portion of the filter inlet channel and the third portion of the filter outlet channel are housed within a spout of the inlet pipe channel, and wherein the second portion of the filter inlet channel and the fourth portion of the filter outlet channel are housed within a receptacle of the filter housing.

In an exemplary embodiment, the filter bypass channel is housed within the receptacle of the filter.

In an exemplary embodiment, when the filter assembly is in the active configuration, the first portion of the filter inlet channel aligns with the second portion of the filter inlet channel so that water passes through the upstream portion of the inlet pipe channel, through the first portion of the filter inlet channel, through the second portion of the filter inlet channel into the filter cartridge, through the fourth portion of the filter outlet channel, and through the third portion of the filter outlet channel into the downstream portion of the inlet pipe channel.

In an exemplary embodiment, when the filter assembly is in the bypass configuration, the filter bypass channel aligns with the first portion of the filter inlet channel so that water passes through the upstream portion of the inlet pipe channel, through the first portion of the filter inlet channel, through the filter bypass channel, through the fourth portion of the filter outlet channel, and through the third portion of the filter outlet channel into the downstream portion of the inlet pipe channel without passing through the filter cartridge.

ADDITIONAL EXAMPLES

In an exemplary embodiment, a shower filter system including a filter assembly including: a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe configured to feed water to a water dispersing arrangement via an inlet pipe channel extending therethrough from an upstream end to a downstream end, an upstream portion of the inlet pipe channel being coupled to the spout inlet channel and a downstream portion of the inlet pipe channel being coupled to the spout outlet channel, wherein, the filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge.

In an exemplary embodiment, the connector includes a receiving portion configured to receive the filter cartridge therein.

In an exemplary embodiment, the filter housing is configured to be uncoupled from the connector to access the filter cartridge.

In an exemplary embodiment, the spout includes at least one first opening corresponding to the spout inlet channel and at least one second opening corresponding to the spout outlet channel.

In an exemplary embodiment, the system further comprising: a washer coupled to the inlet pipe and extending about a portion of the spout, the washer including at least one washer hole, wherein, when the filter assembly is in the active configuration, the at least one washer hole aligns with the at least one first opening to connect the upstream portion of the inlet pipe channel with the spout inlet channel.

In an exemplary embodiment, when the filter assembly is in the bypass configuration, the at least one washer hole misaligns with the at least one first opening to connect the upstream portion of the inlet pipe channel with the spout bypass channel.

In an exemplary embodiment, the water passes through the spout inlet channel into the filter cartridge via a filter cartridge surrounding channel that funnels the water through a plurality of holes in the filter cartridge.

In an exemplary embodiment, the system further comprising: a valve configured to connect the filter cartridge with the spout outlet channel.

In an exemplary embodiment, the valve is a pressure valve configured to open into the spout outlet channel when a pressure of the water exiting the filter cartridge is greater than a predetermined threshold of the pressure valve.

In an exemplary embodiment, the spout inlet channel includes a first portion and a second portion, such that, when the filter assembly is in the active configuration, the first portion is aligned with the second portion, and when the filter assembly is in the bypass configuration, the first portion is misaligned with the second portion.

In an exemplary embodiment, the system further comprising: a coupling mechanism configured to couple the water dispersing arrangement to the inlet pipe.

In an exemplary embodiment, the coupling mechanism includes a plurality of fingers configured to receive a portion of a handle of the water dispersing arrangement therein.

In an exemplary embodiment, the coupling mechanism includes a magnet configured to be coupled to a magnetic portion of the water dispersing arrangement.

In an exemplary embodiment, the filter housing includes an indicative indicating the bypass configuration and the active configuration.

In an exemplary embodiment, the water dispersing arrangement includes one of a fixed mounted shower head and a removable hand shower.

In an exemplary embodiment, the fixed mounted shower head is integrally formed with the inlet pipe.

In an exemplary embodiment, the filter housing includes a plurality of protrusions configured to be gripped by a user to rotate the filter housing about a longitudinal axis.

In an exemplary embodiment, at least one of the filter housing and the plurality of protrusions are comprised of an antimicrobial material.

In an exemplary embodiment, the system further comprising: a nut coupled to the upstream end of the inlet pipe, the nut configured to be rotatable about a longitudinal axis thereof to couple the inlet pipe to a water source and the nut including at least one of a plurality of ridges, a wing, and a plurality of wings for a user to grip.

In an exemplary embodiment, the filter housing includes an opening to access the filter cartridge.

In an exemplary embodiment, a shower filter system comprising a first water dispersing arrangement having a first inlet; a second water dispersing arrangement having a second inlet; and a filter assembly comprising: a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe coupled to the filter and including an inlet pipe channel extending therethrough from an upstream end to a downstream end, an upstream portion of the inlet pipe channel being coupled to the spout inlet channel and a downstream portion of the inlet pipe channel being coupled to the spout outlet channel and at least one of the first inlet and the second inlet, wherein, the filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge.

In an exemplary embodiment, the first water dispersing arrangement includes a fixed mounted shower head and the second water dispersing arrangement includes a removable hand shower.

In an exemplary embodiment, the fixed mounted shower head is integrally formed with the inlet pipe.

In an exemplary embodiment, the system further comprising: a coupling mechanism configured to couple the removable hand shower to the inlet pipe, the coupling mechanism permitting the removable hand shower to pivot and/or rotate relative to the inlet pipe.

In an exemplary embodiment, the coupling mechanism is a hand shower holder including a plurality of fingers sized and shaped to grip the removable hand shower therebetween.

In an exemplary embodiment, the coupling mechanism includes a magnet configured to be coupled to a magnetic portion of the removable hand shower.

In an exemplary embodiment, the system further comprising: a diverter switch coupled to the inlet pipe, the diverter switch configured to be rotated by a user between a first position, in which water disperses through the first water dispersing arrangement, and a second position, in which water disperses through the second water dispersing arrangement.

In an exemplary embodiment, the diverter switch is further configured to be rotated by the user into a third position, in which water disperses through the first and second water dispersing arrangements at the same time.

In an exemplary embodiment, the filter housing includes a plurality of protrusions configured to be gripped by a user to rotate the filter housing about a longitudinal axis.

In an exemplary embodiment, at least one of the filter housing and the plurality of protrusions are comprised of an antimicrobial material.

In an exemplary embodiment, a shower filter system, comprising: a filter assembly including: an inlet pipe portion couplable to a water source and including an inlet pipe channel extending partially therethrough; a water dispersing arrangement portion extending integrally from the inlet pipe portion and including a water dispersing arrangement channel extending partially therethrough; and a filter including a connector coupled to the inlet pipe portion, a filter housing couplable to the connector, and a filter cartridge situated within the filter housing to filter water passed therethrough, the connector including a connector inlet channel extending partially therethrough and a connector outlet channel extending partially therethrough; wherein, the filter assembly is movable between (a) an active configuration, in which the connector inlet channel couples to the filter so that water passes through the inlet pipe channel, through the connector inlet channel into the filter cartridge, and through the connector outlet channel into the water dispersing arrangement channel, and (b) a bypass configuration, in which the connector inlet channel couples to a filter bypass channel so that water passes through the inlet pipe channel, through the connector inlet channel into the filter bypass channel, and through the connector outlet channel into the water dispersing arrangement channel without passing through the filter cartridge.

In an exemplary embodiment, the system further comprising: a directing mechanism between the filter cartridge and the connector, the directing mechanism including a filter input hole, a filter output hole, a bypass input hole and a bypass output hole.

In an exemplary embodiment when the filter assembly is in the active configuration, the filter input hole aligns with the connector inlet channel to direct the water toward the filter cartridge, and the filter output hole aligns with the connector outlet channel to direct the water out of the filter cartridge.

In an exemplary embodiment, when the filter assembly is in the bypass configuration, the bypass input hole aligns with the connector inlet channel to direct the water into the filter bypass channel, and the bypass output hole aligns with the connector outlet channel to direct the water out of the filter bypass channel.

In an exemplary embodiment, directing mechanism further includes a recess configured to form the filter bypass channel when the filter assembly is in the bypass configuration.

In an exemplary embodiment, the connector includes a receiving portion configured to receive the filter cartridge therein.

In an exemplary embodiment, the filter housing is configured to be uncoupled from the connector to access the filter cartridge.

In an exemplary embodiment, further includes a valve configured to connect the filter cartridge with the connector outlet channel.

In an exemplary embodiment, the valve is a pressure valve configured to open into the connector outlet channel when a pressure of the water exiting the filter cartridge is greater than a predetermined threshold of the pressure valve.

In an exemplary embodiment, the water passes through the connector inlet channel into the filter cartridge via a filter cartridge surrounding channel that funnels the water through a plurality of holes in the filter cartridge.

In an exemplary embodiment, the system further comprising: a removable hand shower couplable to the inlet pipe portion.

In an exemplary embodiment, the system further comprising: a coupling mechanism configured to couple the removable hand shower to the inlet pipe portion.

In an exemplary embodiment, the coupling mechanism includes a plurality of fingers configured to receive a portion of a handle of the removable hand shower therein.

In an exemplary embodiment, the coupling mechanism includes a magnet configured to be coupled to a magnetic portion of the removable hand shower.

In an exemplary embodiment, magnet is embedded in a handle portion of the water dispersing arrangement portion.

In an exemplary embodiment, the magnet protrudes laterally outward from a handle portion of the water dispersing arrangement portion.

In an exemplary embodiment, the system further includes a diverter switch coupled to the inlet pipe portion, the diverter switch configured to be rotated by a user between a first position, in which water disperses through the water dispersing arrangement portion, and a second position, in which water disperses through the removable hand shower.

In an exemplary embodiment, the diverter switch is further configured to be rotated by the user into a third position, in which water disperses through the water dispersing arrangement portion and the removable hand shower at the same time.

In an exemplary embodiment, the filter housing includes an indicative indicating the bypass configuration and the active configuration.

In an exemplary embodiment, the filter housing includes a plurality of protrusions configured to be gripped by a user to rotate the filter housing about a longitudinal axis.

In an exemplary embodiment, at least one of the filter housing and the plurality of protrusions are comprised of an antimicrobial material.

In an exemplary embodiment, the system further comprising: a nut coupled to the inlet pipe portion, the nut configured to be rotatable about a longitudinal axis thereof to couple the inlet pipe portion to a water source and the nut including at least one of a plurality of ridges, a wing, and a plurality of wings for a user to grip.

In an exemplary embodiment, the filter housing includes an opening to access the filter cartridge.

The invention claimed is:

1. A shower filter system, comprising:

a filter assembly including a spout bypass channel and:

a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe configured to feed water to an inlet pipe channel extending therethrough from an upstream end to a downstream end, wherein the downstream end of the inlet pipe channel is configured to be coupled to a water dispersing arrangement, an upstream portion of the inlet pipe channel being coupled to the spout inlet channel and a downstream portion of the inlet pipe channel being coupled to the spout outlet channel, wherein, the filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge, and wherein the water passes through the spout inlet channel into a filter cartridge surrounding channel surrounding at least a portion of the filter cartridge, the filter cartridge surrounding channel funneling the water into the filter cartridge through a plurality of holes in the filter cartridge.

2. The system of claim 1, wherein the connector includes a receiving portion configured to receive the filter cartridge therein.

3. The system of claim 1, wherein the filter housing is configured to be uncoupled from the connector to access the filter cartridge.

4. The system of claim 1, wherein the spout includes at least one first opening corresponding to the spout inlet channel and at least one second opening corresponding to the spout outlet channel.

5. The system of claim 4, further comprising:

a washer coupled to the inlet pipe and extending about a portion of the spout, the washer including at least one washer hole, wherein, when the filter assembly is in the active configuration, the at least one washer hole aligns with the at least one first opening to connect the upstream portion of the inlet pipe channel with the spout inlet channel.

6. The system of claim 5, wherein, when the filter assembly is in the bypass configuration, the at least one washer hole misaligns with the at least one first opening to connect the upstream portion of the inlet pipe channel with the spout bypass channel.

7. The system of claim 1, further comprising:

a valve configured to connect the filter cartridge with the spout outlet channel.

8. The system of claim 7, wherein the valve is a pressure valve configured to open into the spout outlet channel when a pressure of the water exiting the filter cartridge is greater than a predetermined threshold of the pressure valve.

9. The system of claim 1, wherein the spout inlet channel includes a first portion and a second portion, such that, when the filter assembly is in the active configuration, the first portion is aligned with the second portion, and when the filter assembly is in the bypass configuration, the first portion is misaligned with the second portion.

10. The system of claim 1, further comprising:

a coupling mechanism configured to couple the water dispersing arrangement to the inlet pipe.

11. The system of claim 10, wherein the coupling mechanism includes a plurality of fingers configured to receive a portion of a handle of the water dispersing arrangement therein.

12. The system of claim 10, wherein the coupling mechanism includes a magnet configured to magnetically couple to a shower component.

13. The system of claim 1, wherein the filter housing includes an indicator indicating whether the filter assembly is in the bypass configuration or the active configuration.

14. The system of claim 1, wherein the water dispersing arrangement includes one of a fixed mounted shower head and a removable hand shower.

15. The system of claim 1, wherein the filter housing includes a plurality of protrusions configured to be gripped by a user to rotate the filter housing about a longitudinal axis.

16. The system of claim 15, wherein at least one of the filter housing and the plurality of protrusions are comprised of an antimicrobial material.

17. The system of claim 1, wherein the filter housing includes an opening to access the filter cartridge.

18. A shower filter system, comprising:

a first water dispersing arrangement having a first inlet;

a second water dispersing arrangement having a second inlet; and a filter assembly comprising:

a filter including a connector, a filter housing couplable to the connector, and a filter cartridge situated within the filter housing to filter water passed therethrough, the connector including a spout extending outward therefrom, the spout including a spout inlet channel and a spout outlet channel; and an inlet pipe coupled to the first and second water dispersing arrangements and the filter, the inlet pipe including an inlet pipe channel extending therethrough from an upstream end to a downstream end, an upstream portion of the inlet pipe channel being coupled to the spout inlet channel and a downstream portion of the inlet pipe channel being coupled to the spout outlet channel and being selectively couplable to a selected one of the first inlet and the second inlet, wherein, the filter assembly is movable between (a) an active configuration, in which the spout inlet channel is open to the upstream portion of the inlet pipe channel and the spout outlet channel is open to the downstream portion of the inlet pipe channel so that water passes through the upstream portion of the inlet pipe channel, through the spout inlet channel into the filter cartridge, and through the spout outlet channel into the downstream portion of the inlet pipe channel, and (b) a bypass configuration, in which the spout inlet channel and the spout outlet channel are closed to the upstream and downstream portions of the inlet pipe channel so that water passes through the upstream portion of the inlet pipe channel and through a spout bypass channel into the downstream portion of the inlet pipe channel without passing through the filter cartridge, wherein the water passes through the spout inlet channel into a filter cartridge surrounding channel surrounding at least a portion of the filter cartridge, the filter cartridge surrounding channel funneling the water into the filter cartridge through a plurality of holes in the filter cartridge.

19. A shower filter system, comprising:

a filter assembly including:

an inlet pipe portion couplable to a water source and including an inlet pipe channel extending partially therethrough;

a water dispersing arrangement portion extending integrally from the inlet pipe portion and including a water dispersing arrangement channel extending partially therethrough; and a filter including a connector coupled to the inlet pipe portion, a filter housing couplable to the connector, and a filter cartridge situated within the filter housing to filter water passed therethrough, the connector including a connector inlet channel extending partially therethrough and a connector outlet channel extending partially therethrough;

wherein, the filter assembly is movable between (a) an active configuration, in which the connector inlet channel couples to the filter so that water passes through the inlet pipe channel, through the connector inlet channel into the filter cartridge, and through the connector outlet channel into the water dispersing arrangement channel, and (b) a bypass configuration, in which the connector inlet channel couples to a filter bypass channel so that water passes through the inlet pipe channel, through the connector inlet channel into the filter bypass channel, and through the connector outlet channel into the water dispersing arrangement channel without passing through the filter cartridge.

* * * * *